(12) United States Patent
Tanabe et al.

(10) Patent No.: US 9,720,373 B2
(45) Date of Patent: Aug. 1, 2017

(54) IMAGE FORMING APPARATUS, CARTRIDGE AND IMAGE FORMING APPARATUS SYSTEM

(71) Applicant: CANON KABUSHIKI KAISHA, Tokyo (JP)

(72) Inventors: Masato Tanabe, Susono (JP); Kazuo Chadani, Suntou-gun (JP); Yasunori Toriyama, Numazu (JP); Sadaaki Tani, Numazu (JP); Yuuki Nakamura, Mishima (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/036,068

(22) Filed: Sep. 25, 2013

(65) Prior Publication Data

US 2014/0086627 A1 Mar. 27, 2014

(30) Foreign Application Priority Data

Sep. 25, 2012 (JP) .................................. 2012-210762
Sep. 25, 2012 (JP) .................................. 2012-210763
Sep. 25, 2012 (JP) .................................. 2012-210764

(51) Int. Cl.
*G03G 21/00* (2006.01)
*G03G 21/18* (2006.01)

(52) U.S. Cl.
CPC ....... *G03G 21/1842* (2013.01); *G03G 21/185* (2013.01)

(58) Field of Classification Search
CPC .................... G03G 21/1842; G03G 21/185

USPC ................................................... 399/12, 111
See application file for complete search history.

(56) References Cited

U.S. PATENT DOCUMENTS 4,949,123 A * 8/1990 Takashima ....................... 399/12
5,014,094 A 5/1991 Amitani et al.
(Continued)

FOREIGN PATENT DOCUMENTS

EP 0 496 642 A2 7/1992
EP 1 375 159 A1 1/2004
(Continued)

OTHER PUBLICATIONS

Notification of Transmittal of the International Search Report and the Written Opinion dated Jan. 16, 2014, in related PCT Application No. PCT/JP2013/076756.

(Continued)

*Primary Examiner* — Quana M Grainger
(74) *Attorney, Agent, or Firm* — Fitzpatrick, Cella, Harper & Scinto

(57) ABSTRACT

A cartridge for an image forming apparatus including a movable member is provided with a first engaging portion and a second engaging portion movable between a first position and a second position. The cartridge includes a first engaged portion engageable with the first engaging portion, and a second engaged portion engageable with the second engaging portion. By the first engaged portion being engaged with the first engaging portion in the process of mounting, the movable member is moved from the first position to the second position to permit the second engaged to pass the second engaging portion in a mounting direction.

19 Claims, 50 Drawing Sheets

(56) References Cited

U.S. PATENT DOCUMENTS

| | | | |
|---|---|---|---|
| 5,655,181 A | | 8/1997 | Chadani et al. |
| 5,678,121 A | * | 10/1997 | Meetze et al. .................. 399/12 |
| 5,832,343 A | | 11/1998 | Kobayashi et al. |
| 6,208,817 B1 | | 3/2001 | Chadani et al. |
| 6,285,836 B1 | | 9/2001 | Kubota |
| 6,661,977 B1 | | 12/2003 | Kubota |
| 7,912,404 B2 | | 3/2011 | Hoshi et al. |
| 2010/0232832 A1 | * | 9/2010 | Matsuda ............ G03G 15/0806 399/119 |
| 2011/0103835 A1 | | 5/2011 | Hayashi et al. |
| 2011/0182616 A1 | * | 7/2011 | Sato .................. G03G 21/1821 399/111 |
| 2012/0093523 A1 | * | 4/2012 | Kamoshida et al. ........... 399/12 |

FOREIGN PATENT DOCUMENTS

| | | |
|---|---|---|
| EP | 2 378 372 A2 | 10/2011 |
| JP | 59-077449 A | 5/1984 |
| JP | 09-011500 A | 1/1997 |
| JP | 2004-012562 A | 1/2004 |
| JP | 3658381 B2 | 3/2005 |
| RU | 2 367 016 C2 | 9/2009 |

OTHER PUBLICATIONS

Yasunori Toriyama, U.S. Appl. No. 14/036,076, filed Sep. 25, 2013.
Russian Office Action dated Aug. 3, 2016, in related Russian Application No. 2015115692 (with English translation).
Korean Notice of Allowance dated Dec. 23, 2016, in related Korean Patent Application No. 10-2015-7009955.

* cited by examiner (a)

(b)

(a)

(b)

(a)

(b)

IMAGE FORMING APPARATUS, CARTRIDGE AND IMAGE FORMING APPARATUS SYSTEM

FIELD OF THE INVENTION AND RELATED ART

The present invention relates to an image forming apparatus, a cartridge and an image forming apparatus system for forming an image on a recording material.

The image forming apparatus is an apparatus capable of forming an image on a recording material using various known image formation principles or types such as an electrophotographic process, an electrostatic recording process or a magnetic recording process. Examples of the image forming apparatus include a copying machine, a printer (laser beam printer, LED printer, for example), a facsimile machine, a word processor, an image display device (electronic blackboard or electronic white board), and a complex machine (multi-function printer) and so on. The recording material is a material on which an image is formed by the image forming apparatus, and may be a sheet of paper, an OHT sheet, a secondary transfer member, for example.

The cartridge is a unified structure including an image bearing member for carrying an image, and a part or all of an image forming station including image forming process means actable on the image bearing member. It is dismountably mountable to a main assembly of the image forming apparatus and is contributable to an image forming process for forming an image on the recording material. The main assembly of the image forming apparatus is structural portions of the image forming apparatus excluding the cartridge, in a cartridge type image forming apparatus.

The image bearing member may be an electrophotographic photosensitive member in the electrophotographic process, a dielectric member for electrostatic recording in the electrostatic recording process, a magnetic member for magnetic recording in the magnetic recording process, or a member on which an image can be formed through various image formation principles. The image forming process means includes image forming process equipment for forming the image on the image bearing member.

In the following, the description will be made as to a cartridge type electrophotographic image forming apparatus as an exemplary apparatus. The cartridge may be a process cartridge or a developing cartridge.

The process cartridge includes at least one of charging means, developing means and cleaning means as the electrophotographic process means and includes an electrophotographic photosensitive member as the image bearing member, which are unified into a cartridge dismountably mountable to the main assembly of the electrophotographic image forming apparatus. The main assembly of the electrophotographic image forming apparatus will be called the main assembly of the apparatus or main assembly.

Therefore, the process cartridge may be a cartridge including developing means as process means, and an electrophotographic photosensitive member which are unified into a cartridge dismountably mountable to the main assembly of the apparatus. In addition, the process cartridge may be a cartridge including an electrophotographic photosensitive member and charging means, developing means or cleaning means as process means, which are unified into a cartridge.

A process cartridge integrally including the electrophotographic photosensitive member and the developing means is called an integral type process cartridge. A process cartridge integrally including an electrophotographic photosensitive member and process means other than developing means is called a separable type process cartridge. In the separable type, the developing means is provided in another unit, that is, a developing unit, and the image formation is effected by a combination of the developing unit and the separable type process cartridge.

The process cartridge can be mounted and demounted relative to the main assembly of the apparatus by the user. Therefore, the maintenance operation the apparatus can be easily performed in effect.

The developing cartridge includes a developing roller (developer carrying member for supplying a developer to the electrophotographic photosensitive member). The developing cartridge accommodates a powdery developer (toner) for developing an electrostatic latent image formed on the electrophotographic photosensitive member, and is dismountably mountable to the main assembly of the apparatus.

In the structure using the developing cartridge, the electrophotographic photosensitive member is mounted to the main assembly of the apparatus or to a cartridge supporting member. Or, the electrophotographic photosensitive member is provided in the separable type process cartridge (in this case, the process cartridge does not have the developing means). The developing cartridge can be mounted and demounted relative to the main assembly of the apparatus by the user, too. Therefore, the maintenance operation of the apparatus can be easily performed in effect.

Thus, the cartridge may be an integral type process cartridge and a separable type process cartridge. The cartridge may be a pair of the separable type process cartridge and the developing cartridge. The cartridge may be a developing cartridge actable on an electrophotographic photosensitive member fixed on a cartridge supporting member or on a main assembly of the apparatus. The cartridge may be a unit contributable to an image forming process for forming an image on a recording material, the unit being dismountably mountable to the main assembly of the apparatus.

In a cartridge type image forming apparatus, proper ones of the cartridges are supposed to be mounted to the respective mounting portion of the main assembly of the apparatus, but an improper cartridge may be mounted. That is, an erroneous insertion of the cartridge may occur. The proper cartridge is the one that has the proper product type or color of the developers contained therein, for example. In the following, such a cartridge is called a proper cartridge, and another cartridge is called an improper cartridge.

The improper cartridge includes a cartridge which is for a different type of main assembly of image forming apparatus. The improper cartridge includes the cartridge which is for the main assembly but is not for the specific mounting position of the main assembly.

Japanese patent No. 3658381 proposes a method for preventing the erroneous insertion. In this proposal, when an improper cartridge is inserted into the main assembly of the image forming apparatus, a cam portion for opening and closing a shutter engages to an erroneous insertion prevention engaging portion at the opening of main assembly of the apparatus to open the shutter, so that the erroneous insertion is blocked. With such a structure, the shutter portion for protecting the photosensitive drum of cartridge is provided with an engaging portion engageable with the image forming apparatus to open the shutter at the improper position, by which a further insertion of the cartridge is prevented.

With this structure, the discrimination whether the cartridge is proper or not is made at the position downstream with respect to the inserting direction, that is, at a rear portion of the main assembly, and therefore, the discrimination is possible after insertion of the cartridge to a certain extent. In order to prevent a plurality of kinds of erroneous insertion with such a structure, a space for the erroneous insertion prevention structure is required.

SUMMARY OF THE INVENTION

The present invention provides a further improvement. Accordingly, it is an object of the present invention to provide an image forming apparatus, cartridge and image forming apparatus system with which the properness of the cartridge which is being inserted into the main assembly of the image forming apparatus can be detected adjacent an inserting opening, and the erroneous mounting preventing configurations can be provided with smaller space.

According to an aspect of the present invention, there is provided an image forming apparatus for forming an image on a recording material, wherein a cartridge including a first portion-to-be-engaged and a second portion-to-be-engaged is detachably mountable to said image forming apparatus, comprising: an apparatus main assembly; a movable member provided in said apparatus main assembly movable between a first position and a second position; a first engaging portion provided on said movable member and engageable with said first portion-to-be-engaged; and a second engaging portion provided on said movable member engageable with the second portion-to-be-engaged, wherein by said first engaging portion engaging with said first portion-to-be-engaged in the process of mounting said cartridge to said apparatus main assembly, said movable member is moved from the first position to the second position to permit said second engaging portion to pass said second portion-to-be-engaged in a mounting direction in which said cartridge is mounted to said apparatus main assembly.

According to another aspect of the present invention, there is provided an image forming apparatus for forming an image on a recording material, wherein a cartridge including a movable member movable between a first position and a second position is detachably mountable to said image forming apparatus, comprising an apparatus main assembly; a first portion-to-be-engaged engageable with a first engaging portion provided on said movable member; and a second portion-to-be-engaged engageable with a second engaging portion provided on said movable member, wherein by said first portion-to-be-engaged being engaging with said first engaging portion in the process of mounting said cartridge to said apparatus main assembly, said movable member is moved from the first position to the second position to permit said second portion-to-be-engaged to pass said second engaging portion in a mounting direction in which said cartridge is mounted to said apparatus main assembly.

According to a further aspect of the present invention, there is provided a cartridge detachably mountable to an image forming apparatus including a movable member is provided with a first engaging portion and a second engaging portion movable between a first position and a second position, said cartridge comprising a first portion-to-be-engaged engageable with the first engaging portion; and a second portion-to-be-engaged engageable with the second engaging portion, wherein by said first portion-to-be-engaged being engaged with said first engaging portion in the process of mounting said cartridge to said apparatus main assembly, said movable member is moved from the first position to the second position to permit said second portion-to-be-engaged to pass said second engaging portion in a mounting direction in which said cartridge is mounted to said apparatus main assembly.

According to a further aspect of the present invention, there is provided a cartridge detachably mountable to an image forming apparatus for forming an image on a recording material, said image forming apparatus including a first portion-to-be-engaged and a second portion-to-be-engaged, said cartridge comprising a movable member movable between a first position and a second position; a first engaging portion provided on said movable member and engageable with the first portion-to-be-engaged; and a second engaging portion provided on the movable member and engageable with the second portion-to-be-engaged, wherein by said first engaging portion being engaging with said first portion-to-be-engaged in the process of mounting said cartridge to said apparatus main assembly, said movable member is moved from the first position to the second position to permit said second engaging portion to pass said second portion-to-be-engaged in a mounting direction in which said cartridge is mounted to said apparatus main assembly.

According to a further aspect of the present invention, there is provided an image forming apparatus system for forming an image on a recording material, said image forming apparatus system comprising (i) a first cartridge including a first portion-to-be-engaged and a second portion-to-be-engaged; (ii) a first image forming apparatus for forming an image on the recording material, wherein said first cartridge is detachably mountable to said first image forming apparatus, said first image forming apparatus including, a first movable member provided in a first main assembly of said first image forming apparatus and movable between a first position and a second position, a first engaging portion provided on said first movable member and engageable with said first portion-to-be-engaged, and a second engaging portion provided on said first movable member and engageable with said second portion-to-be-engaged, wherein by said first engaging portion engaging with said first portion-to-be-engaged in the process of mounting said first cartridge to said first apparatus main assembly, said first movable member is moved from the first position to the second position to permit said second engaging portion to pass said second portion-to-be-engaged in a mounting direction in which said first cartridge is mounted to said first apparatus main assembly; (iii) a second cartridge including a third portion-to-be-engaged and a fourth portion-to-be-engaged; and (iv) a second image forming apparatus for forming an image on the recording material, wherein said second cartridge is detachably mountable to said second image forming apparatus, said second image forming apparatus including, a second movable member provided in a second main assembly of said second image forming apparatus and movable between a first position and a second position, a third engaging portion provided on said second movable member and engageable with said third portion-to-be-engaged, and a fourth engaging portion provided on said second movable member and engageable with said fourth portion-to-be-engaged, wherein by said first engaging portion engaging with said first portion-to-be-engaged in the process of mounting said second cartridge to said second apparatus main assembly, said second movable member is moved from the first position of said second movable member to the second position of said second movable member to permit said fourth engaging portion to pass said fourth portion-to-be-engaged in a mounting direction in which said second cartridge is mounted to said second apparatus main assembly, wherein when an attempt is made to mount said first cartridge to said second apparatus main assembly, said second engaging portion contacts to said second movable member so that said first cartridge is prevented from being mounted to said second apparatus main assembly, and wherein when an attempt is made to mount said second cartridge to said first apparatus main assembly, said fourth engaging portion contacts to said first movable member so that said second cartridge is prevented from being mounted to said first apparatus main assembly.

According to a further aspect of the present invention, there is provided an image forming apparatus system for forming an image on a recording material, said image forming apparatus system comprising (i) a first cartridge including a movable member movable between a first position and a second position; (ii) a first image forming apparatus for forming an image on the recording material, wherein said first cartridge is detachably mountable to said first image forming apparatus, said first image forming apparatus including, a first portion-to-be-engaged engageable with a first engaging portion provided on said first movable member, and a second portion-to-be-engaged engageable with a second engaging portion provided on said first movable member, wherein by said first portion-to-be-engaged engaging with said first engaging portion in the process of mounting said first cartridge to said first apparatus main assembly, said first movable member is moved from the first position to the second position to permit said second portion-to-be-engaged to pass said second engaging portion in a mounting direction in which said first cartridge is mounted to said first apparatus main assembly; (iii) a second cartridge including a second movable member movable between a third position and a fourth position; and (iv) a second image forming apparatus for forming an image on the recording material, wherein said second cartridge is detachably mountable to said second image forming apparatus, said second image forming apparatus including, a third portion-to-be-engaged engageable with a third engaging portion provided on said second movable member, and a fourth portion-to-be-engaged engageable with a fourth engaging portion provided on said second movable member, wherein by said third portion-to-be-engaged engaging with said third engaging portion in the process of mounting said second cartridge to said second apparatus main assembly, said second movable member is moved from the third position to the fourth position to permit said fourth portion-to-be-engaged to pass said fourth engaging portion in a mounting direction in which said second cartridge is mounted to said second apparatus main assembly; wherein when an attempt is made to mount said first cartridge to said second apparatus main assembly, said second engaging portion contacts to said second movable member so that said first cartridge is prevented from being mounted to said second apparatus main assembly, and wherein when an attempt is made to mount said second cartridge to said first apparatus main assembly, said fourth engaging portion contacts to said first movable member so that said second cartridge is prevented from being mounted to said first apparatus main assembly.

According to a further aspect of the present invention, there is provided an image forming apparatus for forming an image on a recording material, wherein a cartridge is detachably mountable to said image forming apparatus, said image forming apparatus comprising a main assembly; a movable member movable between a projected position in which said movable member is in an insertion path of a first contact portion and a second contact portion which are provided on said cartridge when said cartridge is mounted to said main assembly, and a retracted position in which said movable member is retracted from the insertion path; a first portion-to-be-contacted, provided on said movable member, for placing said movable member to the retracted position by being contacted by said first contact portion or said second contact portion; a second portion-to-be-contacted, provided on said movable member at a position downstream of said first portion-to-be-contacted with respect to a mounting direction of mounting said cartridge to said main assembly, for placing said movable member to the retracted position by being contacted by said first contact portion or said second contact portion; and a recess provided in said movable member between said first portion-to-be-contacted and said second portion-to-be-contacted with respect to the mounting direction, said recess being recessed beyond said first portion-to-be-contacted and said second portion-to-be-contacted in a moving direction of said movable member, and said recess entering the insertion path when said movable member is in the projected position, wherein said first contact portion and said second contact portion is capable of passing said movable member in the mounting direction without said second contact portion entering said recess in the process of mounting said cartridge to said main assembly.

According to a further aspect of the present invention, there is provided a cartridge detachably mountable to an image forming apparatus for forming an image on a recording material, the image forming apparatus including a movable member movable between a projected position in which the movable member is in an insertion path of said cartridge when said cartridge is mounted to a main assembly of the image forming apparatus and a retracted position retracted from the insertion path, a first portion-to-be-contacted provided on the movable member, a second portion-to-be-contacted provided on the movable member at a position downstream of said first portion-to-be-contacted with respect to a mounting direction of mounting said cartridge to the main assembly, a recess provided in the movable member between the first portion-to-be-contacted and the second portion-to-be-contacted with respect to the mounting direction, the recess being recessed beyond the first portion-to-be-contacted and the second portion-to-be-contacted in a moving direction of the movable member, and the recess entering the insertion path when the movable member is in the projected position, said cartridge comprising a first contact portion for placing the movable member to the retracted position by contacting to the first portion-to-be-contacted or the second portion-to-be-contacted in the process of mounting said cartridge to the main assembly; and a second, provided at a position downstream of said first contact portion with respect to the mounting direction, for placing the movable member to the retracted position by contacting to the first portion-to-be-contacted or the second portion-to-be-contacted in the process of mounting said cartridge to the main assembly, wherein said first contact portion and said second contact portion is capable of passing said movable member in the mounting direction without said second contact portion entering said recess in the process of mounting said cartridge to said main assembly.

According to a further aspect of the present invention, there is provided an image forming apparatus system for forming an image on a recording material, said image forming apparatus system comprising (i) first cartridge; (ii) a first image forming apparatus for forming an image on the recording material, wherein said first cartridge is detachably mountable to said first image forming apparatus, said first image forming apparatus including, a first movable member movable between a first projected position in which said first movable member is in an insertion path of a first contact portion and a second contact portion which are provided on said first cartridge when said first cartridge is mounted to a first main assembly of said first image forming apparatus, and a first retracted position in which said movable member is retracted from the insertion path, a first portion-to-be-contacted, provided on said first movable member, for placing said first movable member to the first retracted position by being contacted by said first contact portion or said second contact portion; a second portion-to-be-contacted, provided on said first movable member at a position downstream of said first portion-to-be-contacted with respect to a mounting direction of mounting said first cartridge to said first main assembly, for placing said first movable member to the first retracted position by being contacted by said first contact portion or said second contact portion, and a first recess provided in said first movable member between said first portion-to-be-contacted and said second portion-to-be-contacted with respect to the mounting direction, said first recess being recessed beyond said first portion-to-be-contacted and said second portion-to-be-contacted in a moving direction of said first movable member, and said first recess entering the insertion path when said first movable member is in the first projected position, wherein said first contact portion and said second contact portion is capable of passing said first movable member in the mounting direction without said second contact portion entering said first recess in the process of mounting said first cartridge to said first main assembly; (iii) a second cartridge; and (iv) a second image forming apparatus for forming an image on the recording material, wherein said second cartridge is detachably mountable to said second image forming apparatus, said second image forming apparatus including, a second movable member movable between a second projected position in which said second movable member is in an insertion path of a third contact portion and a fourth contact portion which are provided on said second cartridge when said second cartridge is mounted to a second main assembly of said second image forming apparatus, and a second retracted position in which said second movable member is retracted from the insertion path, a third portion-to-be-contacted, provided on said second movable member, for placing said second movable member to the second retracted position by being contacted by said third contact portion or said fourth contact portion, a fourth portion-to-be-contacted, provided on said second movable member at a position downstream of said third portion-to-be-contacted with respect to a mounting direction of mounting said second cartridge to said second main assembly, for placing said second movable member to the second retracted position by being contacted by said third contact portion or said fourth contact portion, and a second recess provided in said second movable member between said third portion-to-be-contacted and said fourth portion-to-be-contacted with respect to the mounting direction, said second recess being recessed beyond said third portion-to-be-contacted and said fourth portion-to-be-contacted in a moving direction of said second movable member, and said second recess entering the insertion path when said second movable member is in the second projected position, wherein said third contact portion and said fourth contact portion is capable of passing said second movable member in the mounting direction without said fourth contact portion entering said second recess in the process of mounting said second cartridge to said second main assembly; wherein when an attempt is made to mount said second cartridge to said first apparatus main assembly, said first recess receives at least one of said third contact portion and said fourth contact portion to prevent movement of said second cartridge toward downstream with respect to the mounting direction, and wherein when an attempt is made to mount said first cartridge to said second apparatus main assembly, said second recess receives at least one of said first contact portion and said second contact portion to prevent movement of said first cartridge toward downstream with respect to the mounting direction.

These and other objects, features and advantages of the present invention will become more apparent upon a consideration of the following description of the preferred embodiments of the present invention taken in conjunction with the accompanying drawings.

DESCRIPTION OF THE EMBODIMENTS

The preferred embodiments of the present invention will be described in conjunction with the accompanying drawings. Here, the dimensions, the sizes, the materials, the configurations, the relative positional relationships of the elements in the following embodiments and examples are not restrictive to the present invention unless otherwise stated

Embodiment 1

General Arrangement of an Example of Image Forming Apparatus (General Arrangement)

Figure 2:
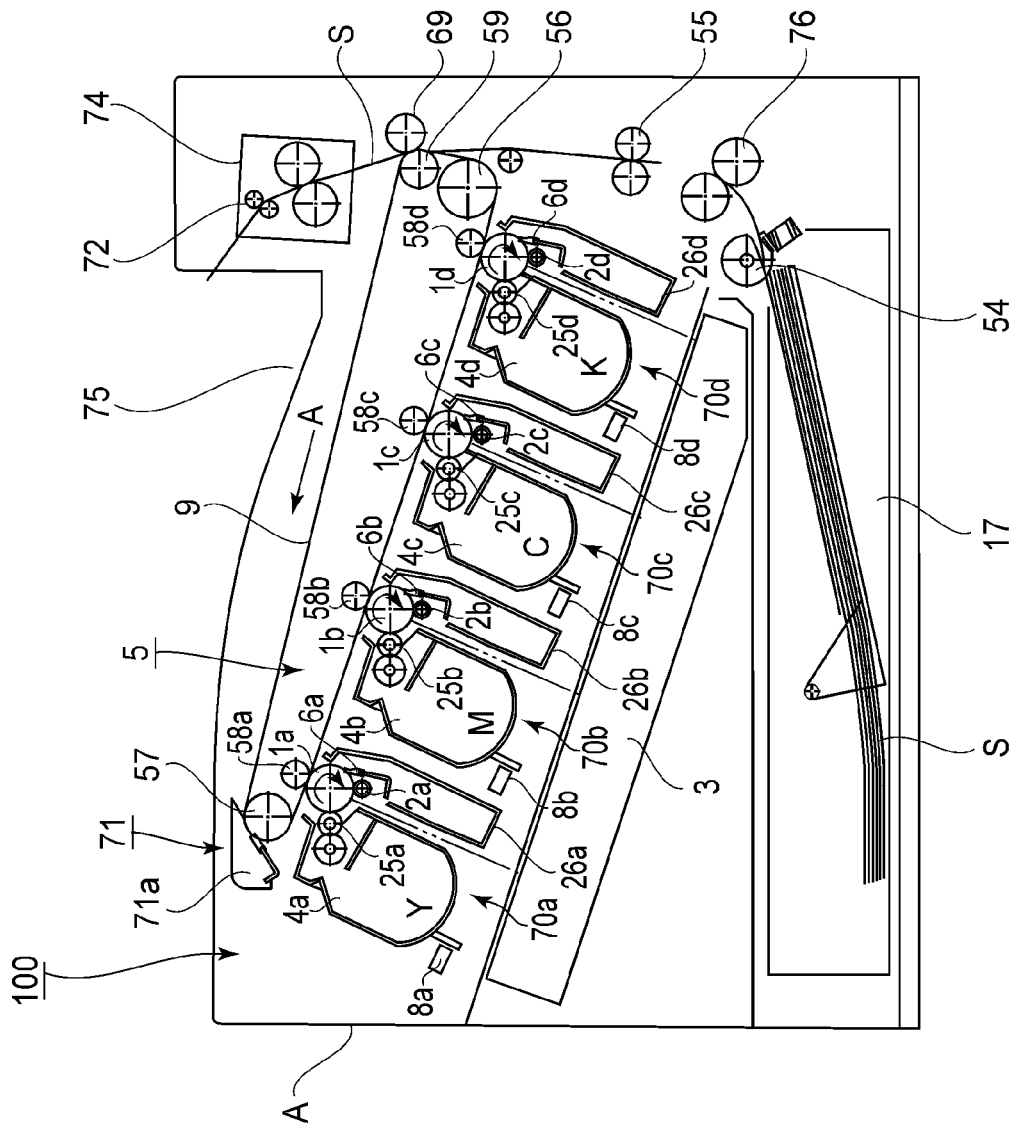
FIG. 2 is a schematic front view of a section of the image forming apparatus of Embodiment 1.

FIG. 2 is a front sectional view illustrating a structure of an image forming apparatus 100 according to this embodiment of the present invention. The image forming apparatus 100 of this embodiment is a four full-color laser beam printer (color electrophotographic image forming apparatus) using an electrophotographic image forming process. The image forming apparatus 100 is capable of forming an image on a sheet-like recording material (sheet of paper, OHP sheet, envelope, postcard, label or the like) S in accordance with electrical image information inputted to a control circuit portion (unshown) from a host apparatus (unshown) such as a personal computer or an image reader. The image forming apparatus 100 includes a main assembly which can be dismountably loaded with a plurality of process cartridges (cartridges). In this embodiment, four (first to fourth) cartridges 70 (70Y, 70M, 70C, 70K) containing different color developers are dismountably mounted to the main assembly 100A of the apparatus. Main assembly of the apparatus 100A is the structures of the image forming apparatus 100 excluding the cartridge 70.

The first cartridge 70Y contains a yellow (Y) color toner as a developer to form a Y color toner image on an electrophotographic photosensitive drum (drum) 1a. The second cartridge 70M contains a magenta (M) color toner as a developer to form a M color toner image on an electrophotographic photosensitive drum (drum) 1b. The third cartridge 70C contains a cyan (C) color toner as a developer to form a C color toner image on an electrophotographic photosensitive drum (drum) 1c. The fourth cartridge 70K contains a black (K) color toner as a developer to form a K color toner image on an electrophotographic photosensitive drum (drum) 1d.

Each cartridge 70 has a front side lateral side which is at an axial end of the drum, and a rear side which is at the other axial end of the drum. The first to fourth cartridges 70 are mounted by mounting members (unshown) to mounting portions arranged in a downward-sloping fashion from a left side to the right side in FIG. 2 within the main assembly 100A of the apparatus.

Each cartridge 70 is mounted by the mounting member (unshown) with its front side at the front side of the main assembly 100A of the apparatus and its rear side at the rear side of the apparatus. Each cartridge 70 is mounted through the front side of the main assembly of the apparatus 100A in a direction (mounting direction) from the front side toward the rear side, and is taken out in the opposite direction.

In this embodiment, each cartridge 70 is a so-called integral type process cartridge. More particularly, each cartridge 70 includes an electrophotographic photosensitive drum 1 (1a, 1b, 1c, 1d) as an image bearing member. In addition, around the drum 1, there are provided process means actable on the drum 1 in the cartridge. In this embodiment, the process means includes a charging roller 2 (2a, 2b, 2c, 2d), a developing roller 25 (25a, 25b, 25c, 25d) and a cleaning member 6 (6a, 6b, 6c, 6d).

The charging roller 2 electrically charges a surface of the drum 1 uniformly. The developing roller 25 visualizes a latent image formed on the drum 1 into a developed toner image. The cleaning member 6 removes residual toner remaining on the drum 1 after the toner image is transferred from the drum 1 onto the recording material S.

The main assembly of the apparatus 100A includes a scanner unit 3, below each cartridge 70, for forming the latent image on the drum 1 by selectively exposing the drum 1 to a beam modulated in accordance with image information.

Below the scanner unit 3, a cassette 17 accommodating the recording materials S is provided. The main assembly 100A of the apparatus is provided at the right side with a recording material feeding means to feed the recording material S upwardly through a secondary transfer roller 69 and a fixing portion 74. More particularly, there are provided a feeding roller 54 for separating and feeding the recording materials S one by one from the cassette 17, a pair of feeding rollers 76 for feeding the fed recording material S, and a pair of registration rollers 55 for synchronizing between recording material S with the latent image formed on the drum 1.

The main assembly of the apparatus 100A provided above cartridges 70 includes an intermediary transfer unit 5 as intermediary transferring means for transferring the toner image formed on the drums 1. The unit 5 includes a driving roller 56, a follower roller 57, primary transfer rollers 58 (58a, 58b, 58c, 58d) opposed to respective drums 1, and an opposing roller 59 opposed to the secondary transfer roller 69, and around these rollers a transfer belt 9 is stretched.

The transfer belt 9 makes a circulative movement so as to contact the respective drums 1, and a primary-transfer is carried out from the drum 1 onto the transfer belt 9 by application of a voltage to the primary transfer roller 58. The toner image is transferred onto the recording material S from the transfer belt 9 by a voltage application to the opposing roller 59 disposed in the transfer belt 9 and the secondary transfer roller 69.

For the image forming operation, the drum 1 is rotated at a peripheral speed in a clockwise direction indicated by the arrow. The transfer belt 9 is also rotated in the counterclockwise direction indicated by the arrow A at a speed corresponding to the peripheral speed of the drum 1. The drum 1 uniformly charged with charging roller 2 is exposed selectively by the scanner unit 3. By doing so, the electrostatic latent image is formed on the drum 1. The latent image is developed by the developing roller 25. In this manner, color toner images are formed on the respective drums 1. Through the above-described transfer means, a superimposing transferred toner image comprising Y, M and K images is formed on the transfer belt 9.

On the other hand, in synchronism with the image formation, the registration roller pair 55 feeds the recording material S to the secondary-transfer position where the opposing roller 59 and the secondary transfer roller 69 are opposed to each other through the transfer belt 9. By applying an image transfer bias voltage to the secondary transfer roller 69, the superimposing transferred toner image is secondary-transferred onto the recording material S from the transfer belt. By doing so, a color image (unfixed) is formed on the recording material S.

The recording material S having passed through the secondary-transfer position is fed from the transfer belt 9 and is introduced to the fixing portion 74, where the toner image is fixed by heat and pressure. Thereafter, the recording material S is discharged to a discharging portion 75 by discharging rollers 72. The fixing portion 74 is disposed at an upper portion of the main assembly of the apparatus 100. Designated by reference numeral 71 is a cleaning device for the transfer belt 9 to remove untransferred toner in the secondary transfer from the transfer belt 9 and accommodate it in a container 71a.

(Cartridge)

Figure 3:
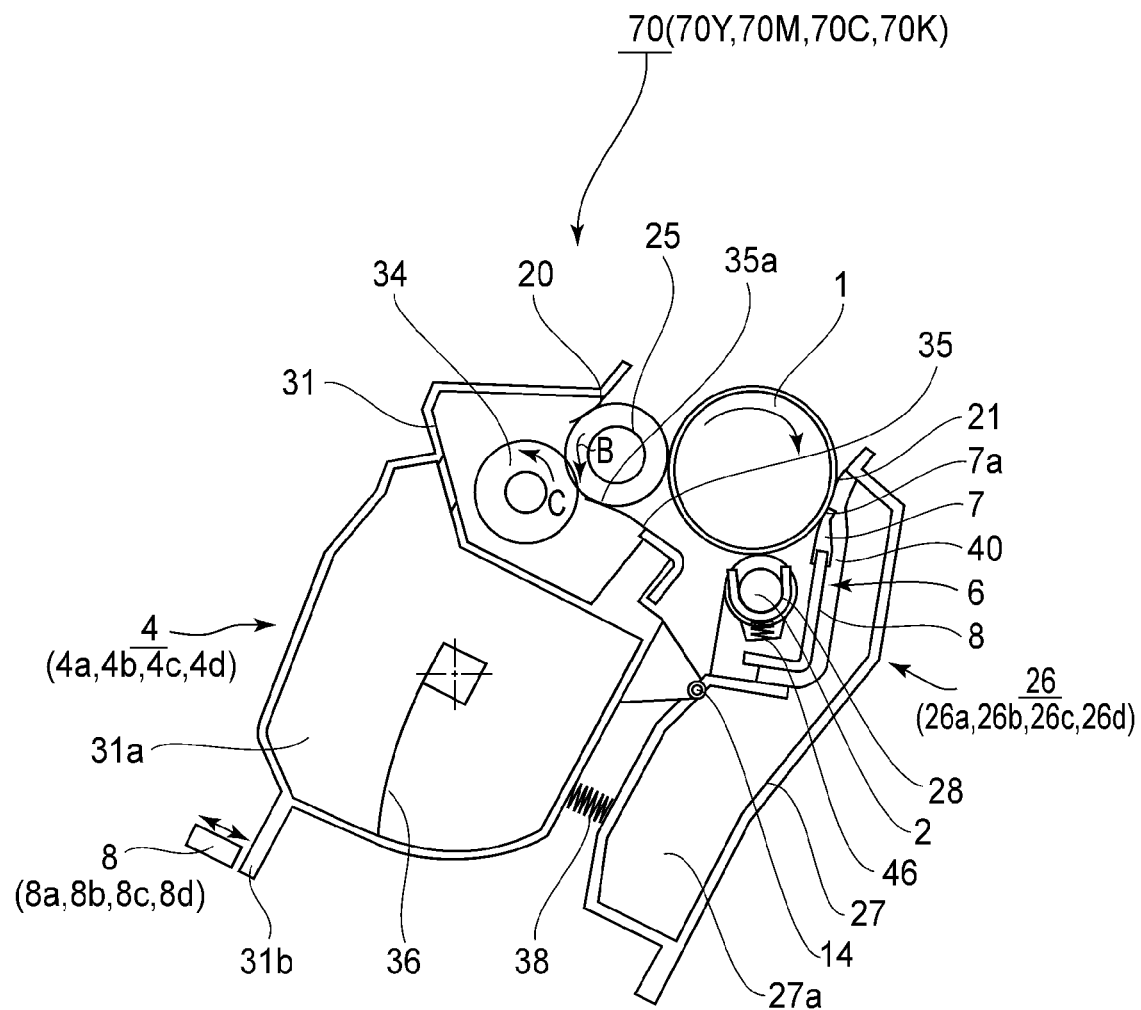
FIG. 3 is a schematic sectional view of the cartridge.

FIG. 3 is a main section of the cartridge 70 accommodating the toner. The first cartridge 70Y accommodating the Y color toner, the second cartridge 70M accommodating the M color toner, the third cartridge 70C accommodating the C color toner, and the cartridge 70K accommodating the K color toner have the same structures.

The cartridge 70 comprises a cleaning unit 26 (26a, 26b, 26c, 26d) and a developing unit 4 (4a, 4b, 4c, 4d). The cleaning unit 26 includes (in a cleaning frame 27) the drum 1, the charging roller 2 and the cleaning member 6. The developing unit 4 includes the developing roller 25.

The developing unit 4 is connected with the cleaning unit 26 swingably about a hinge portion 14. In a free state, the developing unit 4 is urged about the hinge portion 14 in a direction to contact the developing roller 25 to the drum 1 at a predetermined urging force by an urging force of an urging member 38.

In a state that the cartridge 70 is mounted to the main assembly of the apparatus 100A and the image forming operation is carried out, the developing unit 4 is freed so that the developing roller 25 contacts the drum 1. During non-image-formation, an urged portion 31b of the developing unit 4 is urged against the urging force of the urging member 38 by an urging member 8 (8a, 8b, 8c, 8d) provided in the main assembly 100A of the apparatus. By this, the developing unit 4 is held in such a state that the developing roller 25 is spaced from the drum 1 (rest state of the developing roller 25).

In the cleaning unit 26, around the drum 1, the charging roller 2 and the cleaning member 6 are provided, as described above. The cleaning member 6 comprises an elastic member 7 of rubber blade, and a cleaning supporting member 8. A free end portion 7a of the rubber blade 7 is contacted to the drum 1 counterdirectionally relative to the rotational moving direction of the drum 1. The residual toner removed from the surface of the drum 1 by the cleaning member 6 falls into a removed toner chamber 27a. A receptor sheet 21 is contacted to the drum 1 to prevent leakage of the removed toner from the removed toner chamber 27a. Designated by 40 is a side sealing member.

A driving force is transmitted to the cleaning unit 26 from a main assembly driving motor (unshown) as a driving source to rotate the drum 1 for the image forming operation. The charging roller 2 is rotatably mounted to the cleaning unit 26 by a charging roller bearing 28, and is pressed toward the drum 1 by a charging roller pressing member 46.

The developing unit 4 includes the developing roller 25 which is rotatable in contact with the drum 1 in the direction of an arrow B, a developing device frame 31 supporting the developing roller 25, and a developing blade 35. The developing roller 25 is supported rotatably by the developing device frame 31 through a front bearing (unshown) and a rear bearing (unshown) of the developing device frame 31.

To a circumferential surface of developing roller 25, a toner supplying roller 34 rotatable in the direction of an arrow C in contact with the developing roller 25, and the developing blade 35 for regulating the toner layer on the developing roller 25 by a free end portion 35a thereof are provided.

A blow preventing sheet 20 as a development contact sheet is provided to prevent the toner from the developing device frame 31 contacted to the developing roller 25. The developing device frame 31 is provided with a toner accommodating chamber 31a including a toner feeding member 36 which stirs the accommodated toner and which feeds the toner to the toner supplying roller 34.

(Cartridge Exchanging Type)

The developer accommodated in the developing units 4 of the first-fourth cartridges 70 is consumed with the image formation. A detecting means (unshown) for detecting a remaining amount of developer is provided in each of the cartridges. A control circuit portion compares the remaining amount detected by the detecting means with a preset cartridge lifetime forenotice level and/or with a threshold for lifetime warning.

As for the cartridge with which the remaining amount is smaller than the threshold, a lifetime forenotice or lifetime warning is displayed for the cartridge on a display portion (unshown). This promotes the user to prepare a replacement cartridge or to promote the user to replace the cartridge, thus maintaining the quality of the output images.

For exchange of the cartridge, in the image forming apparatus 100 of this embodiment, the front side door of the main assembly of the apparatus 100A is opened (front access).

Figure 4:
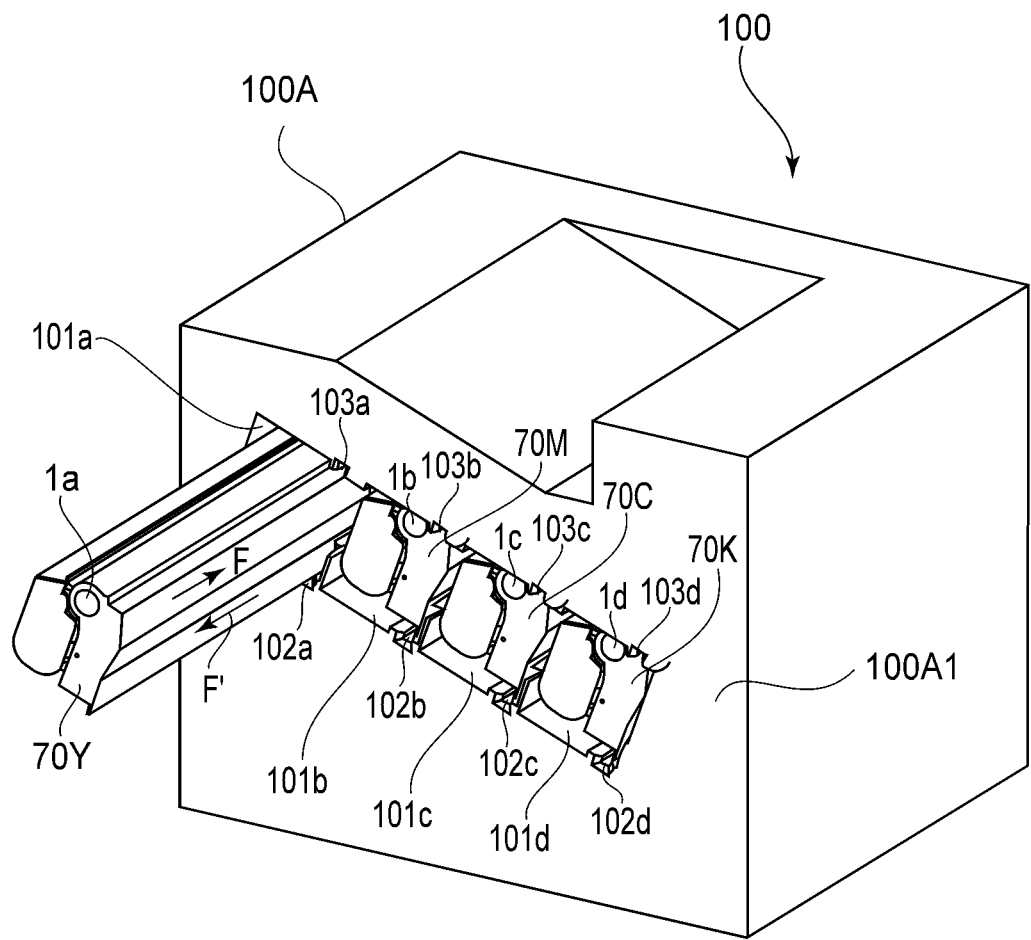
FIG. 4 is an illustration of mounting of the cartridge to the main assembly of the image forming apparatus.

As shown in FIG. 4, a front side frame 100A1 which is a part of the skeleton of main assembly 100A of the apparatus is provided an opening 101 (101a, 101b, 101c, 101d) for passing the cartridge 70. Through the opening 101, the cartridge 70 is inserted to the cartridge mounting portion in the main assembly of the apparatus 101A, and the cartridge 70 is taken out of the cartridge mounting portion.

In the front side of the main assembly 100A of the apparatus, the front side door (unshown) is provided. The opening 101 is closed by closing the front side door. In addition, by opening the front side door, the opening 101 is opened as shown in FIG. 4. Through the opening 101, the cartridge 70 is inserted and taken out by front access fashion.

In this embodiment, the cartridge 70 is inserted into the opening 101 in the direction parallel with the rotational axis direction of the drum 1 (arrow F in FIG. 4) with the rear side of the cartridge 70 at the leading side. In the description of this embodiment, the upstream side with respect to the inserting direction of the cartridge 70 is "front side", and the downstream side is "rear side".

In the mounting portion of the cartridge in the main assembly of the apparatus 100, an upper guide portion 103 (103a, 103b, 103c, 103d) as a first main assembly guide portion is provided in the upper side to guide the mounting to the main assembly. In the lower side, a lower guide portion 102 (102a, 102b, 102c, 102d) as a second main assembly guide portion is provided.

The upper guide portion 103 and the lower guide portion 102 extend along an inserting direction F of cartridge 70. In the insertion into the main assembly of the apparatus 100A, the rear side of cartridge 70 is carried on the front side of lower guide portion 102, and the cartridge 70 is moved along the upper guide portion 103 and lower guide portion 102 in the inserting direction F. In addition, the cartridge 70 is taken out from the main assembly 100A of the apparatus in the direction F'.

In this manner, the cartridge 70 is replaced with a fresh cartridge, and then the front side door is closed. By an operation of an interrelating mechanism (unshown) interrelating with the closing movement of the front side door, the cleaning unit 26 of the cartridge 70 inserted in the cartridge mounting portion is positioned to the positioning portion (unshown) of the main assembly 100A of the apparatus.

In addition, a drive outputting portion (unshown) of the main assembly 100A of the apparatus is engaged with a driving force receiving portion (unshown) of the cartridge B. Also, an electrical contact portion (unshown) of the cartridge 70 is electrically conducted with an electrical contact portion (unshown) of the main assembly 100A of the apparatus. In this state, the image forming apparatus 100 is capable of carrying out the image forming operation.

On the other hand, when the front side door is opened, by the operation of the interrelating mechanism interrelating with the opening movement of the front side door, the positioning of the cleaning unit 26 relative to the positioning portion of the main assembly 100A of the apparatus is released. In addition, the driving force receiving portion of cartridge B is disengaged from the drive outputting portion of the main assembly 100A of the apparatus. In this state, take-out of the cartridge 70 is enabled.

(Erroneous Insertion Prevention Structure)

In this embodiment, an erroneous insertion prevention structure is provided to permit only a proper cartridge 70 to be mounted and to prevent improper cartridges from being mounted.

Figure 1:
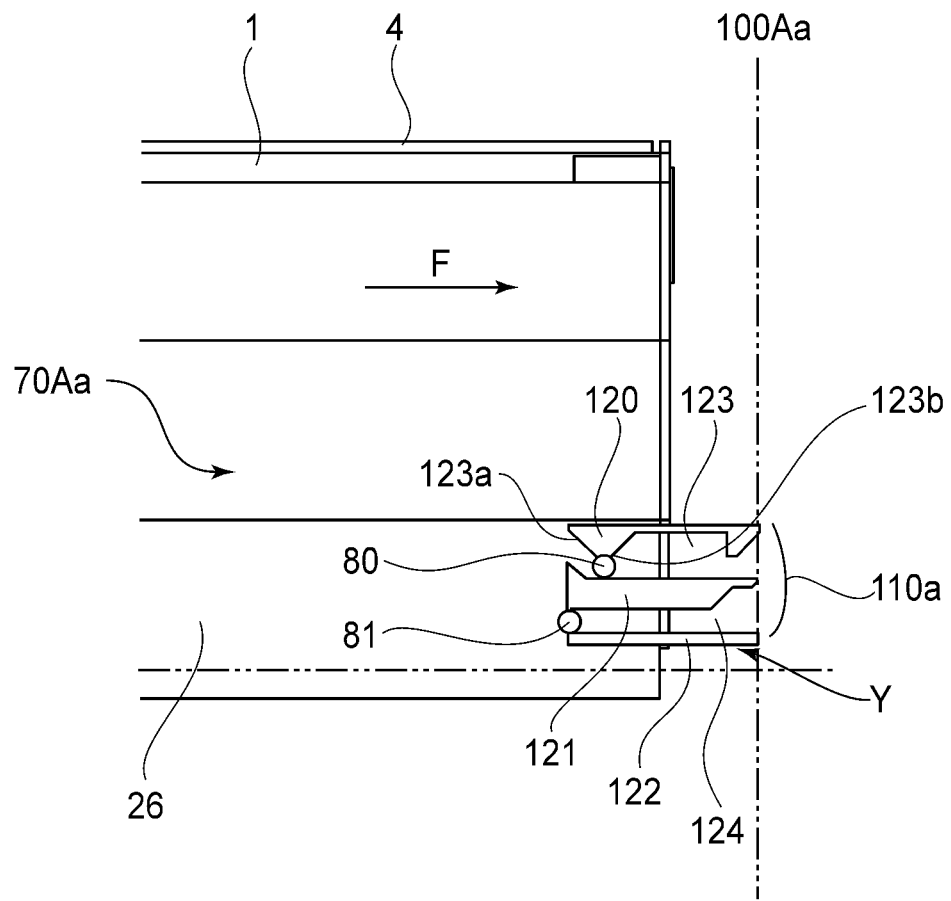
FIG. 1 is a schematic illustration of a movable tray provided in main assembly of the image forming apparatus, a first boss and a second boss provided on a cartridge, according to Embodiment 1 of the present invention.
Figure 5:
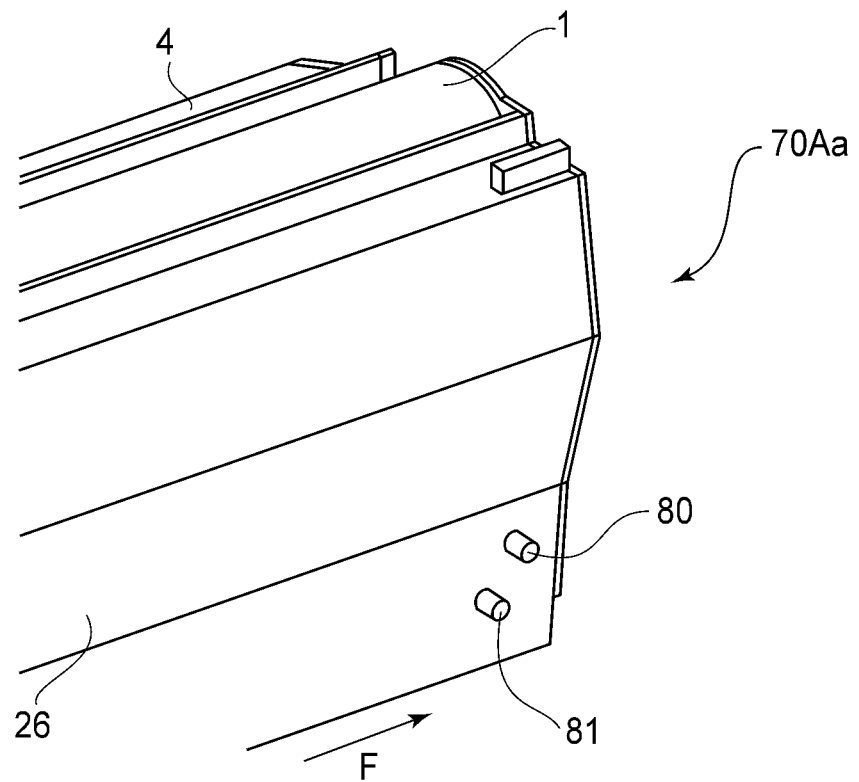
FIG. 5 is an illustration of the first and second bosses provision on the cartridge.
Figure 18:
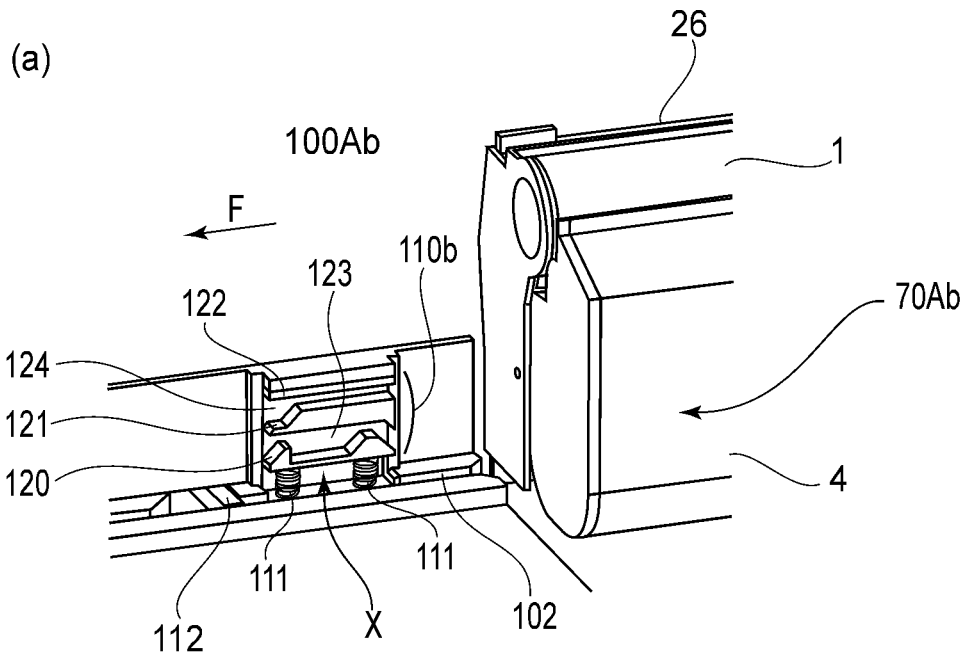
FIG. 18 is an illustration of structures of a movable carriage provided in the main assembly of the image forming apparatus having a similar effect and an insertion guide portion, in the structure of Embodiment 1.
Figure 18:
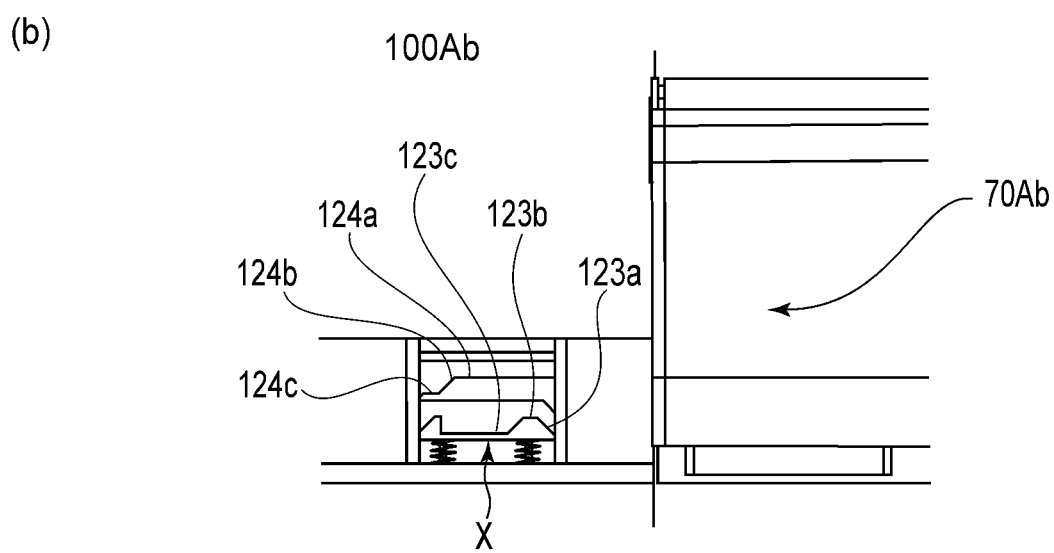

Here, particular main assemblies of the apparatus are apparatus main assemblies 100Aa and 100Aa', and proper cartridges therefor are cartridges 70Aa and 70Aa', respectively. Referring to FIGS. 1, 5 and FIG. 18, Embodiment 1 will be described.

1) A Case of the Apparatus Main Assembly 100Aa and the Cartridge 70Aa:

The description will first be made as to the case combination of the apparatus main assembly 100Aa and the cartridge 70Aa which is proper to the apparatus main assembly 100Aa.

FIG. 1 is a general arrangement of a movable carriage 110a provided in the apparatus main assembly 100Aa, and a first boss 80 and a second boss 81 which are provided on the cartridge 70Aa. FIG. 5 illustrates the first boss 80 and the second boss 81 provided on the cartridge 70Aa, and FIG. 6 illustrates the movable carriage 110a provided in the apparatus main assembly 100Aa.

Figure 6:
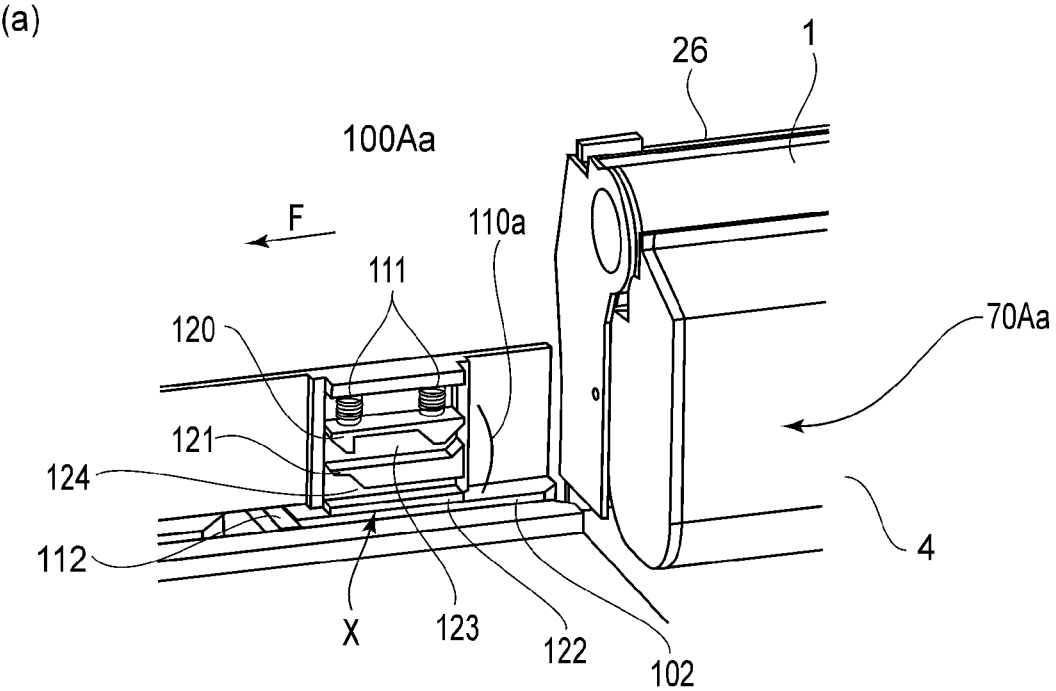
FIG. 6 is an illustration of a movable tray provided in the main assembly of the image forming apparatus and an insertion guide portion, in Embodiment 1.
Figure 6:
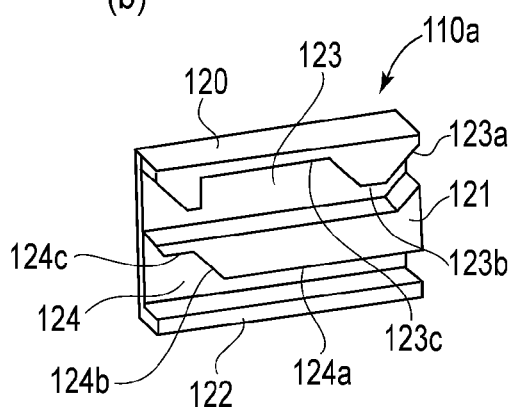
Figure 6:
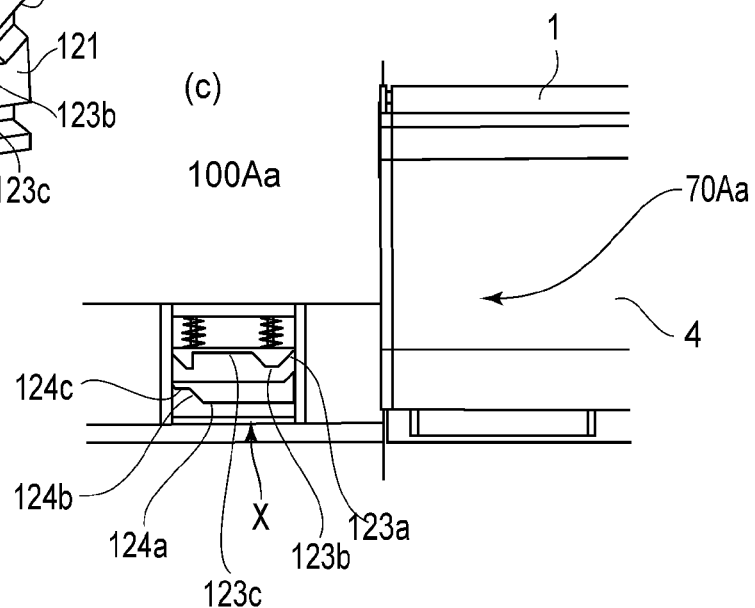

Referring to FIGS. 1, 5 and 6, the cartridge 70Aa is provided with the first boss 80 in a downstream side with respect to the cartridge inserting direction F and with the second boss 81 in the upstream side of the first boss 80 with respect to the cartridge inserting direction F.

The apparatus main assembly 100Aa is provided with the lower guide 102 for guiding the insertion of the cartridge 70Aa, a movable carriage 110a, and an urging spring 111 for urging the movable carriage 110a to a predetermined position. The movable carriage 110a is movably between a first position X (free) in which it is engaged with the first and second bosses 80 and 81 of the cartridge 70Aa upon insertion of the cartridge, and a second position Y different from the first position X.

The movable carriage 110a includes an upper guiding portion 120, a middle guiding portion 121 and a lower guiding portion 122. The upper portion 120 and the middle guiding portion 121 define a first insertion guide portion 123 therebetween. The middle guiding portion 121 and the lower portion 122 defines a second insertion guide portion 124 therebetween.

The first insertion guide portion 123 has a labyrinths configuration constituted by an inclined surface 123a, a first flat surface portion 123b, a concave flat surface portion 123c and so on and has a size engageable with the first boss 80.

The second insertion guide portion 124 has a labyrinth configuration constituted by a first flat surface portion 124a, an inclined surface 124b, a second flat surface portion 124c and so on and has a size engageable with the second boss 81.

As shown in part (a) of FIG. 6, the apparatus main assembly 100Aa is provided with a stopper member 112 movable in interrelation with the movement of movable carriage 110a. An interrelating mechanism for interrelating the movable carriage 110a and the stopper member 112 with each other will be described hereinafter.

Parts (a) and (c) of FIG. 6 show a free state of the movable carriage 110a. In the free state, the movable tray or carriage 110a is urged by an urging force of the urging spring 111 disposed on the upper side of upper portion 120 such that a bottom surface of the lower portion 122 abuts to the top surface of the lower guide 102. Such a position of the movable carriage 110a is a first position X. On the other hand, FIG. 1 shows the movable carriage 110a is placed in the second position Y (different from the first position X) by the engagement with the first and second bosses 80 and 81. In this state, the movable carriage 110a is at a position higher than first position X against the urging force of the urging spring 111.

Figure 7:
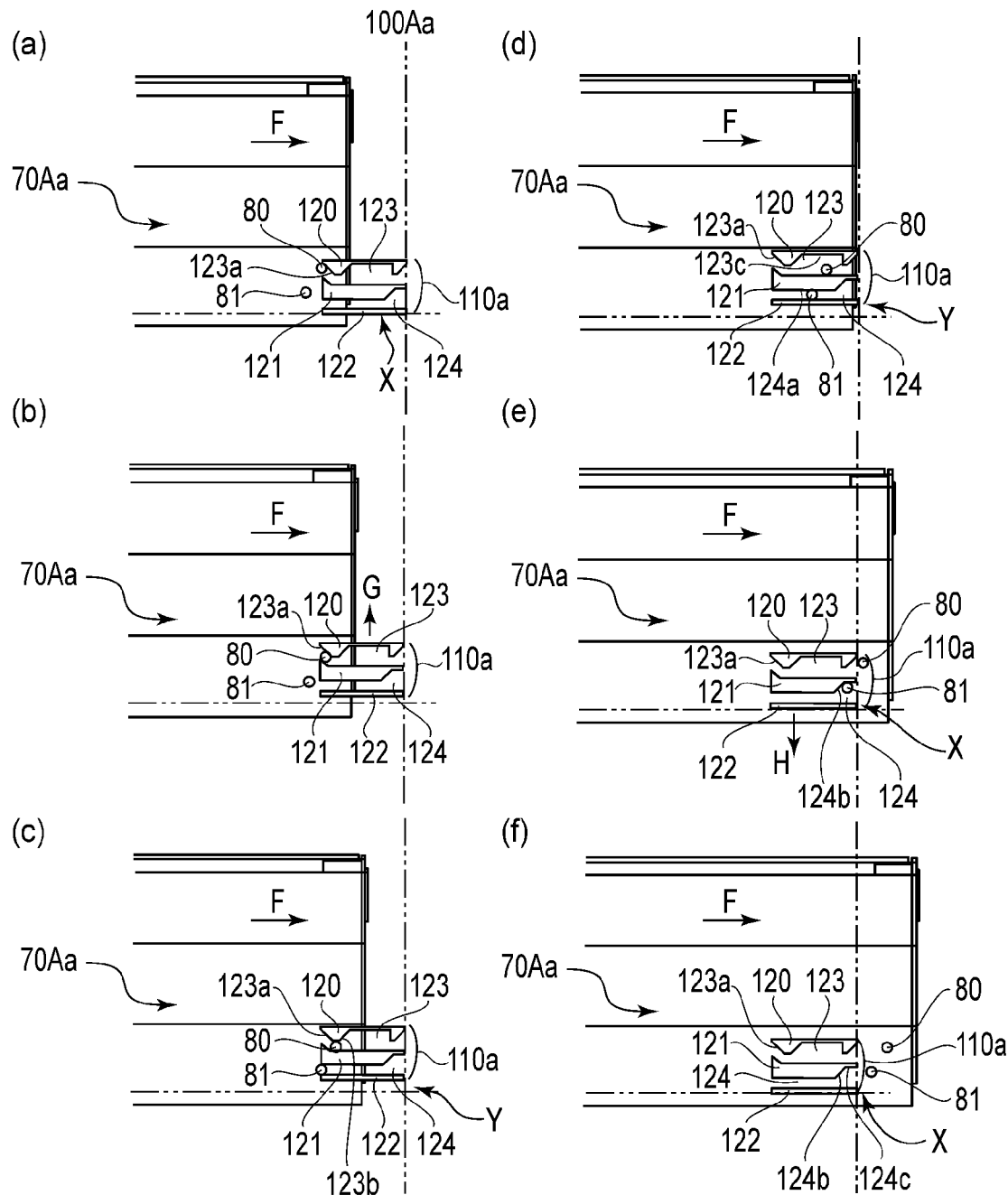
FIG. 7 is an illustration of an erroneous insertion prevention structure when a proper cartridge is inserted into the main assembly of the image forming apparatus, according to Embodiment 1.

Referring to parts (a)-(f) of FIG. 7, the description will be made as to a relationship between the first boss 80 and second boss 81 of the cartridge 70Aa and the movable carriage 110a provided in the device 100Aa when the proper cartridge 70Aa is inserted. In the parts (a)-(f) of FIG. 7, the left side is the front side of the apparatus main assembly 100Aa and the right side is the rear side.

(a) before insertion of the cartridge 70Aa, the movable carriage 110a is in the free state, that is, in the first position X. When the cartridge 70Aa moves in the inserting direction F, the first boss 80 provided on the cartridge 70Aa is brought into engagement with the first insertion guide portion 123 provided in the movable carriage 110a.

(b) when the cartridge 70Aa moves further in the inserting direction F, the first boss 80 abuts to the inclined surface 123a provided at the entrance of the first insertion guide portion 123, by which the movable carriage 110a receives a force from the cartridge 70a.

And, the movable carriage 110a having been urged down by the urging spring 111 moves up against the urging force of the urging spring 111 in the direction of an arrow G.

(c) when the cartridge 70Aa further movement in the inserting direction F, the first boss 80 reaches the first flat surface portion 123b of the first insertion guide portion 123 to raise movable carriage 110a to the second position Y. Then, the second insertion guide portion 124 of the movable carriage 110a moved to the second position Y becomes engageable with the second boss 81 of the cartridge 70Aa.

(d) when the cartridge 70Aa further moves in the inserting direction F, the second boss 81 engaged and the second insertion guide 124 contacts the first flat surface portion 124a of second insertion guide portion 124. By this, the cartridge 70Aa is inserted in the state that the movable carriage 110a is held at the second position Y.

(e) when the cartridge 70Aa further moves in the inserting direction F, the second boss 81 of the cartridge 70Aa reaches the inclined surface 124b of the second insertion guide.

Then, the movable carriage 110a moves down (arrow H) with the insertion of the cartridge 70Aa to return to the first position X.

(f) the cartridge 70Aa is further inserted sufficiently in the inserting direction F. In this manner, the proper cartridge 70Aa can be inserted into the device 100Aa.

Referring to parts (a)-(f) of FIG. 8, the description will be made as to a relationship between the first boss 80 and second boss 81 of the cartridge 70Aa and the movable carriage 110a provided in the device 100Aa when the proper cartridge 70Aa is taken out. That is, the relationship when the cartridge 70Aa placed in the cartridge mounting portion of apparatus main assembly 100Aa is moved from the rear side to the front side of the opening 101 will be described.

(a) in the state that the cartridge 70Aa has been sufficiently inserted into the apparatus main assembly 100Aa, the movable carriage 110a is in the free state, that is, in the first position X.

(b) when the cartridge 70Aa moves in the dismounting direction F', the second boss 81 is brought into engagement with the second insertion guide portion 124 to abut to a second inclined surface 124b of the insertion guide portion 124.

(c) when the cartridge 70Aa moves further in the dismounting direction F', the second boss of the cartridge 70Aa abuts to the second inclined surface 124b of the movable carriage 110a. By this, the movable carriage 110a having been kept urged to the first position X by the urging spring 111 is moved up (arrow G) and raised to the second position Y by receiving a force from the cartridge 70Aa. By this, the first boss 80 of the cartridge 70Aa is engaged with the insertion guide portion 123 of the movable carriage 110a.

(d) when the cartridge 70Aa further moves in the dismounting direction F', the second boss 81 engaged with the second insertion guide 124 contacts the first flat surface portion 124a of the second insertion guide portion 124. By this, the cartridge 70Aa is taken out in the state that the movable carriage 110a is held in the second position Y.

When the cartridge 70Aa further moves in the dismounting direction F', the first boss 80 reaches the position of the inclined surface 123a of the first insertion guide of the movable carriage 110a. Then, the movable carriage 110a moves down in the direction of an arrow H in accordance with the taking out motion of the cartridge 70Aa.

The cartridge 70Aa can be taken out by moving the cartridge 70Aa further in the dismounting direction F'.

2) Case of Apparatus Main Assembly 100Aa and Cartridge 70Aa':

First, the description will be made as to a mounting portion different from the above-described mounting portion (apparatus main assembly 100Aa'), and the cartridge 70Aa' which is proper to the apparatus main assembly 100Aa'.

Figure 9:
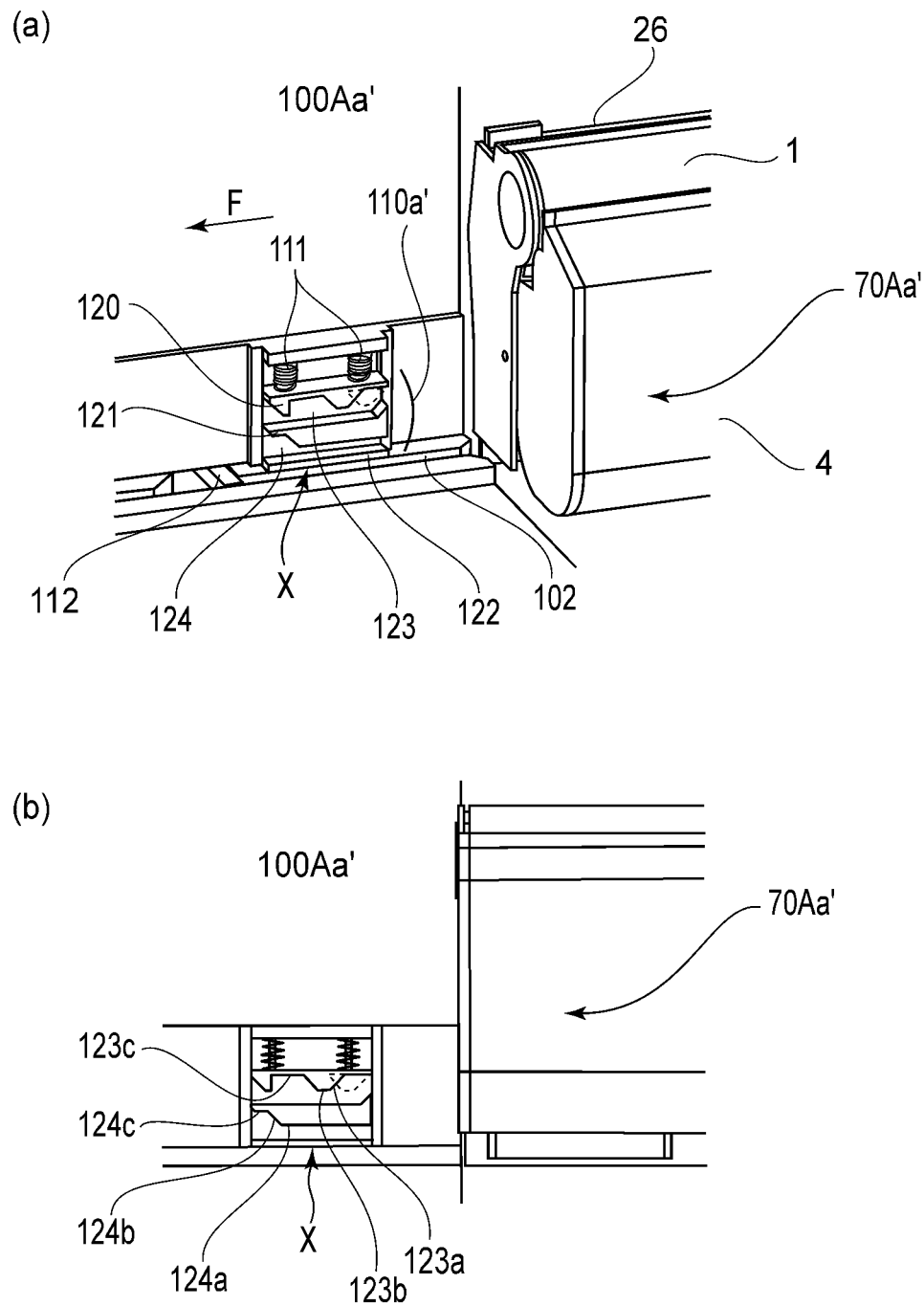
FIG. 9 is an illustration of the movable tray provided in the main assembly, and an insertion guide portion according to Embodiment 1.

As shown in FIG. 9, in the apparatus main assembly A100Aa', the positions of the inclined surface 123a and the first flat surface portion 123b of the movable carriage 110a' are different from those of the previous apparatus main assembly A100Aa. The broken lines show the positions of the inclined surface 123a and the first flat surface portion 123b of the above-described apparatus main assembly A100a'.

Figure 10:
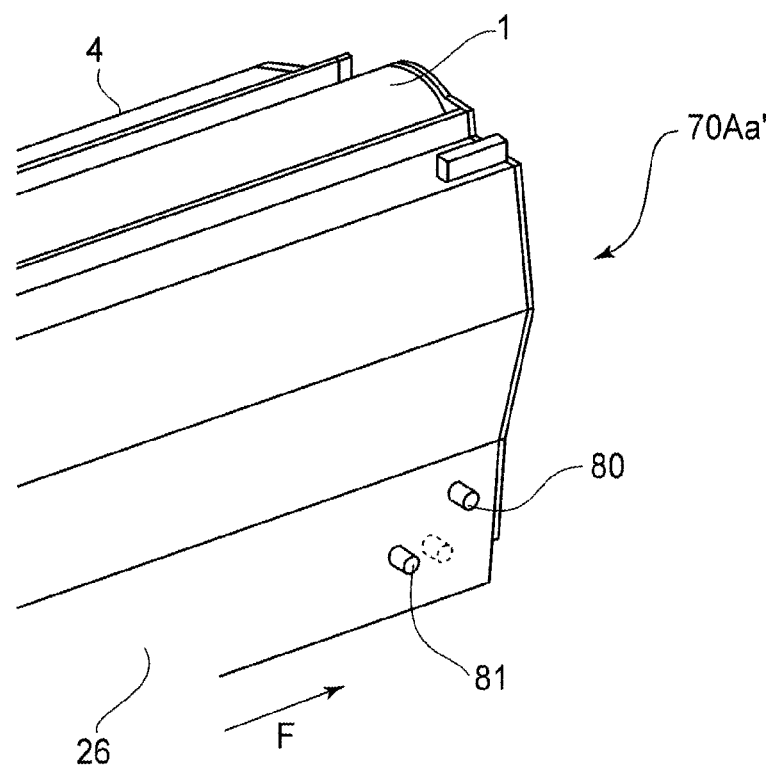
FIG. 10 is an illustration of first and second bosses provided on the process cartridge according to Embodiment 1.

As shown in FIG. 10, the position of the second boss 81 of the cartridge 70Aa' is different from that of the second boss 81 of the above-described cartridge 70Aa indicated by broken lines. More particularly, the distance between the first boss 80 and the second boss 81 are different.

The description will be made as to the case where the cartridge 70Aa' (improper) is inserted into the device 100Aa.

Referring to parts (a)-(c) of FIG. 11, the description will be made as to a relationship between the first boss 80 and second boss 81 of the cartridge 70Aa' and the movable carriage 110a provided in the device 100Aa when the cartridge 70Aa' (improper) is inserted.

(a) before insertion of the cartridge 70Aa, the movable carriage 110a is in the free state, that is, in the first position X. When the cartridge 70Aa' moves in the inserting direction F, the first boss 80 provided on the cartridge 70Aa' is brought into engagement with the first insertion guide portion 123 provided in the movable carriage 110a.

(b) when the cartridge 70Aa' moves further in the inserting direction F, the first boss 80 abuts to the inclined surface 123a provided at the entrance of the first insertion guide portion 123, by which the movable carriage 110a receives a force from the cartridge 70a'. And, the movable carriage 110a having been urged down to the first position X by the urging spring 111 moves up toward the second position Y against the urging force of the urging spring 111 in the direction of an arrow G.

(c) when the cartridge 70Aa' further moves in the inserting direction F, the first boss 80 of the cartridge 70Aa' moves to the flat surface portion 123c of first insertion guide 123.

By this, the movable carriage 110a moves down (arrow H) to the first position X. Therefore, the second boss 81 of the cartridge 70Aa' cannot engage with the insertion guide portion 124 of the movable carriage 110a. That is, the erroneous insertion of the improper cartridge 70Aa' into the apparatus main assembly 100Aa is prevented.

3) Case of Apparatus Main Assembly 100Aa' and Cartridge 70Aa:

The description will be made as to the case where a cartridge 70a (improper) is inserted into the apparatus main assembly 100Aa'. Referring to parts (a)-(b) of FIG. 12, the description will be made as to a relationship between the first boss 80 and second boss 81 of the cartridge 70Aa and the movable carriage 110a' provided in the device 100Aa' when the cartridge 70Aa (improper) is inserted.

(a) before insertion of the cartridge 70Aa, the movable carriage 110a' of the apparatus main assembly 100Aa' is in the free state, that is, in the first position X. When the cartridge 70Aa moves in the inserting direction F, the first boss 80 provided on the cartridge 70Aa is brought into engagement with the first insertion guide portion 123 provided in the movable carriage 110a'.

(b) when the cartridge 70Aa moves further in the inserting direction F, the second boss 81 provided in the cartridge 70Aa abuts to the flat surface portion 121d of middle guiding portion 121 of the movable carriage 110a'.

By this, the second boss 81 of the cartridge 70Aa cannot engage with the insertion guide portion 124 of the movable carriage 110a' which is still in the first position X. That is, the erroneous insertion of the cartridge 70a (improper) into the apparatus main assembly 100Aa' is prevented.

As described in the foregoing, the cartridges 70Aa' and 70Aa which are not proper to the apparatus main assembly portions 100Aa and 100Aa' are prevented from being inserted into the main assembly of the apparatus.

Figure 13:
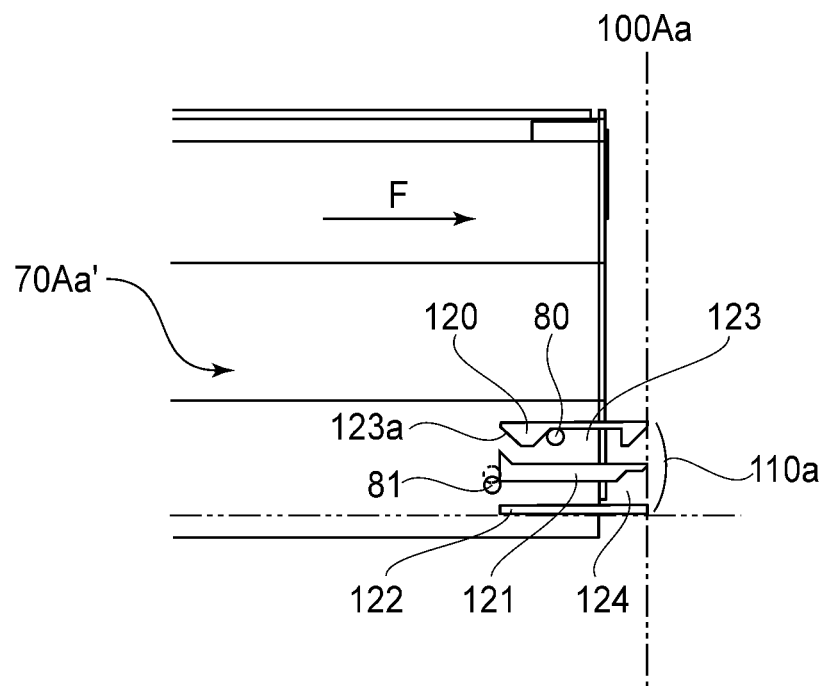
FIG. 13 is an illustration of a state in which a position of the second boss is deviated relative to the movable tray when an improper cartridge is inserted into the main assembly of the image forming apparatus, according to Embodiment 1.

However, depending on dimensional variations of the first and second bosses 80 and 81 of the cartridge 70Aa' and/or the insertion guide portions 123 and 124 of the device 100Aa, the following situation may arise. As shown in FIG. 13, the second boss 81 may be offset from the nominal dimension (broken line), relative to the second insertion guide portion 124.

When the positional relation between the second boss 81 and the second insertion guide portion 124 is as shown in FIG. 13, the middle guiding portion 121 of the device 100Aa may ride on the second boss 81, by which the improper cartridge 70Aa' may be inserted.

Figure 14:
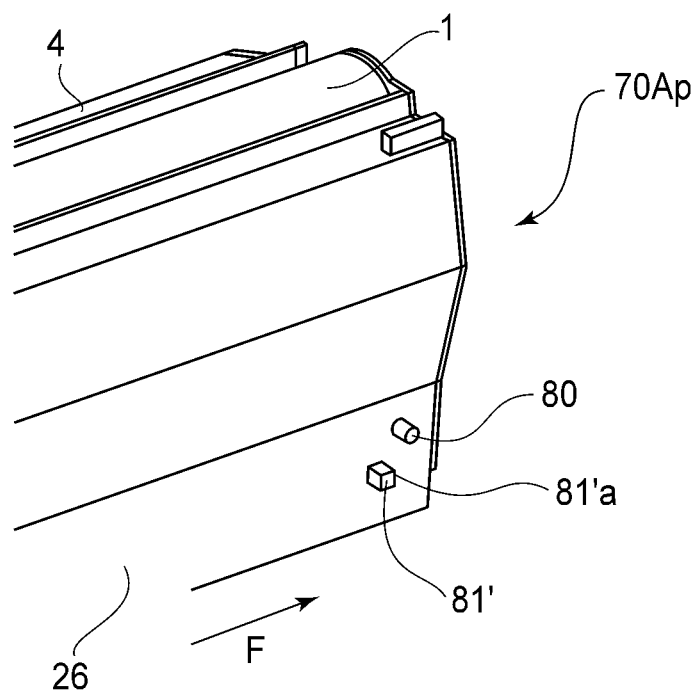
FIG. 14 is an illustration of the first and second bosses provided on the cartridge for stably preventing the erroneous insertion according to Embodiment 1.
Figure 15:
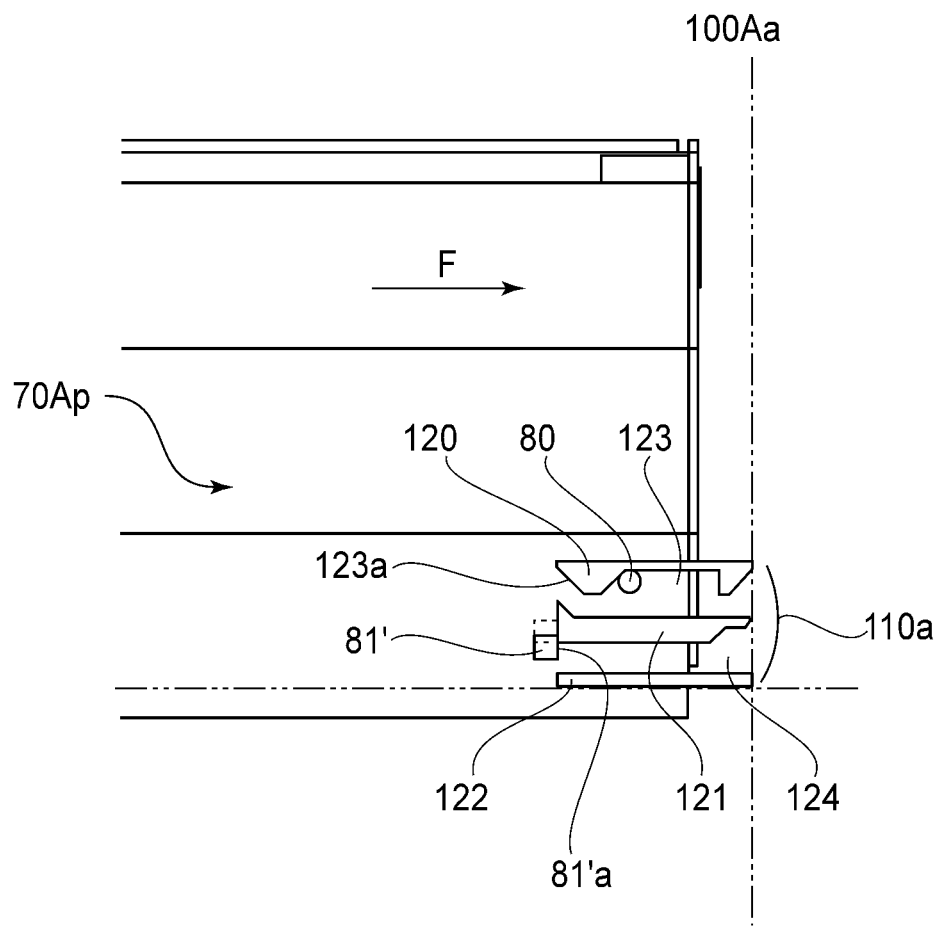
FIG. 15 is an illustration of operation of erroneous insertion prevention structure, When the cartridge including a boss configuration according to Embodiment 1 is inserted into the main assembly of the image forming apparatus.

In view of this, as shown in FIG. 14, the second boss 81' provided on the cartridge 70Ap is given a configuration having at least one flat surface 81'a facing in the cartridge inserting direction. By doing so, as shown in FIG. 15, the second boss 81' abuts face-to-face to the middle guiding portion 121.

Thus, even if a position of the second boss relative to the second insertion guide portion 124 is deviated due to the dimensional variations of the first and second bosses 80 and 81 and/or the insertion guide portions 123 and 124, the second boss 81' abuts face-to-face to the middle guiding portion 121. Therefore, the insertion of an improper process cartridge 70p is stably prevented from being inserted.

Figure 16A:
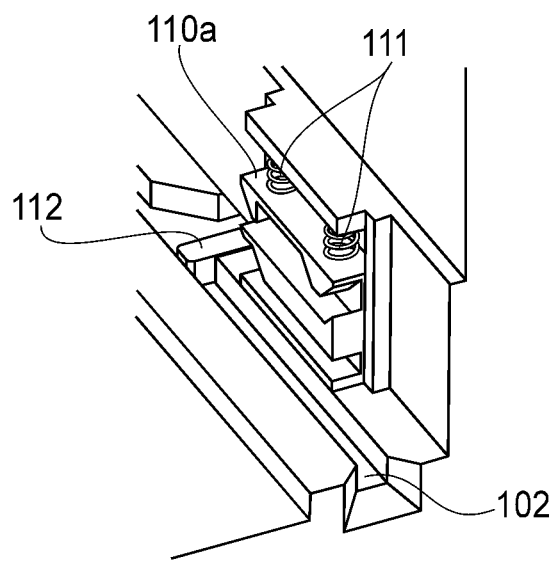
FIG. 16A is an illustration of an operation of a stopper member when a proper cartridge is inserted into the main assembly of the image forming apparatus in Embodiment 1.
Figure 16A:
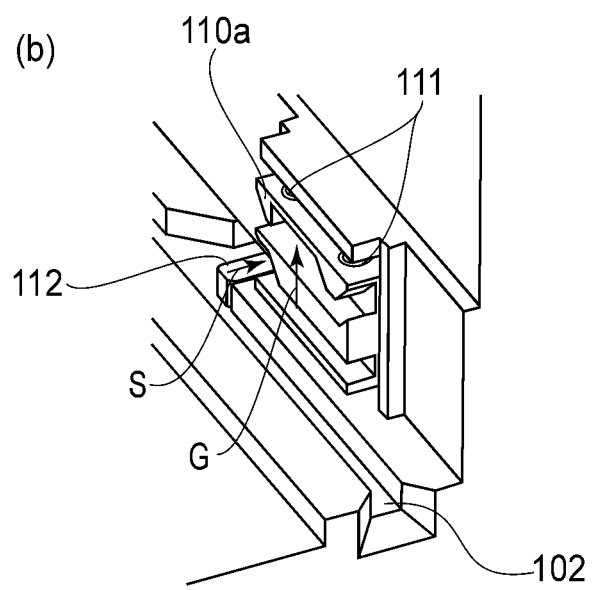

Further, as shown in (a) of FIG. 16A, in the device 100Aa, in the state that the cartridge 70Aa is not inserted, the stopper member 112 projects to the position where it is abutted by the cartridge 70Aa in the lower guide portion 102.

As shown in part (b) of FIG. 16A, by the insertion of the cartridge 70Aa, the movable carriage 110a is moved up (arrow G) by the first and second boss 80 and 81. Then, the stopper member 112 connected with the movable carriage 110a through a cam and a link retracts in the direction of an arrow S. This enables the insertion of the cartridge 70Aa.

Figure 16B:
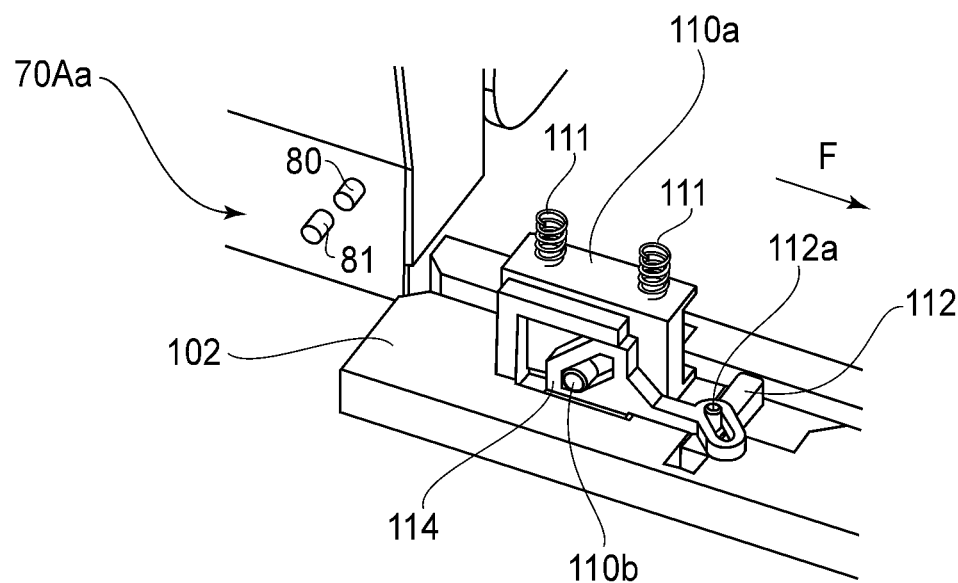
FIG. 16B is an illustration of the operation of an interrelating structure between the movable tray and the stopper member.
Figure 16B:
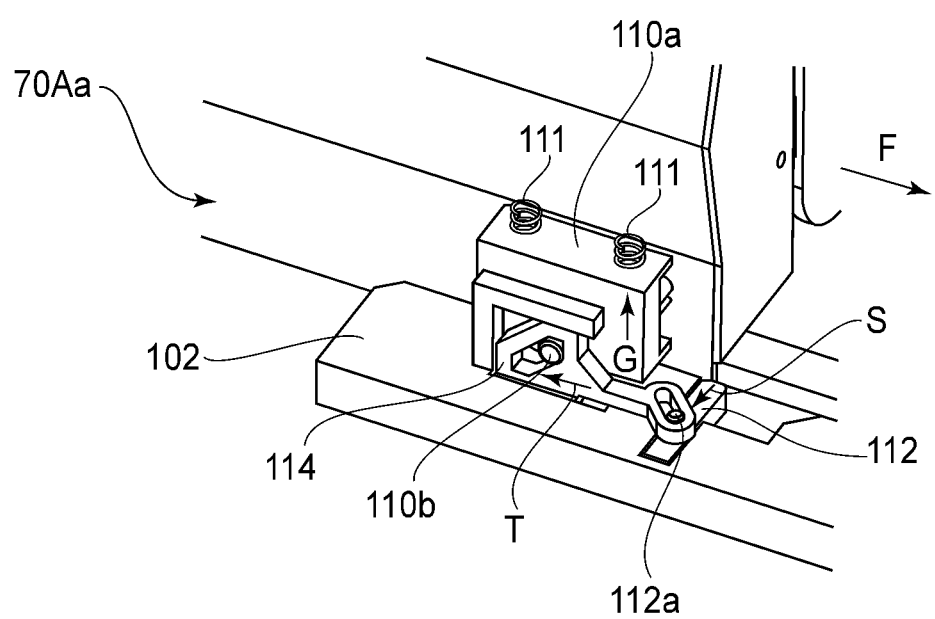

Parts (a) when (b) of FIG. 16B show an example of the structure for operating the stopper member 112. A slider link 114 having a cam profile is connected with both of a projection 110a provided on the movable carriage 110a and a projection 112a provided on the stopper member 112.

Part (a) of this Figure shows the state in which the movable carriage 110a is in the first position X. In this state, the stopper member 112 is in the projection where it is abutted by the cartridge 70Aa.

In the state of (a), when the cartridge 70Aa is inserted into the apparatus main assembly 100Aa, the movable carriage 110a is moved up (arrow G) to the state shown in (b), by the first and second bossed 80 and 81. That is, by the movement of the movable carriage 110a to the second position Y, the slider link 114 is moved in the direction of an arrow T along the cam profile. With this, the stopper member 112 is also moved in the direction of an arrow S along the cam profile. That is, the stopper member 112 retracts to the position not interfering the cartridge 70Aa which is being inserted.

On the contrary, when the movable carriage 110a moves down, the slider link 114 moves in the direction opposite the direction of the arrow T along the cam profile. With this, the stopper member 112 moves also in the direction opposite the direction of the arrow S along the cam profile.

Here, the case will be considered in which a first boss 80 or a second boss 81 of the cartridge 70Aa and 70Aa', for example is lost due to breakage, in which the movable carriage 110a cannot be moved. In this case, the properness of the cartridge 70Aa relative to the apparatus main assembly 100Aa cannot be discriminated, and the movable carriage 110a is held in the first position X, so that the stopper member 112 in interrelation with the movable carriage 110a does not move.

Therefore, by the cartridge 70Aa and 70Aa' abutting to the stopper member 112, the insertion of the cartridge 70Aa and 70Aa' is prevented, and therefore, an erroneous insertion of the cartridge 70Aa' (improper) can be prevented beforehand.

In addition, the positions of the first boss 80 with second boss 81 or 81' in the longitudinal direction and the engaging position of the insertion guide portion 123 of the movable carriage 110 can be made different, in the practical ranges.

Figure 17:
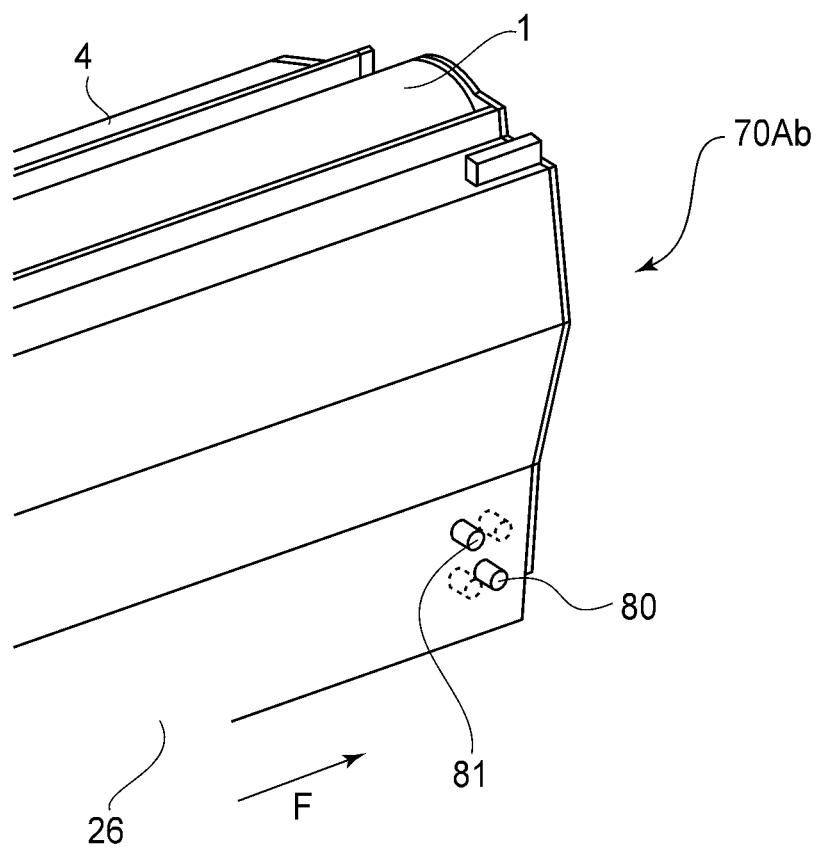
FIG. 17 is an illustration of the first and second bosses provided on the cartridge having a similar effect in the structure of Embodiment 1.

As shown in FIG. 17, the positions of the first boss 80 and the second boss 81 or 81' of the cartridge 70 may be interchanged in the direction perpendicular to the longitudinal direction. As shown in FIG. 18, the configurations of the first guide portion 123 and the second guide portion 124 provided at movable carriage 110b may be upside down, with which several structures may be provided with the same advantageous effect.

(Summary)

The structure of the image forming apparatus 100 according to Embodiment 1 is summarized as follows.

1) it is an image forming apparatus 100 for forming an image on the recording material S. It comprises the first boss 80 and the second boss 81, and further comprises the cartridge 70Aa detachably mountable to the main assembly of the image forming apparatus 100Aa.

The main assembly of the image forming apparatus 100Aa includes a guiding member 102 for guiding insertion and removal of the cartridge 70Aa relative to the main assembly of the image forming apparatus 100Aa. It further comprises the movable carriage 110a movable between the first position X (free state) and the second position Y different from the first position X. It further comprises the first insertion guide portion 123 and the second insertion guide portion 124 which are provided in the movable carriage 110a and which are engageable with the first boss 80 and the second boss 81, respectively.

When the cartridge 70Aa is inserted into the main assembly of the image forming apparatus 100Aa, the first insertion guide portion 123 is engaged with the first boss 80 to move the movable carriage 110a at said first position X to the second position Y. The second insertion guide portion 124 is engageable with the second boss 81, only when the movable carriage 110a is in the second position Y.

2) when the cartridge 70Aa is taken out of the main assembly of the image forming apparatus 100Aa, the second insertion guide portion 124 is engaged with the second boss 81 to move the movable carriage 110a to the second position Y from the first position X.

The first insertion guide portion 123 is engageable with the first boss 80 only when the movable carriage 110a is in the second position Y.

3) the second boss 81 is provided with a flat surface 81'a facing in the inserting direction F of the cartridge.

In structure of cartridge 70Aa of Embodiment 1 is summarized as follows.

1) the cartridge 70Aa is detachably mountable to the main assembly 100Aa of the image forming apparatus 100 for forming an image on the recording material S. The main assembly of the image forming apparatus 100Aa includes a guiding member 102 for guiding insertion and removal of the cartridge 70Aa relative to the main assembly of the image forming apparatus 100Aa. The apparatus further comprises the movable carriage 110a movable between the first position X (free state) and the second position Y different from the first position X. The apparatus further comprises the first insertion guide portion 123 and the second insertion guide portion 124 provided in said movable carriage 110a.

The cartridge 70Aa comprises the first boss 80 and the second boss 81 engageable with the first insertion guide portion 123 and the second insertion guide portion 124, respectively. When the cartridge 70Aa is inserted into the main assembly of the image forming apparatus 100Aa, the first boss 80 engages with the first insertion guide portion 123 to move said movable carriage 110a from the first position X to the second position Y. The second boss 81 is engageable with the second insertion guide portion 124, only when the movable carriage 110*a* is into the second position Y.

2) when the cartridge 70Aa is taken out of the main assembly of the image forming apparatus 100Aa, the second boss 81 is engaged with the second insertion guide portion 124 to move the movable carriage 110*a* from the first position X to the second position Y. The first boss 80 is engageable with the first insertion guide portion 123 only when the movable carriage 110*a* is in the second position Y.

3) the second boss 81 is provided with a flat surface 81'*a* facing in the inserting direction F of the cartridge.

The structure of the main assembly of the image forming apparatus 100Aa is summarized as follows.

1) the main assembly 100Aa of the image forming apparatus 100 for forming an image on the recording material S can be loaded with the cartridge 70Aa including the first boss 80 and the second boss 81.

2) the main assembly of the image forming apparatus 100Aa comprises the guiding member 102 for guiding the insertion and removal of the cartridge 70Aa relative to the main assembly. It further comprises the movable carriage 110*a* movable between the first position X (free state) and the second position Y different from the first position X. It further comprises the first insertion guide portion 123 and the second insertion guide portion 124 which are provided in the movable carriage 110*a* and which are engageable with the first boss 80 and the second boss 81, respectively.

When the cartridge 70Aa is inserted into the main assembly of the image forming apparatus 100Aa, the first insertion guide portion 123 is engaged with the first boss 80 to move the movable carriage 110*a* at said first position X to the second position Y. The second insertion guide portion 124 is engageable with the second boss 81, the only when the movable carriage 110*a* is in the second position Y.

3) when the cartridge 70Aa is taken out of the main assembly of the image forming apparatus 100Aa, the second insertion guide portion 124 is engaged with the second boss 81 to move the movable carriage 110*a* to the second position Y from the first position X. The first insertion guide portion 123 is engageable with the first boss 80 only when the movable carriage 110*a* is in the second position Y.

The structure of the erroneous insertion preventing system is summarized as follows.

It is the erroneous insertion preventing system for the cartridge 70Aa detachably mountable to main assembly 100Aa of the image forming apparatus 100 for forming an image on the recording material S. The cartridge 70Aa comprises the first boss 80 with second boss 81.

The main assembly of the image forming apparatus 100Aa includes a guiding member 102 for guiding insertion and removal of the cartridge 70Aa relative to the main assembly of the image forming apparatus 100Aa. It further comprises the movable carriage 110*a* movable between the first position X (free state) and the second position Y different from the first position X. It further comprises the first insertion guide portion 123 and the second insertion guide portion 124 which are provided in the movable carriage 110*a* and which are engageable with the first boss 80 and the second boss 81, respectively.

When the cartridge 70Aa is inserted into the main assembly of the image forming apparatus 100Aa, the first insertion guide portion 123 is engaged with the first boss 80 to move the movable carriage 110*a* at said first position X to the second position Y. The second insertion guide portion 124 is engageable with the second boss 81, the only when the movable carriage 110*a* is in the second position Y.

Embodiment 2

This Embodiment 2 is different from Embodiment 1 but can provide similar advantageous effects. An image forming apparatus 100Ae and a cartridge 70Ae which is proper to the image forming apparatus 100Ae according to Embodiment 2 will be described. The general arrangements of the apparatus main assembly 100Ae and the cartridge 70Ae of this embodiment are similar to those of Embodiment 1, and therefore, the description of the common parts are omitted for simplicity.

Figure 19:
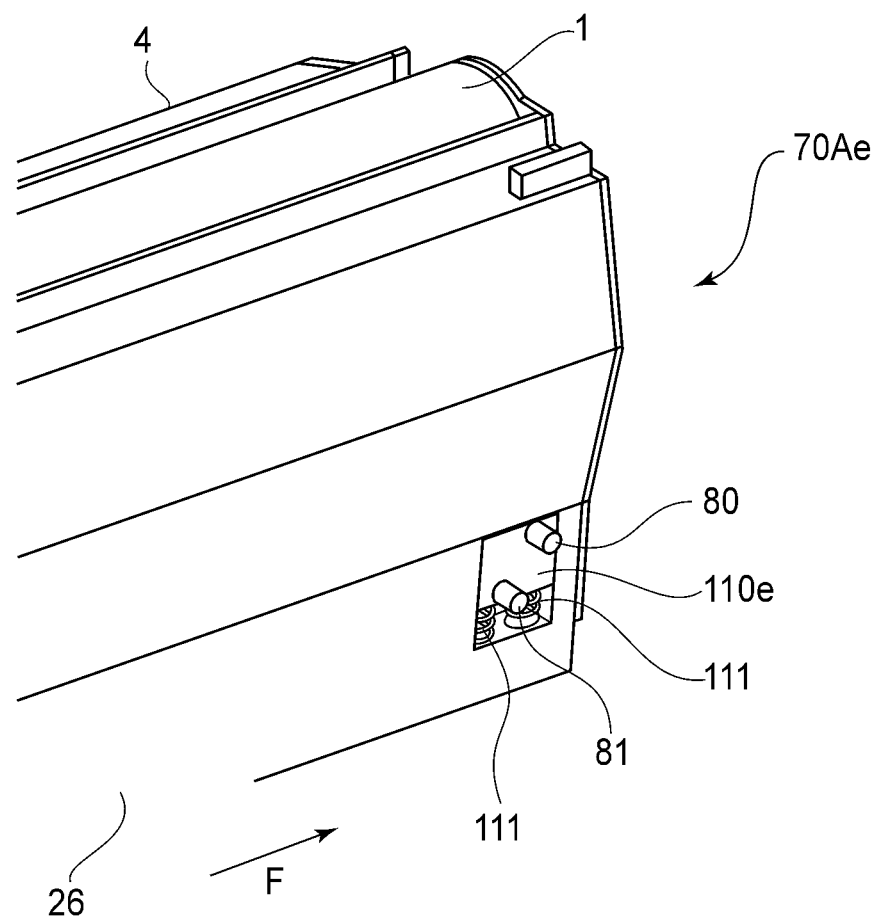
FIG. 19 is an illustration of the structures of the movable carriage provided in the cartridge and the first and second bosses in Embodiment 2.
Figure 20:
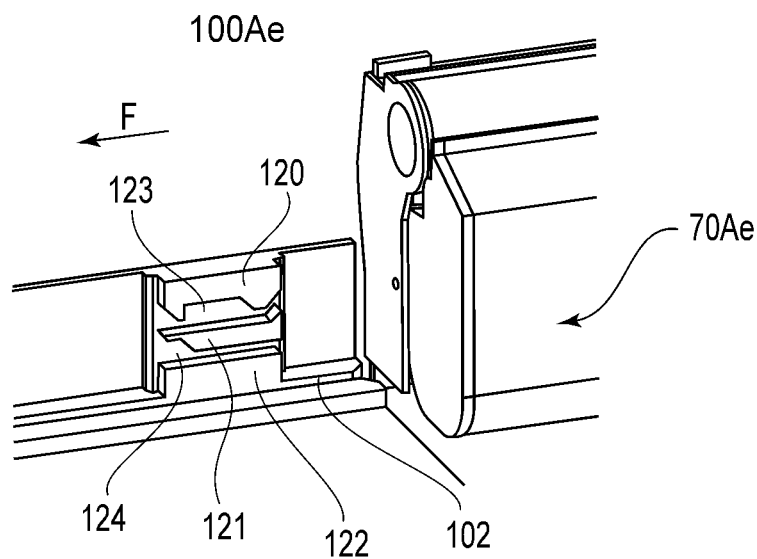
FIG. 20 is an illustration of the structure of the insertion guide portion provided in the main assembly of the image forming apparatus, according to Embodiment 2 of the present invention.
Figure 20:
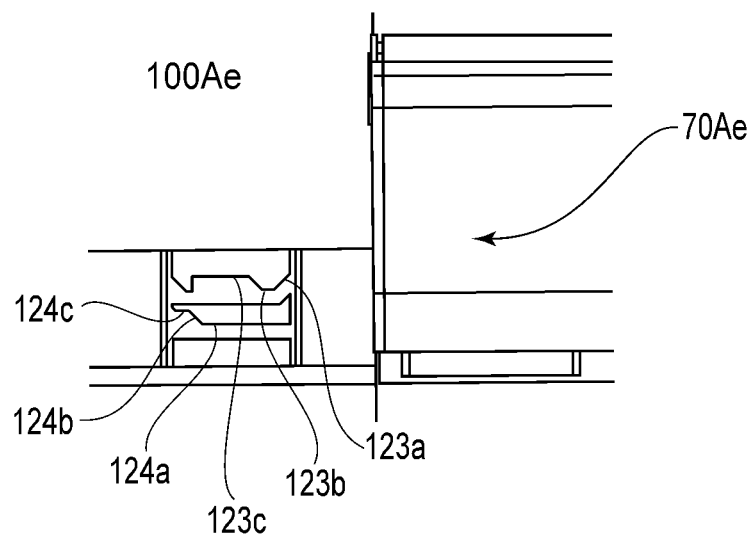
Figure 21:
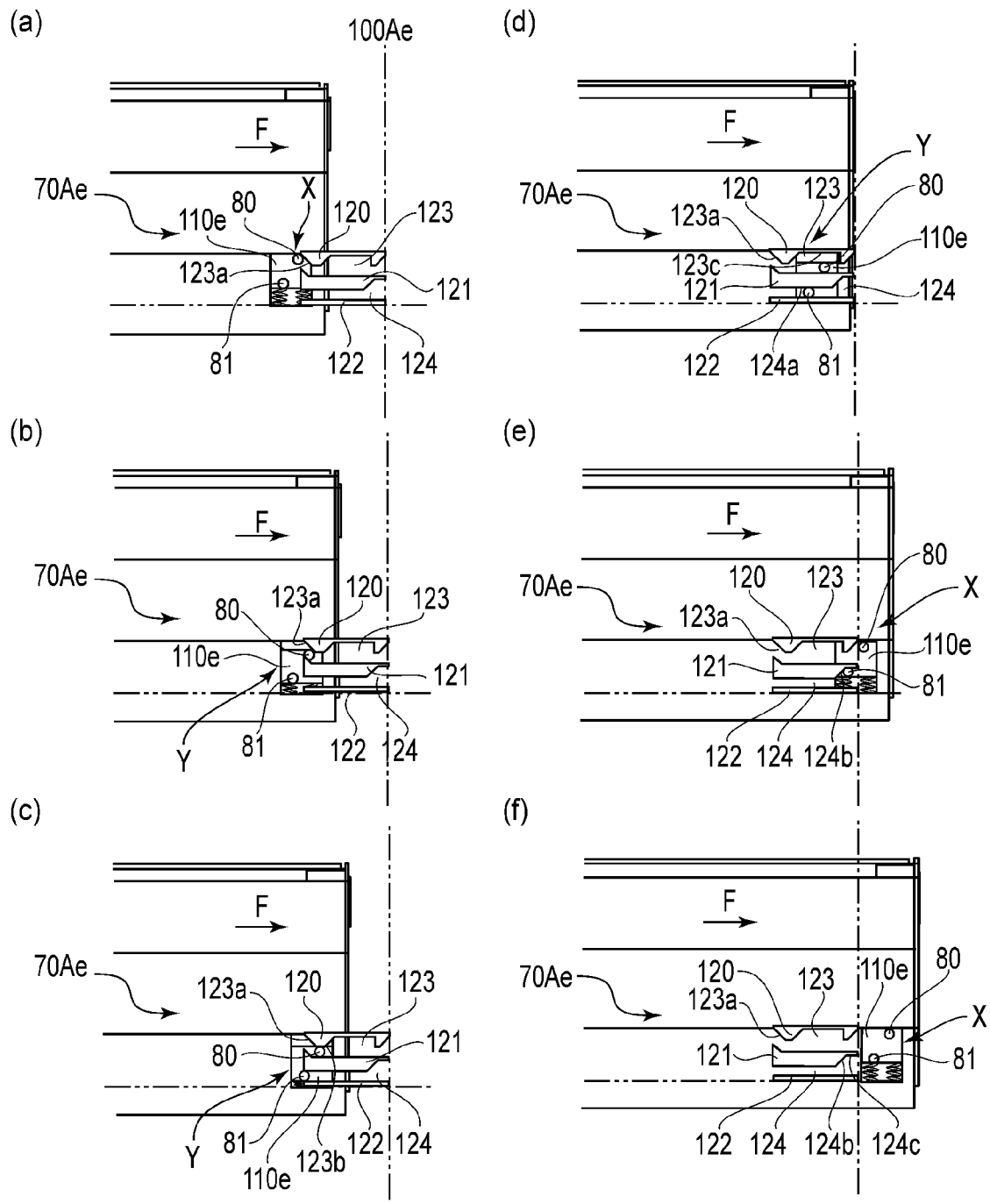
FIG. 21 is an illustration of an erroneous insertion prevention structure when a proper cartridge is inserted into the main assembly of the image forming apparatus, according to Embodiment 2.

Referring to FIG. 19 to FIG. 21, the structures of this embodiment will be described. In this embodiment, the movable carriage 110*a* provided in the apparatus main assembly 100Aa in Embodiment 1 is provided on the cartridge 70Ae.

As shown in FIG. 19, the cartridge 70Ae is provided with a movable carriage 110*e* and an urging spring 111 for urging the movable carriage 110*e* to a predetermined position. The movable carriage 110*e* is provided with a first boss 80 in an upstream side with respect to an inserting direction of the cartridge or and a second boss 81 in a downstream side with respect to the cartridge inserting direction.

As shown in FIG. 20, the apparatus main assembly 100Ae is provided with a lower guide 102 for guiding mounting of the cartridge 70Ae. There are provided an upper guiding portion 120 a middle guiding portion 121 and a lower guiding portion 122 for engaging with and guide first and second bosses 80 and 81 provided on the cartridge 70Ae during insertion of the cartridge.

A first insertion guide portion 123 is constituted for the upper portion 120 and the middle guiding portion 121, and a second insertion guide portion 124 is constituted by the middle guiding portion 121 and the lower portion 122. The first insertion guide portion 123 has a labyrinths configuration constituted by an inclined surface 123*a*, a first flat surface portion 123*b*, a concave flat surface portion 123*c* and so on and has a size engageable with the first boss 80. The second insertion guide portion 124 has a labyrinth configuration constituted by a first flat surface portion 124*a*, an inclined surface 124*b*, a second flat surface portion 124*c* and so on and has a size engageable with the second boss 81.

1) A Case of the Apparatus Main Assembly 100Ae and the Cartridge 70Ae:

The description will be made as to the case when in which a proper cartridge 70Ae is inserted into the apparatus main assembly 100Ae. That is, the description will be made as to a relationship between the first boss 80 and second boss 81 of the cartridge 70Ae and the first and second a guide portions 123 and 124 when the cartridge 70Ae moves from the front side toward the rear side through the opening 101 of the apparatus main assembly 100Ae.

As shown in parts (a)-(f) of FIG. 21, the movable carriage 110*e* provided on the cartridge 70Ae moves while being guided by the insertion guide portions 123 and 124 so that the cartridge 70Ae is inserted into the image forming apparatus 100*e*, by a positional relation similar to that of Embodiment 1.

Here, in this embodiment, the movable carriage 110*e* is urged upwardly by an urging spring 111. Therefore, a first position X of the movable carriage 110*e* in the free state is the position to which the urging spring 111 urges to the upper position limited by a regulating portion. A second position Y is a position where the movable carriage 110*e* is urged to the lower position against the urging spring 111.

Figure 8:
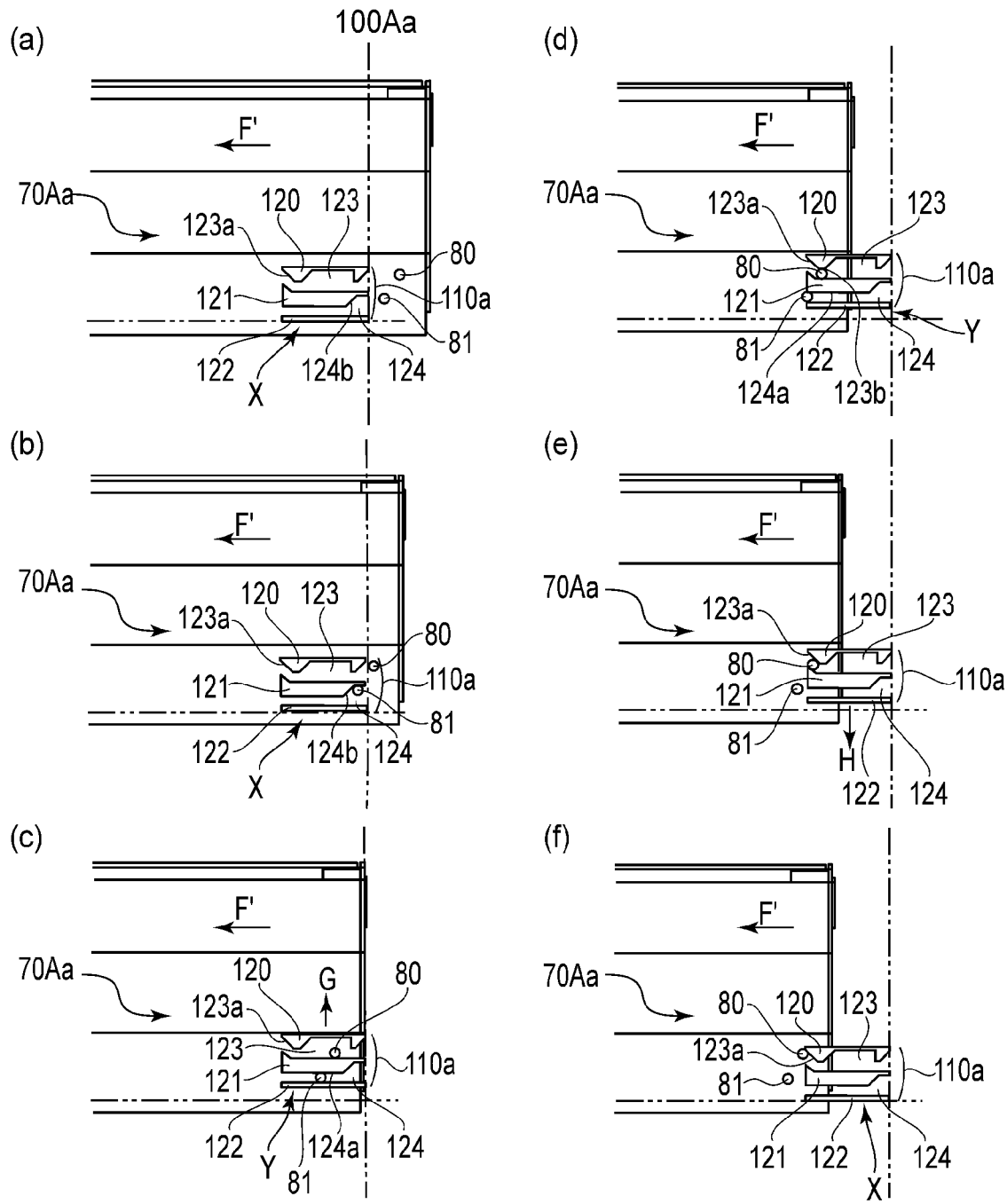
FIG. 8 is an illustration of an erroneous insertion prevention structure when a proper cartridge is dismounted from the main assembly of the image forming apparatus, according to Embodiment 1.

The description of Embodiment 1 in conjunction with FIG. 8 when the cartridge is taken out applies to this embodiment when the proper cartridge 70Ae is taken out of the apparatus main assembly 100Ae. That is, the description of Embodiment 1 in conjunction with FIG. 8 applies to the relationship between the movable carriage 110e and the first boss 80 and second boss 81 of the cartridge 70Ae when the cartridge 70Ae moves from the rear side toward the front side. The cartridge 70Ae is taken out of the device 100Ae while the movable carriage 110e provided on the cartridge 70Ae is being guided by the insertion guide portions 123 and 124.

Thus, the proper cartridge 70e can be mounted and demounted relative to apparatus main assembly 100Ae, with the structure in which the movable carriage 110e is provided on the cartridge 70Ae side.

2) Case of Apparatus Main Assembly 100Ae and Cartridge 70Ae':

The description will be made as to the case when in which an improper cartridge 70Ae' (unshown) is inserted into the apparatus main assembly 100Ae.

Figure 11:
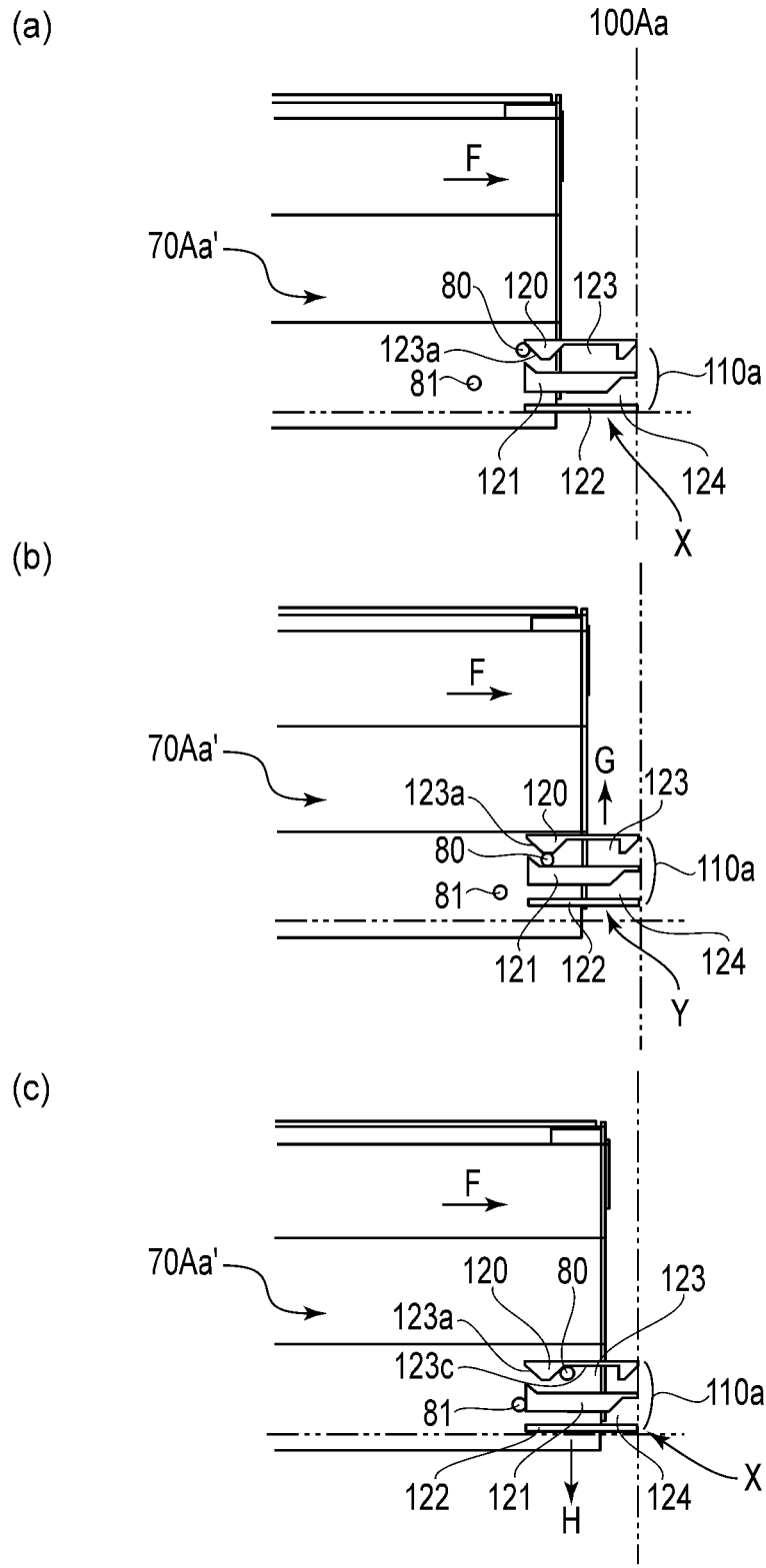
FIG. 11 is an illustration of an erroneous insertion prevention structure when an improper cartridge is inserted into the main assembly of the image forming apparatus, according to Embodiment 1.
Figure 12:
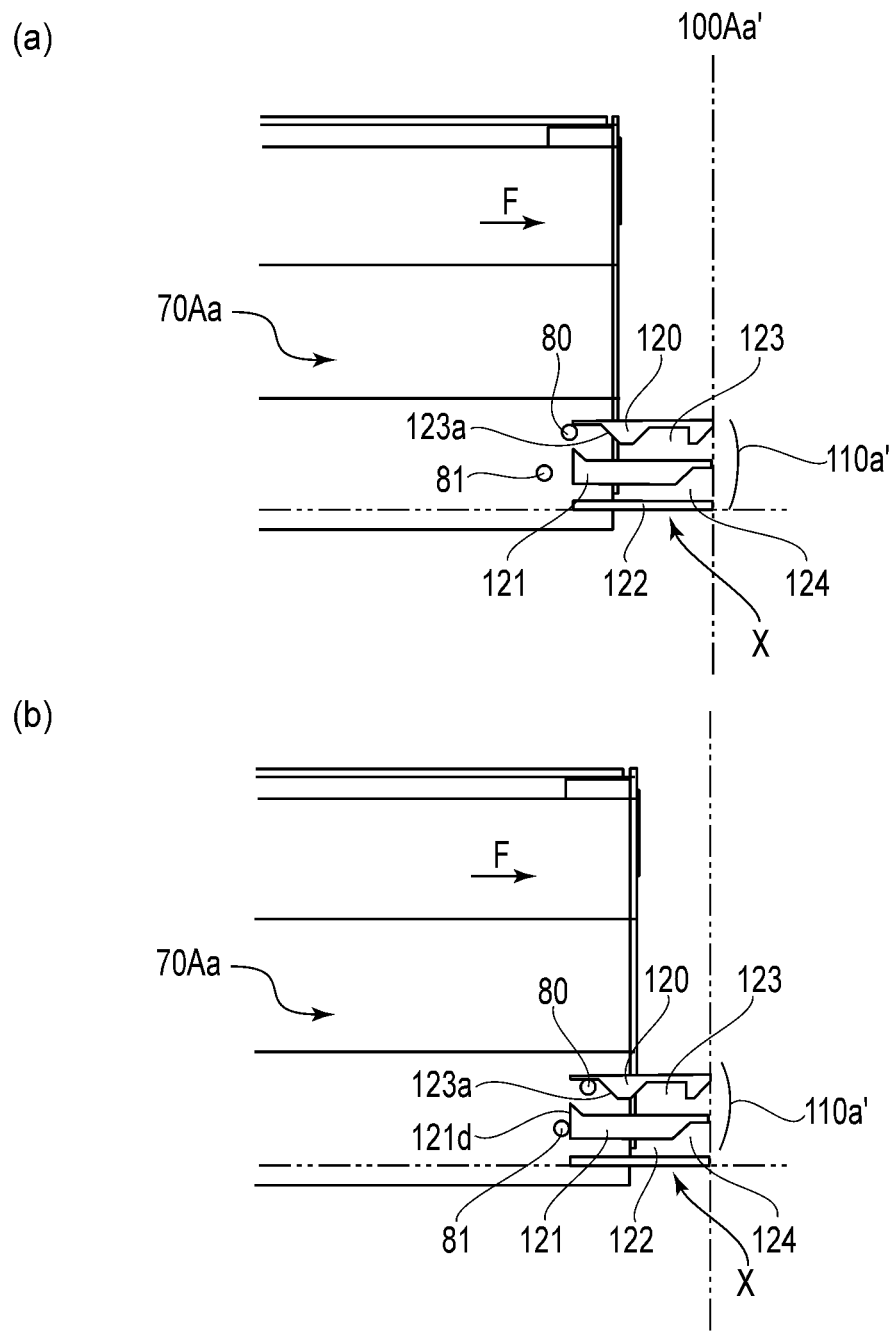
FIG. 12 is an illustration of an erroneous insertion prevention structure when an improper cartridge is inserted into the main assembly of the image forming apparatus, according to Embodiment 1.

The description of Embodiment 1 in conjunction with FIGS. 11 and 12 applies to the case of inserting the improper cartridge 70Ae to the image forming apparatus 100Ae' (unshown). That is, the description of Embodiment 1 in conjunction with FIGS. 11 and 12 applies to the relation between the first boss 80 and second boss 81 of cartridge 70Ae and 70Ae' and the first second insertion guiding portions 123 and 124. By this, erroneous insertion of the improper cartridges 70Ae' and 70Ae into the apparatus main assemblies 100Ae and 100Ae' can be prevented beforehand.

Similarly to the Embodiment 1, the second boss 81 provided on the cartridges 70Ae and 70Ae' may be given at least one flat surface facing in the cartridge inserting direction. By this, the erroneous insertion of the improper cartridges 70e' and 70e into the apparatus main assemblies 100e and 100e' can be stably prevented.

In addition, similarly to the Embodiment 1, the positions of the first boss 80 and the second boss 81 in the longitudinal direction, and the engaging positions of the insertion guide portion 123 of the movable carriage 110 may be changed. The positions of the first boss 80 and the second boss 81 or 81' of the cartridge 70Ae may be interchanged in the direction perpendicular to the longitudinal direction, and the configurations of the first guide portion 123 and the second guide portion 124 provided at movable carriage 110 may be upside down, with which several structures may be provided with the same advantageous effect.

(Summary)

The structure of image forming apparatus 100 of the Embodiment 2 is summarized as follows.

1) it is an image forming apparatus 100 for forming an image on the recording material S. It comprises the cartridge 70Ae detachably mountable to the main assembly of the image forming apparatus 100Ae, and the cartridge 70Ae includes a movable carriage 110e provided with the first boss 80 and the second boss 81 and movable between the first position X (free state) and the second position different from the first position. The main assembly of the image forming apparatus 100Ae comprises the guiding member 102 for guiding the insertion and removal of the cartridge 70Ae relative to the main assembly. The apparatus further comprise the first insertion guide portion 123 and the second insertion guide portion 124 engageable with the first boss 80 and the second boss 81, respectively.

When the cartridge 70Ae is inserted into the main assembly of the image forming apparatus 100Ae, the first insertion guide portion 123 is engaged with the first boss 80 to move the movable carriage 110a at said first position X to the second position Y. The second insertion guide portion 124 is engageable with the second boss 81, only when the movable carriage 110a is in the second position Y.

2) when the cartridge 70Ae is taken out of the main assembly of the image forming apparatus 100Ae, the second insertion guide portion 124 is engaged with the second boss 81 to move the movable carriage 110e to the second position Y from the first position X. The first insertion guide portion 123 is engageable with the first boss 80 only when the movable carriage 110e is in the second position Y.

3) the second boss 81 is provided with a flat surface 81'a facing in the inserting direction F of the cartridge.

The structure of the cartridge 70Ae is summarized as follows.

1) the cartridge 70Ae is detachably mountable to the main assembly 100Ae of the image forming apparatus 100 for forming an image on the recording material S. The main assembly of the image forming apparatus 100Ae comprises the guiding member 102 for guiding the insertion and removal of the cartridge 70Ae relative to the main assembly of the image forming apparatus 100Ae. In addition, it further comprises the first insertion guide portion 123 and the second insertion guide portion 124.

Cartridge 70Ae includes a movable carriage 110e movable between a first position X (free state) and a second position Y different from the first position. The movable carriage 110e is provided with the first boss 80 and the second boss 81 engageable with the first insertion guide portion 123 and the second insertion guide portion 124, respectively.

When the cartridge 70Ae is inserted into the main assembly of the image forming apparatus 100Ae, the first boss 80 engages with the first insertion guide portion 123 to move said movable carriage 110e from the first position X to the second position Y. The second boss 81 is engageable with the second insertion guide portion 124, only when the movable carriage 110e is in the second position Y.

2) when the cartridge 70Ae is taken out of the main assembly of the image forming apparatus 100Ae, the second boss 81 is engaged with the second insertion guide portion 124 to move the movable carriage 110e from the first position X to the second position Y. The first boss 80 is engageable with the first insertion guide portion 123 only when the movable carriage 110a is in the second position Y.

3) the second boss 81 is provided with a flat surface 81'a facing in the inserting direction F of the cartridge.

The structure of the main assembly of the image forming apparatus 100Ae is as follows.

1) it is the main assembly 100Ae of the image forming apparatus 100 for forming an image on the recording material S, the main assembly can be loaded with the cartridge 70Ae. The cartridge 70Ae includes a movable carriage 110e movable between the first position X (free state) and the second position Y different from and said first position, the movable carriage 110e being provided with the first boss 80 and the second boss 81.

The main assembly of the image forming apparatus 100Ae includes a guiding member 102 for guiding insertion and removal of the cartridge 70Ae relative to the main assembly of the image forming apparatus 100Ae. It further comprise the first insertion guide portion 123 and the second insertion guide portion 124 engageable with the first boss 80 and the second boss 81, respectively.

When the cartridge 70Ae is inserted into the main assembly of the image forming apparatus 100Ae, the first insertion guide portion 123 is engaged with the first boss 80 to move the movable carriage 110e at said first position X to the second position Y. The second insertion guide portion 124 is engageable with the second boss 81, only when the movable carriage 110e is in the second position Y.

2) when the cartridge 70Ae is taken out of the main assembly of the image forming apparatus 100Ae, the second insertion guide portion 124 is engaged with the second boss 81 to move the movable carriage 110e to the second position Y from the first position X. The first insertion guide portion 123 is engageable with the first boss 80 only when the movable carriage 110e is in the second position Y.

The structure of the erroneous insertion preventing system is summarized as follows.

It is the erroneous insertion preventing system for the cartridge 70Ae detachably mountable to main assembly 100Aa of the image forming apparatus 100 for forming an image on the recording material S.

The cartridge 70Ae includes a movable carriage 110e movable between the first position X (free state) and the second position different from and said first position, the movable carriage 110e being provided with the first boss 80 and the second boss 81.

The main assembly of the image forming apparatus 100Ae includes a guiding member 102 for guiding insertion and removal of the cartridge 70Ae relative to the main assembly of the image forming apparatus 100Ae. The apparatus further comprise the first insertion guide portion 123 and the second insertion guide portion 124 engageable with the first boss 80 and the second boss 81, respectively.

When the cartridge 70Ae is inserted into the main assembly of the image forming apparatus 100Ae, the first insertion guide portion 123 is engaged with the first boss 80 to move the movable carriage 110e at said first position X to the second position Y. The second insertion guide portion 124 is engageable with the second boss 81, only when the movable carriage 110e is in the second position Y.

Embodiment 3

This Embodiment 2 is different from Embodiments 1 and 2 but can provide similar advantageous effects. The fundamental structures will be described as to an apparatus main assembly 100Ak and a cartridge 70Ak which is proper and is therefore capable of being inserted into the apparatus main assembly 100Ak.

In the description of this embodiment, the like reference numerals as in Embodiment 1 are assigned to the elements having the corresponding functions in this embodiment, and the detailed description thereof is omitted for simplicity, since general arrangements of the apparatus main assembly 100Ak and the cartridge 70Ak according to Embodiment 3 are similar to those of Embodiment 1.

Figure 22:
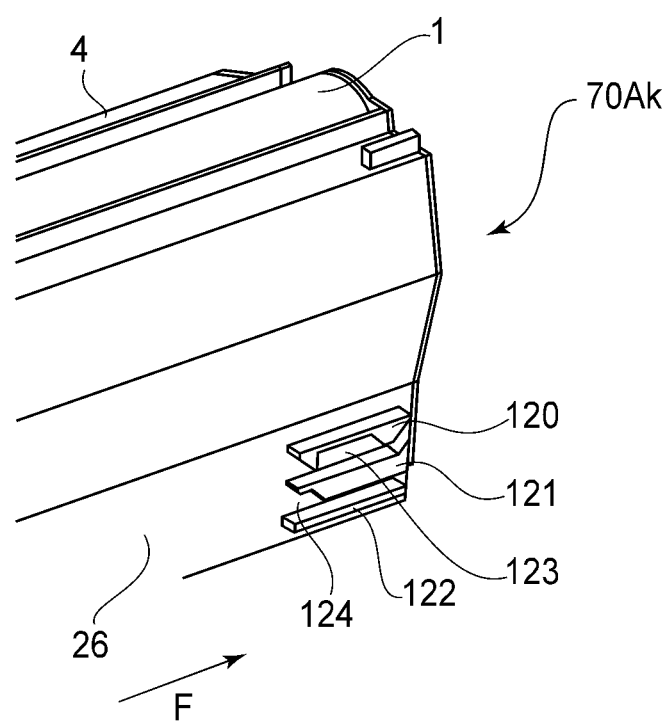
FIG. 22 is an illustration of a structure of an insertion guide portion provided on the cartridge according to Embodiment 3 of the present invention.
Figure 22:
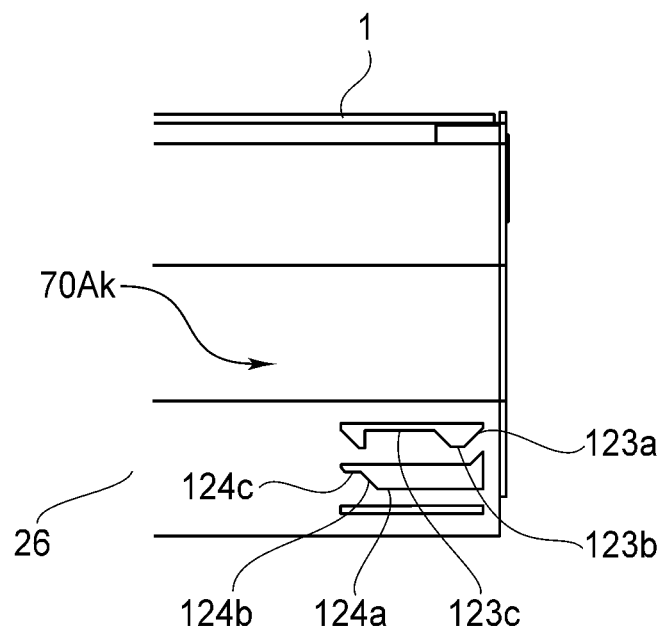
Figure 23:
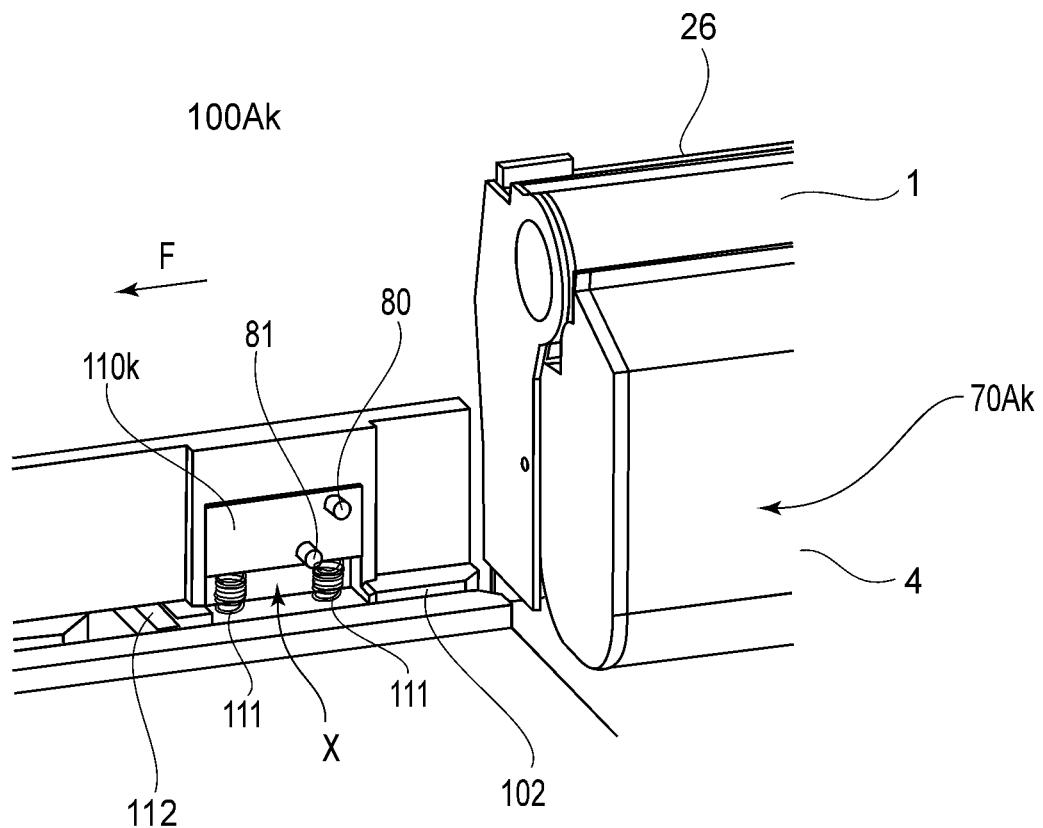
FIG. 23 is an illustration of structures of a movable carriage provided in the main assembly of the image forming apparatus and first and second bosses, according to Embodiment 3.

Referring to FIGS. 22 and 23, this embodiment will be described. This embodiment, insertion guide portions 123 and 124 provided in the apparatus main assembly 100Aa in Embodiments 1 and 2 are provided on the cartridge 70Ak, and first and second bosses 80 and 81 are provided in the apparatus main assembly 100Ak.

As shown in FIG. 22, the cartridge 70Ak is provided with an upper guiding portion 120, a middle guiding portion 121 and a lower guiding portion 122. The upper portion 120 and the middle guiding portion 121 define a first insertion guide portion 123 therebetween. The middle guiding portion 121 and the lower portion 122 defines a second insertion guide portion 124 therebetween.

The first insertion guide portion 123 has a labyrinths configuration constituted by an inclined surface 123a, a first flat surface portion 123b, a concave flat surface portion 123c and so on and has a size engageable with the first boss 80.

The second insertion guide portion 124 has a labyrinth configuration constituted by a first flat surface portion 124a, an inclined surface 124b, a second flat surface portion 124c and so on and has a size engageable with the second boss 81.

As shown in FIG. 23, the device 100Ak is provided with a movable carriage 110k, and an urging spring 111 urged the movable carriage 110k to a predetermined position. The movable carriage 110k is engageable with the first and second insertions 123 and 124 in the insertion of the cartridge. The movable carriage 110k is provided with a first boss 80 in an upstream side with respect to an inserting direction F of the cartridge, and a second boss 81 in a downstream side.

1) A Case of the Apparatus Main Assembly 100Ak and the Cartridge 70Ak:

The description will be made as to the case when in which a proper cartridge 70Ak is inserted into the apparatus main assembly 100Ak.

The relationship between the first and second insertion guide portions 123 and 124 and the first and second bosses 80 and 81 is the same as that of Embodiment 1 (FIGS. 5 and 8). The proper cartridge 70Ak can be mounted and demounted relative to the apparatus main assembly 100Ak, in the structures in which the insertion guide portions 123 and 124 are provided on the cartridge 70Ak, and the first and second bosses 80 and 81 are provided in the apparatus main assembly 100Ak.

Here, in this embodiment, the movable carriage 110k is urged upwardly by an urging spring 111. Therefore, a first position X of the movable carriage 110k in the free state is the position to which the urging spring 111 urges to the upper position limited by a regulating portion. A second position Y is a position where the movable carriage 110k is urged to the lower position against the urging spring 111.

2) Case of the combination of the apparatus main assembly 100Ak—and a cartridge 70k' and Case of the combination of apparatus main assembly 100Ak'—and cartridge 70k:

The description of Embodiment 1 in conjunction with FIGS. 9 and 12 substantially applies to the case in which the improper cartridge 70Ak' (unshown) is inserted into the apparatus main assembly 100Ak and to the case in which the improper cartridge 70Ak is inserted into the device 100Ak' (unshown) in this embodiment.

The description of Embodiment 1 in conjunction with FIGS. 9 and 12 substantially applies as to the relationship between the first and second insertion guide portions 123 and 124 of the cartridge and the first and second bosses 80 and 81, in either case. Therefore, improper cartridges 70Ak' 70Ak are prevented from being inserted beforehand.

Furthermore, similarly to the Embodiment 1, the second boss 81 provided in the apparatus main assembly 100Ak may be given at least one flat surface facing the cartridge inserting direction. By doing so, the erroneous insertions of the cartridges 70Ak' and 70Ak can be stably prevented.

In addition, similarly to Embodiment 1, the positions of the first boss 80 with second boss 81 or 81' in the longitudinal direction and the engaging position of the insertion guide portion 123 of the movable carriage 110 can be made different, in the practical ranges. The configurations of the first insertion guide portion 123 and the second insertion guide portion 124 of the cartridge 70Ak may be upside down. The positions of the first boss 80 and the second boss 81 or 81' on the movable carriage 110 may be interchanged in the direction perpendicular to the longitudinal direction. By this, several structures may be provided with the same advantageous effect.

Thus, the similar advantageous effects are provided by providing the cartridge 70Ak with the insertion guide portions 123 and 124 and providing the apparatus main assembly 100Ak with the bosses 80 and 81. That is, similar advantageous effects are provided when the movable carriage 110 is provided on the cartridge 70 as with Embodiment 2.

(Summary)

The structure of image forming apparatus 100 of the Embodiment 3 is summarized as follows.

1) it is an image forming apparatus 100 for forming an image on a recording material S. It comprises a cartridge 70Ak detachably mountable to a main assembly of the image forming apparatus 100Aa, the cartridge 70Ak being provided with the first insertion guide portion 123 and the second insertion guide portion 124.

The main assembly of the image forming apparatus 100Aa comprises the guiding member 102 for guiding the insertion and removal of the cartridge 70Aa relative to the main assembly. It further comprises the movable carriage 110k movable between the first position X (free state) and the second position Y different from the first position X. The movable carriage 110k is provided with the first boss 80 and the second boss 81 engageable with the first insertion guide portion 123 and the second insertion guide portion 124, respectively.

When the cartridge 70Ak is inserted into the main assembly of the image forming apparatus 100Ak, the first insertion guide portion 123 is engaged with the first boss 80 to move the movable carriage 110k at said first position X to the second position Y. The second insertion guide portion 124 is engageable with the second boss 81, only when the movable carriage 110a is in the second position Y.

2) it is an image forming apparatus 100 for forming an image on the recording material S It comprises the cartridge 70Ak detachably mountable to the main assembly of the image forming apparatus 100Ak. The cartridge 70Ak is provided with the first insertion guide portion 123 and the second insertion guide portion 124, and the main assembly of the apparatus includes the movable carriage 110k movable between the first position X (free state) and the second position Y different from the first position.

The main assembly of the image forming apparatus 100Ak comprises the guiding member 102 for guiding the insertion and removal of the cartridge 70Ak relative to the main assembly. The main assembly 100Ak further comprises first boss 80 and the second boss 81 engageable with the first insertion guide portion 123 and the second insertion guide portion 124, respectively.

When the cartridge 70Ak is inserted into the main assembly of the image forming apparatus 100Ak, the first insertion guide portion 123 is engaged with the first boss 80 to move the movable carriage 110k at said first position X to the second position Y. The second insertion guide portion 124 is engageable with the second boss 81, only when the movable carriage 11ka is in the second position Y.

3) the second boss 81 has a flat surface 81'a facing in the cartridge inserting direction F.

The structure of the cartridge 70Ak is summarized as follows.

1) the cartridge 70Ak is detachably mountable to the main assembly 100Ak of the image forming apparatus 100 for forming an image on the recording material S. The main assembly of the image forming apparatus 100Ak comprises the guiding member 102 for guiding the insertion and removal of the cartridge 70Ak relative to the main assembly of the image forming apparatus 100Ak. It further comprises the movable carriage 110a movable between the first position X (free state) and the second position Y different from the first position X. The movable carriage 110k is provided with the first boss 80 and the second boss 81.

The cartridge 70Ak comprises the first insertion guide portion 123 and the second insertion guide portion 124 engageable with the first boss 80 and the second boss 81, respectively. When the cartridge 70Ak is inserted into the main assembly of the image forming apparatus 100Ak, the first insertion guide portion 123 is engaged with the first boss 80 to move the movable carriage 110k at said first position X to the second position Y. The second insertion guide portion 124 is engageable with the second boss 81, only when the movable carriage 110a is in the second position Y.

2) the cartridge 70Aa is detachably mountable to the main assembly 100Ak of the image forming apparatus 100 for forming an image on the recording material S. The main assembly of the image forming apparatus 100Ak comprises the guiding member 102 for guiding the insertion and removal of the cartridge 70Ak relative to the main assembly of the image forming apparatus 100Ak. It further comprises the first boss 80 and the second boss 81.

3) the cartridge 70Ak includes a movable carriage 110k movable between a first position X (free state) and a second position Y different from the first position. The movable carriage 110k is provided with the first insertion guide portion 123 and the second insertion guide portion 124 engageable with the first boss 80 and the second boss 81, respectively.

When the cartridge 70Ak is inserted into the main assembly of the image forming apparatus 100Ak, the first insertion guide portion 123 is engaged with the first boss 80 to move the movable carriage 110k at said first position X to the second position Y. The second insertion guide portion 124 is engageable with the second boss 81, only when the movable carriage 110k is in the second position Y.

The structure of the main assembly of the image forming apparatus 100Ae is as follows.

1) it is a main assembly 100Ak for the image forming apparatus 100 for forming an image on the recording material S, wherein the cartridge 70Ak having the first insertion guide portion 123 and the second insertion guide portion 124 is detachably mountable to the main assembly 100Ak.

The main assembly of the image forming apparatus 100Ak comprises the guiding member 102 for guiding the insertion and removal of the cartridge 70Ak relative to the main assembly. It further comprises the movable carriage 110k movable between the first position X (free state) and the second position Y different from the first position X. The movable carriage 110k is provided with the first boss 80 and the second boss 81 engageable with the first insertion guide portion 123 and the second insertion guide portion 124, respectively.

When the cartridge 70Ak is inserted into the main assembly of the image forming apparatus 100Ak, the first boss 80 engages with the first insertion guide portion 123 to move said movable carriage 110k from the first position X to the second position Y. The second boss 81 is engageable with the second insertion guide portion 124, only when the movable carriage 110e is in the second position Y.

2) it is the main assembly 100Ak of the image forming apparatus 100 for forming an image on the recording material S, the main assembly can be loaded with the cartridge 70Ak. The cartridge 70Ak is provided with the first insertion guide portion 123 and the second insertion guide portion 124, and the main assembly is provided with the movable carriage 110k movable between the first position X (free state) and the second position Y different from the first position.

The main assembly 100Ak of the image forming apparatus comprises the guiding member 102 for guiding the insertion and removal of the cartridge 70Ak relative to the main assembly. The main assembly 100Ak further comprises first boss 80 and the second boss 81 engageable with the first insertion guide portion 123 and the second insertion guide portion 124, respectively.

When the cartridge 70Ak is inserted into the main assembly of the image forming apparatus 100Ak, the first boss 80 engages with the first insertion guide portion 123 to move said movable carriage 110k from the first position X to the second position Y. The second boss 81 is engageable with the second insertion guide portion 124, only when the movable carriage 110k is in the second position Y.

3) the second boss 81 has a flat surface 81'a facing in the cartridge inserting direction F.

The structure of the erroneous insertion preventing system is summarized as follows.

1) It is the erroneous insertion preventing system for the cartridge 70Ak detachably mountable to main assembly 100Ak of the image forming apparatus 100 for forming an image on the recording material S. The cartridge 70Ak is provided with the first insertion guide portion 123 and the second insertion guide portion 124.

The main assembly of the image forming apparatus 100Ak includes a guiding member 102 for guiding insertion and removal of the cartridge 70Ak relative to the main assembly of the image forming apparatus 100Ak. It further comprises the movable carriage 110k movable between the first position X (free state) and the second position Y different from the first position X. The movable carriage 110k is provided with the first boss 80 and the second boss 81 engageable with the first insertion guide portion 123 and the second insertion guide portion 124, respectively.

When the cartridge 70Ak is inserted into the main assembly of the image forming apparatus 100Ak, the first insertion guide portion 123 is engaged with the first boss 80 to move the movable carriage 110a at said first position X to the second position Y. The second insertion guide portion 124 is engageable with the second boss 81, only when the movable carriage 110k is in the second position Y.

2) it is the erroneous insertion preventing system for the cartridge 70Ak detachably mountable to main assembly 100Ak of the image forming apparatus 100 for forming an image on the recording material S. The cartridge 70Ak is provided with the first insertion guide portion 123 and the second insertion guide portion 124, and the main assembly is provided with the movable carriage 110k movable between the first position X (free state) and the second position Y different from the first position.

The main assembly of the image forming apparatus 100Ak includes a guiding member 102 for guiding insertion and removal of the cartridge 70Ak relative to the main assembly of the image forming apparatus 100Ak. The main assembly 100Ak further comprises first boss 80 and the second boss 81 engageable with the first insertion guide portion 123 and the second insertion guide portion 124, respectively.

When the cartridge 70Ak is inserted into the main assembly of the image forming apparatus 100Ak, the first insertion guide portion 123 is engaged with the first boss 80 to move the movable carriage 110k at said first position X to the second position Y. The second insertion guide portion 124 is engageable with the second boss 81, only when the movable carriage 110k is in the second position Y.

<Others>

1) the function, the material, the configuration, the relative position of the constituent elements of the foregoing embodiments are not limited to those described above, unless otherwise stated specifically.

2) the image forming apparatus is not limited to the above-described electrophotographic image forming apparatus. It may be any other image forming apparatus using an electrostatic recording process, a magnetic recording process or another known process.

3) the image forming apparatus is not limited to the one to which only one cartridge is detachably mountable. The image forming apparatus may be a color image forming apparatus in which a plurality of cartridges for different colors are detachably mountable to mounting portions of the apparatus.

4) the cartridge is not limited to an integral type process cartridge described above. It may be a separable type process cartridge including image forming process means actable on an image bearing member for carrying an image, or a developing cartridge including developing means for developing a latent image formed on the image bearing member with a developer. It may be a unit contributable to the image forming process formed an image on recording material and detachably mountable to the main assembly of the image forming apparatus.

According to Embodiments 1-3, many kinds of patterns for the erroneous insertion preventing configurations within a small space along a lateral side with respect to the cartridge mounting direction. In addition, by providing the boss with at least one flat surface, the erroneous insertion prevention can be stabilized.

Embodiment 4

(1) General Arrangement

Figure 25:
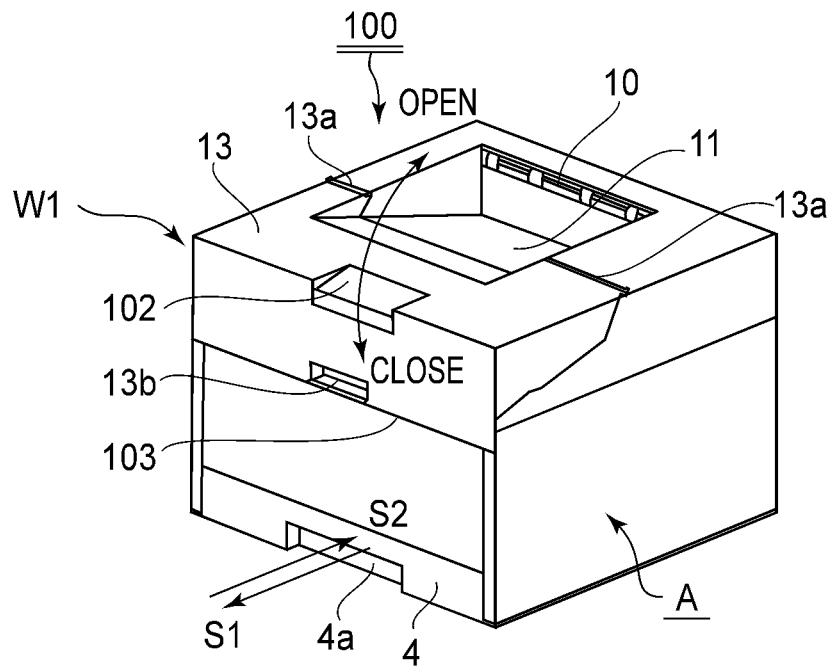
FIG. 25 is a perspective view of an image forming apparatus according to Embodiment 4.
Figure 26:
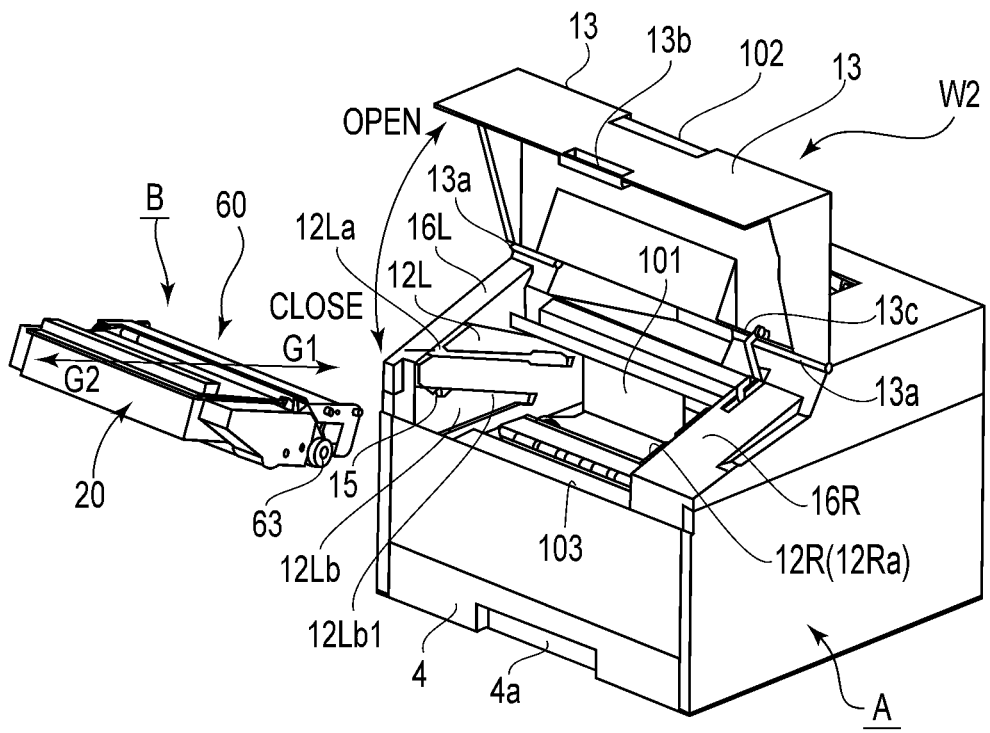
FIG. 26 is a perspective view of a cartridge mounted and dismounted relative to the main assembly of the image forming apparatus in which a door is opened.
Figure 27:
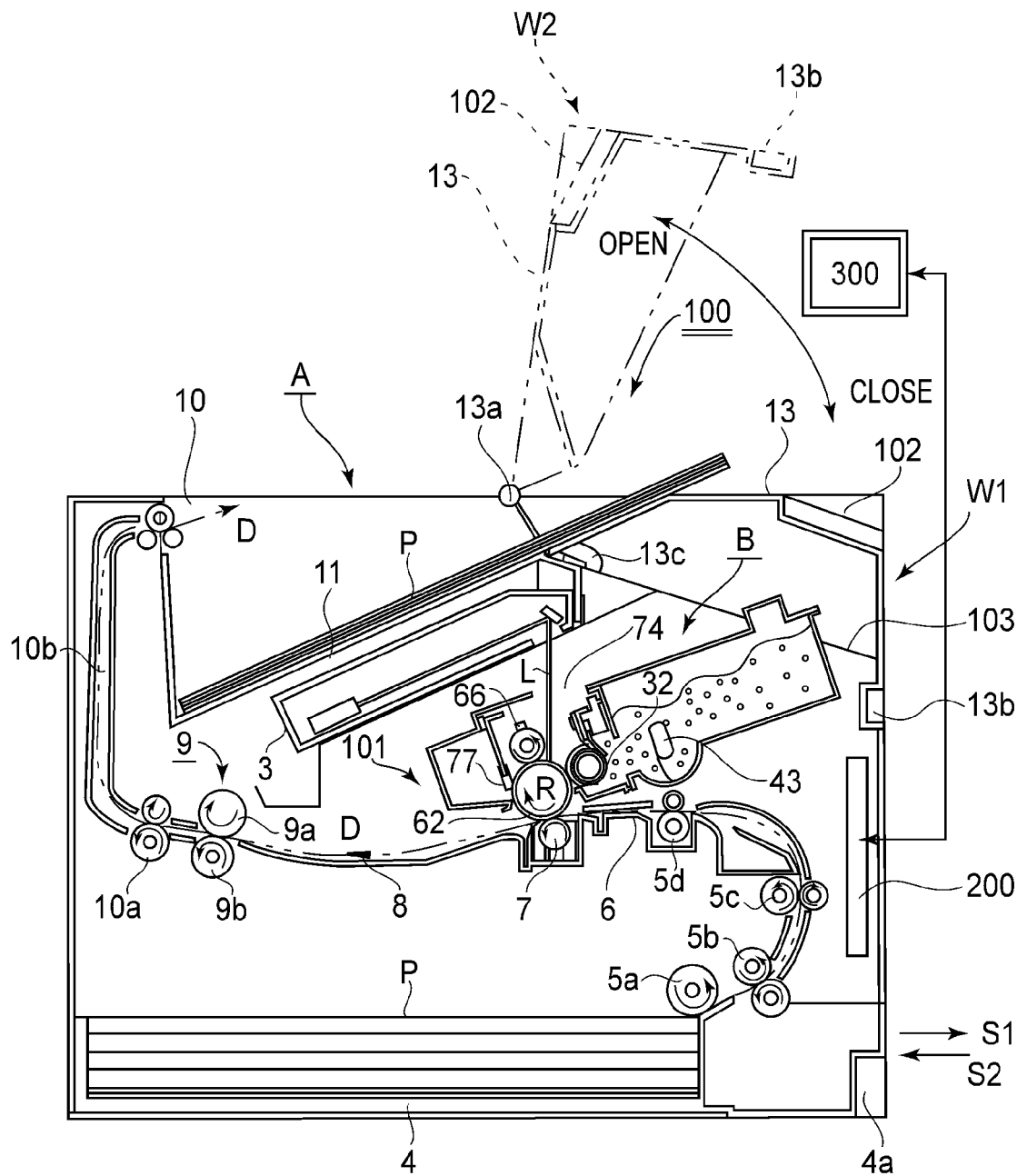
FIG. 27 is a right-hand sectional side view of the image forming apparatus.

FIG. 25 is a perspective view of an image forming apparatus 100 according to this embodiment; FIG. 26 is a perspective view of the main assembly An of the image forming apparatus 100 in which a door 13 is opened, and a cartridge B detachably mountable to the main assembly An of the apparatus; and FIG. 27 is a longitudinal section of the image forming apparatus 100.

The image forming apparatus 100 of this embodiment is a cartridge type electrophotographic laser beam printer (electrophotographic image forming apparatus) for forming an image on a recording material (sheet material) P using an electrophotographic process. An image can be formed on a sheet material P and can be outputted as a print (hard copy) in accordance with electrical image information inputted to a control circuit portion (controlling means) 200 from an external host apparatus 300 (FIG. 27) such as a personal computer.

Designated by reference numeral 102 is an operating portion in which various information such as image forming conditions can be inputted to the control circuit portion 200. The operating portion 102 includes a display portion for displaying various pieces of information. In this embodiment, the operating portion 102 is provided on the door 13 of the main assembly An of the image forming apparatus.

Here, a front side of the image forming apparatus 100 of this embodiment is a side where a sheet tray 4 accommodating the sheet material P is moved in and out in a substantially horizontal direction. A rear side is an opposite side. Left and right is as seen from the front side. Up and down are based on the direction of gravity. The main assembly An of the image forming apparatus (apparatus main assembly) is the structural portions of the image forming apparatus except for the cartridge B.

With respect to the cartridge B and the members constituting the cartridge B, a longitudinal direction is parallel with a rotational axis direction of an electrophotographic photosensitive drum 62 as an image bearing member, and is a direction perpendicular to directions G1, G2 (FIG. 26) in which the cartridge B is mounted and demounted relative to the main assembly A. A widthwise direction is the directions G1, G2 in which the cartridge B is mounted and demounted relative to the main assembly A. The front side is the side seen from an upstream side with respect to the direction G1, and the rear side is the downstream side with respect to the inserting direction G1. Left and right of the cartridge B are left and right as seen from the front side.

In FIG. 27, a cartridge mounting portion 101 is substantially in the central portion of the main assembly A. The cartridge B is dismountably mounted to the mounting portion 101. In this embodiment, the cartridge B is an integral type process cartridge as will be described hereinafter. It comprises an electrophotographic photosensitive drum (drum) 62 as an image bearing member for bearing an image, and image forming process means including a charging means 66, a developing means 32 and a cleaning means 77.

In this embodiment, the charging means 66 includes a charging roller (elastic electroconductive roller), the developing means 32 includes a developing roller of a non-contact type developing system using magnetic one component toner as a developer, and the cleaning means 77 includes a cleaning blade.

The image forming apparatus 100 can form an image in the state that the cartridge B is mounted in place at the mounting portion 101 of the main assembly A. In such a state, a driving force receiving portion 63 the FIG. 26) of the cartridge B is coupled with an drive outputting portion (unshown) provided in the main assembly A side. By this, the driving force is transmitted from a driving mechanism portion (unshown) of the main assembly to the cartridge B, a rotatable members such as the drum 62, a developing roller 32, a developer feeding member 43 can be driven. In the image forming apparatus 100 of this embodiment, the right side of the main assembly An of the apparatus and the right side of the cartridge B are the driving side, and the left side is the non-driving side.

The electrical contact portion (unshown) of the cartridge B is electrically conducted with the electrical contact portion (unshown) of the main assembly An of the apparatus. By this, a bias voltage application from an electric energy supplying portion (unshown) in the main assembly A to the electric energy receiving member such as the charging roller 66, the developing roller 32 in the cartridge B.

Above the cartridge B, a laser scanner unit 3 as the exposure device (exposure means) is provided. The unit 3 outputs a laser beam modulated in accordance with an electrical image information inputted to the control circuit portion 200 from the host apparatus 300. The laser beam enters into the cartridge B through an exposure window 74 provided in the upper surface of the cartridge to the surface of the drum 62. To the lower surface of the drum 62 of the cartridge B, the transfer roller (transferring means) 7 is contacted to form a transfer nip with the drum 62. The transfer roller 7 is an elastic electroconductive roller and is supplied with a predetermined transfer bias.

Below the transfer roller 7 a sheet tray 4 accommodating sheet materials P is provided. The tray 4 is capable of being drawn out substantially in a horizontal direction at the front side of image forming apparatus 100. In the replenishment of the sheet material P, the tray 4 is drawn out. The drawn out tray 4 is pushed into the image forming apparatus. In FIGS. 25 and 27, designated by S1 is a direction of drawing tray 4 our, and S2 is a direction of pushing it in. Designated by 4a is a grip portion provided at the front side of the tray 4.

Above the tray 4 in the front side in the main assembly An of the apparatus, there are provided a pick-up roller 5a, a pair of retarding rollers 5b, a pair of feeding rollers 5c, a pair of registration rollers 5d, and a pre-transfer guide 6 are provided in the order named. By doing so, a sheet material feeding path is constituted from the tray 4 to the transfer roller 7.

In the rear side in the main assembly An of the apparatus, there is provided an fixing device (fixing means) 9 comprising a heating roller 9a and a pressing roller 9b. Between the transfer roller 7 and the fixing device 9, a sheet material feeding guide 8 is provided. At the rear side of the fixing device 9 in the main assembly An of the apparatus, there are provided a pair of feeding rollers 10a, a sheet material feeding path 10b for feeding upward from a pair of feeding rollers 10a, and a pair of discharging rollers 10 for further feeding. The upper surface of the main assembly An of the apparatus constitutes a discharging tray 11.

The image forming operations are as follows. The control circuit portion 200 actuates a driving mechanism portion in response to a print starting signal. By this, the drum 62 is rotated in the clockwise direction (arrow R) in FIG. 27 at a predetermined peripheral speed (process speed). The laser scanner unit 3, the developing roller 32, the developer feeding member 43, the transfer roller 7, the fixing device 9 and so on are driven in the predetermined direction at the predetermined speed. The charging roller 66 is rotated by the rotation of the drum 62. The charging roller 66 is supplied with a predetermined charging bias voltage from the electric energy supplying portion. By this, the surface of the drum 62 is uniformly charged to the predetermined polarity and potential.

The charged surface of the drum 62 is exposed to the scanning laser beam modulated in accordance with an image signal outputted from the laser scanner unit 3. By this, an electrostatic image corresponding to an exposure pattern is formed on the surface of the drum 62. The electrostatic image is developed by the developing roller 32 into a toner image (developer image) and is carried into the transfer nip between the drum 62 and the transfer roller 7.

On the other hand, the pick-up roller 5a is driven in a predetermined control timing timed with the output timing of the laser beam. By this, one sheet material P is picked out of the sheet tray 4 and is fed by the retarding roller pair 5b. The sheet material P is introduced into the transfer nip at the predetermined control timing by way of the feeding rollers 5c, registration rollers 5d, the pretransfer guide 6 and is fed by the transfer nip. During passage of the sheet material P through the transfer nip, the transfer roller 7 is supplied with a predetermined transfer bias from the electric energy supplying portion. By this, the toner image is sequentially transferred from the drum 62 onto the surface of the sheet material P.

The sheet material P passing through the transfer nip is separated from the surface of the drum 62 and is introduced to the fixing device 9 through the feeding guide 8. The surface of the drum 62 after the separation of the sheet material is cleaned by a cleaning blade 77 so that untransferred toner is removed to be prepared for the next image formation.

Is sheet material P introduced to the fixing device 9 is nipped and fed by the fixing nip and is heated and pressed. By this, the unfixed toner image is fixed into a fixed image on the surface of the sheet material. The sheet material P leaving the fixing device 9 is discharged to the discharging tray 11 as a print by way of the feeding roller pair 10a, the sheet material feeding path 10b and the discharging roller pair 10. The feeding direction of the sheet material (recording material feeding direction) is depicted by an arrow D.

(2) Cartridge

Figure 28:
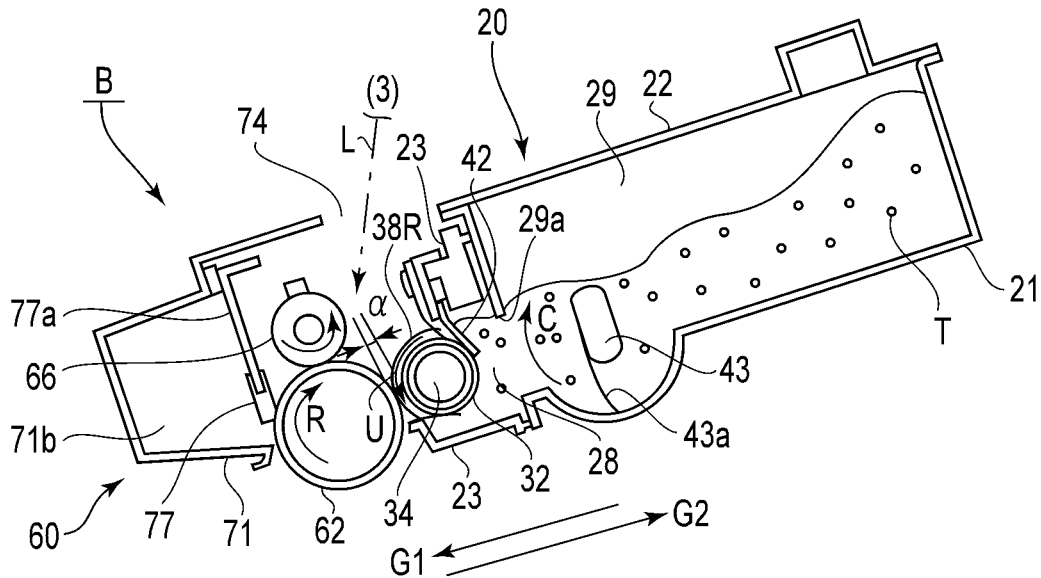
FIG. 28 is an enlarged view of a cartridge portion of the structure shown in FIG. 27.
Figure 29:
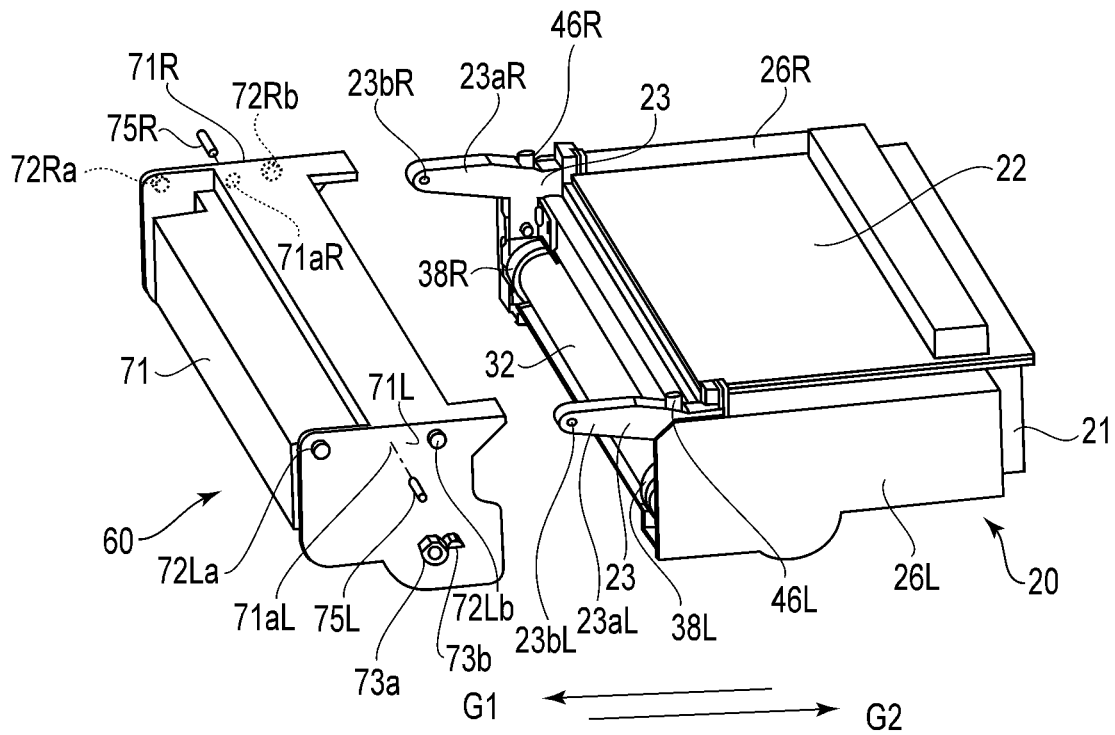
FIG. 29 is an exploded perspective view of a cleaning unit and a developing unit of the cartridge.

Referring to FIGS. 28 and 29, the structure of cartridge B will be described. FIG. 28 is an enlarged view of a cartridge portion of the structure shown in FIG. 27. The cartridge B of this embodiment is an integral type process cartridge which is a combination of a cleaning unit 60 and a developing unit 20. FIG. 29 is an exploded perspective view of the cleaning unit 60 and the developing unit 20.

The cleaning unit 60 includes a cleaning frame 71 elongated in the left-right direction. In the frame 71, there are provided a drum 62 as an image bearing member for carrying an image, a charging roller 66 as an image forming process means actable on the drum 62, and a cleaning blade 77.

The drum 62 is rotatably held at the left-hand shaft portion and the right-hand shaft portion between left and right side plates 71L and 71R of the frame 71 by bearing members.

The charging roller 66 extends above the drum 62 in parallel with the drum 62 and is rotatably held between the left and right side plate 71L and 71R of the frame 71 by the bearing members, and is pressed against the drum 62 by an urging member (unshown) with a predetermined urging force.

The cleaning blade 77 is an elastic blade and is fixed to a predetermined station of a residual toner chamber 71b in the frame 71 by a rigid supporting member 77a of metal or the like. The blade 77 is contacted at a predetermined urging force to the drum 62 counterdirectionally with respect to the rotational moving direction R of the drum 62.

The developing unit 20 includes a non-contact-type developing device using magnetic one component toner as a developer T in this embodiment. The unit 20 is an assembly including a toner accommodating container 21, an upper cap 22, a developing container 23, a developing blade 42, the developing roller 32, a magnet roller 34, the developer feeding member 43, a first side member 26L (left side), a second side member 26R (right side), an urging members 46L and 46R.

A toner chamber 29 is constituted by the toner accommodating container 21, the upper cap 22, the first side member 26L, and the second side member 26R and accommodates magnetic one component toner T as the developer. The developing container 23 is in fluid communication with the toner chamber 29 through an opening 29a. The developer feeding member 43 is provided in the toner chamber 29 and is rotatable in the clockwise direction (arrow C) in FIG. 28.

The developing roller 32 is disposed in the developing container 23. The developing roller 32 is in the form of a hollow roller (sleeve), and is rotatably held by bearing members between first second side members 26L, 26R (left and right). The left and right end portions of the developing roller 32 are provided with respective spacer rollers 38L, 38R as spacing members, concentrically with the developing roller 32. The spacer rollers 38L, 38R have the same outer diameter which is larger than an outer diameter of the developing roller 32 by a predetermined degree.

Inside the developing roller 32, a non-rotatable magnet roller (fixed magnet) 34 is provided. The developing blade 42 is an elastic member which has a base portion fixed to the developing container 23, and which has a free end contacted to the developing roller 32 to regulate a layer thickness of the toner carried on the surface of the developing roller 32. A surface of the developing roller 32 is exposed outwardly in a side opposite the opening 29a.

The cleaning unit 60 and the developing unit 20 are connected by left and right coupling members 75L, 75R so as to be rotatable relative to each other about the coupling members 75L, 75R. The connecting method will be described. As shown in FIG. 29, free end portions of left and right arm portions 23aL, 23aR formed at the left and right end portions of developing container 23 are provided with respective rotation holes 23bL, 23bR in parallel with the rotational axis of the developing roller 32. On the other hand, the left and right side plates 71L, 71 of the cleaning frame 71 are provided with holes 71aL, 71aR for receiving the left and right coupling members 75L, 75R.

The left and right coupling members 75L, 75R are inserted into the rotation holes 23bL, 23bR, respectively while the left and right arm portions 23aL, 23aR are aligned with predetermined positions of the cleaning frame 71. The left and right coupling members 75L, 75R are coaxial with each other.

By the connection between the cleaning unit 60 and the developing unit 20 in this manner, the cleaning unit 60 and the developing unit 20 are connected with each other so as to be rotatable relative to each other.

Left and right urging members (coil springs) 46L and 46R mounted to base portions of the arm portion 23aL, 23aR are contacted to the left and right cleaning frame 71, respectively. By the urging members 46L, 46R, the developing unit 20 is urged to the cleaning unit 60 about the left and right coupling members 75L, 75R.

By this, the left and right spacer rollers 38L, 38R of the developing roller 32 are assuredly press-contacted to outer peripheral portions at the left and right and portions of the drum 62, and therefore, the developing roller 32 is spaced from the drum 62 by a predetermined gap α as shown in FIG. 28. The exposure window 74 is formed between the cleaning unit 60 and the developing unit 20.

In the state that the cartridge B is mounted in place in the cartridge mounting portion 101, the cleaning unit 60 of the cartridge B is urged to the positioning portion of the main assembly An of the apparatus by a fixing mechanism (unshown) in the main assembly An of the apparatus. By this, the cartridge B is held in place in the main assembly An of the apparatus. In such a state, a driving force receiving portion 63 the FIG. 26) of the cartridge B is coupled with an drive outputting portion (unshown) provided in the main assembly A side. The electrical contact portion (unshown) of the cartridge B is electrically conducted with the electrical contact portion (unshown) of the main assembly An of the apparatus. In this state, the image forming apparatus 100 is capable of carrying out the image forming operation.

That is, the drum 62 can be driven at a predetermined speed in the clockwise direction indicated by an arrow R in FIG. 28. The charging roller 66 is rotated by the rotation of the drum 62. The developing roller 32 is rotated at a predetermined speed in the counterclockwise direction indicated by an arrow U around the magnet roller 34. The charging roller 66 and the developing roller 32 are supplied with a predetermined charging bias voltage and a developing bias voltage at the predetermined control timing, respectively.

The feeding member 43 is rotated at a predetermined speed in the clockwise direction indicated by the arrow C. By the rotation of the feeding member 43, a sheet (paddle) 43a of the feeding member 43 feeds the toner T from the toner chamber 29 into the toner supply chamber 28 of the developing container 23 through the opening 29a. The sheet 43a is made of a flexible sheet of PPS, PC, PET, for example and stirs and feeds the toner T.

A part of the toner T fed into the toner supply chamber 28 is attracted by the magnetic force of the magnet roller 34 on the surface of the developing roller 32 and is carried by the rotation of the developing roller 32 while being regulated in the layer thickness by the developing blade 42. The toner layer is carried by further rotation of the developing roller 32 to the developing zone where the developing roller 32 is opposed to the drum 62 to develop the electrostatic image on the drum 62. Remaining toner layer not consumed by the development returns into the toner supply chamber 28 by the further rotation of the developing roller 32, and the developing roller 32 is supplied with the toner in the toner supply chamber 28.

The drum 62 after the toner image transfer onto the sheet material P it cleaned by the cleaning blade 77 so that the residual toner on the outer peripheral surface is removed, by which the drum 62 becomes usable for the next image forming process operation. The toner removed from the drum 62 is stored in the residual toner chamber 71b of the cleaning unit 60.

(3) Cartridge Exchanging System

The developer (toner) T accommodated in the developing unit of the cartridge B is consumed with the image formation.

Therefore, a means (unshown) for detecting a developer remainder of the cartridge B is provided, and value detected remaining amount is compared with a threshold for pre-set cartridge lifetime forenotice or lifetime warning by the control circuit portion 200. As for the cartridge B with which the detected remaining amount is smaller than the threshold, the lifetime forenotice or the lifetime warning are displayed on the display portion of the operating portion 102. By this, the user is prompted to prepare for the new cartridge B or to exchange the cartridge B to maintain the quality of the output image.

The image forming apparatus 100 of this embodiment is provided with the door 13 to open substantially an upper half-portion of the front side and substantially a front half-portion of the top side. The door 13 can be opened and closed about the hinge portion (rotational center) 13a relative to the main assembly An of the apparatus. The door 13 is rotatable about the hinge portion 13a between a close position W1 shown in FIGS. 25 and 27 and an open position W2 where it is raised at the rear side as shown in FIG. 26.

In the close position W1, the door 13 is held by locking means (unshown). A grip portion 13b of the door 13 is provided with a releasing member operable by fingers to release the locking of the door 13 so that the door 13 can be moved from the close position W1 to the open position W2. In this embodiment, the exchange of the cartridge B relative to the main assembly An of the apparatus is carried out through the door 13 opened as shown in FIG. 26.

When the door 13 is moved from the close position W1 to the open position W2, the door 13 is held at the open position W2 by a stand member 13c. By opening the door 13, substantially the upper half-portion of the front side and front half-portion of the upper side of main assembly An of the apparatus are opened (opening 103) as shown in FIG. 26. Through the opening 103, the cartridge B is inserted to the cartridge mounting portion 101 and is taken out of the main assembly An of the apparatus.

In the state that the cartridge B is mounted to the cartridge mounting portion 101 of the main assembly An of the apparatus, the front side of mounted cartridge B (developing unit 20 side) is exposed through the opening 103. In the state that the cartridge B is not mounted, the cartridge mounting portion 101 is seen (FIG. 26).

When the cartridge B is mounted at the mounting portion 101, an interrelating mechanism (unshown) is provided to release the locking mechanism in interrelation with the movement of the door 13 from the close position W1 to the open position W2 so as to release the cartridge B from the positioned and fixed state. In addition, the drive outputting portion of the main assembly An of the apparatus is disengaged from the driving force receiving portion 63 of the cartridge B. By this, the cartridge B becomes capable of being taken out of the mounting portion 101.

Figure 31:
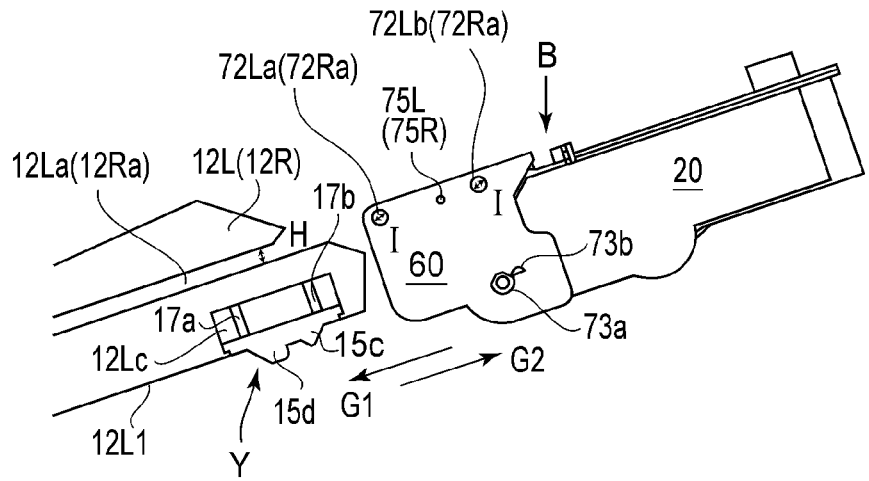
FIG. 31 is an illustration when the cartridge is inserted into the main assembly of the image forming apparatus.

As shown in FIGS. 29 and 31, on the outer surfaces of the left and right side plates 71L, 71R of the cleaning frame 71 of the cleaning unit 60, mounting and demounting guide bosses (mounting and demounting regulating portions) 72La, 72Lb, 72Ra and 72Rb are provided symmetrically.

In this embodiment, two of the mounting and demounting guide bosses (72La and 72Lb) are provided at a downstream position and an upstream position with respect to the inserting direction G1 of the cartridge B with a predetermined gap on one side, and two of the mounting and demounting guide boss (72Ra and 72Rb) are provided similarly on the other side. The mounting and demounting guide bosses 72La and 72La are in the downstream side, and the mounting and demounting guide bosses 72Lb and 72Lb are in the upstream side.

Figure 30:
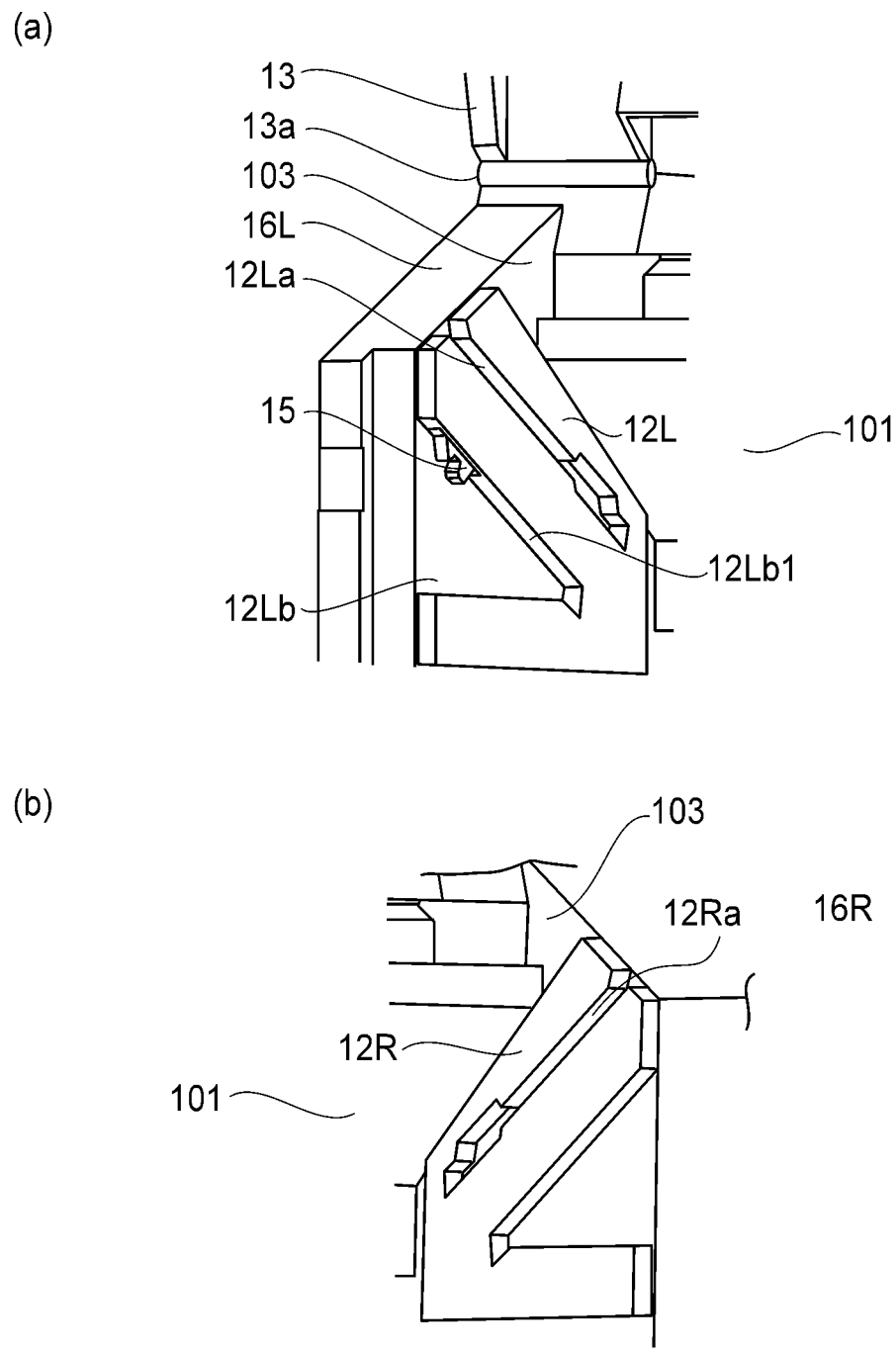
FIG. 30 is a partial perspective view (a) of a left-hand guiding member portion of a cartridge mounting portion, and a partial perspective view (b) of a right-hand guiding member portion.

On the other hand, as shown in parts (a) and (b) of FIG. 30, on an inner sides of left and right side plates 16L, 16R of the cartridge mounting portion 101 of the main assembly An of the apparatus, left and right guiding members 12L, 12R are provided symmetrically. The guiding members 12L, 12R are inclined members which descend obliquely from the front side toward the rear side as seen from the apparatus front side. The guiding members 12L and 12R have respective guide grooves 12La, 12Ra. The guide grooves 12La and 12Ra are symmetrical and descend toward the rear side.

As shown in FIG. 31, the groove widths H of the guide grooves 12La, 12Ra are slightly larger than the diameters I of the mounting and demounting guide bosses 72La 72Lb, 72Ra, 72Rb of the cartridge B.

When the cartridge B is mounted to the cartridge mounting portion 101, the left-right side mounting and demounting guide bosses 72La, 72Lb and 72Ra and 72Rb are engaged with the guide grooves 12La, 12Ra of the left-right side guiding members 12L, 12R, respectively. The mounting and demounting guide bosses 72La, 72Lb, 72Ra and 72Rb are guided along the guide grooves 12La, and 12Ra.

When the cartridge B is taken out of the mounting portion 101 of the main assembly An of the apparatus, the user grips the front side of mounted cartridge B, that is, the developing unit 20 side exposed through the opening 103. The cartridge B is pulled in the dismounting direction (arrow G2) in the FIGS. 26, 31 so that the mounting and demounting guide bosses 72La, 72Lb, 72Ra and 72Rb move along the guide grooves 12La, 12Ra of the left and right guiding members 12L, 12R. By this, the cartridge B is taken out of the main assembly An of the apparatus.

When the cartridge B is inserted to the mounting portion 101 of main assembly An of the apparatus, the user grips the developing unit side and insert the cartridge B toward the mounting portion 101 through the opening 103 with the cleaning unit 60 side at the leading side. Then, the left and right mounting and demounting guide bosses 72La, 72Lb, 72Ra and 72Rb of the cartridge B are engaged with the guide grooves 12La and 12Ra of the left and right guiding members 12L and 12R.

Then, the cartridge B is moved in the inserting direction (arrow G1) in the FIGS. 26, 31 so that the left and right mounting and demounting guide bosses 72La, 72Lb, 72Ra, 72Rb move along the guide grooves 12La, 12Ra of the left and right guiding members 12L, 12R, respectively. Is mounting and demounting guide bosses 72La, 72Lb, 72Ra, 72Rb of the cartridge B are regulated by the guide grooves 12La, 12Ra, by which the attitude of the cartridge B is kept during the insertion. The cartridge B is inserted sufficiently until the insertion is stopped by a stopper (unshown).

Then, the door 13 is moved from the open position W2 to the close position W1 against the stand member 13c, and is locked by the locking means. By the interrelating mechanism, the fixing mechanism is locked in interrelation with the movement of the door 13 from the open position W2 to the close position W1. By this, the cartridge B is positioned and fixed to the positioning portion of the main assembly An of the apparatus. In addition, the drive outputting portion of the main assembly An of the apparatus is coupled with the driving force receiving portion 63 of the cartridge B.

(4) Erroneous Insertion Prevention Structure

A structure for preventing insertion of a wrong cartridge will be described. The case when a proper cartridge B1 is inserted into the apparatus main assembly A1 will be described first in the following (4-1). Then, the case when an improper cartridge B2 is inserted into the apparatus main assembly A1, and the case when an improper cartridge B1 is inserted into an apparatus main assembly A2 not into the apparatus main assembly A1 will be described in (4-2) and (4-3), respectively.

As to the case when the proper cartridge B2 is inserted into the apparatus main assembly A2, the description is omitted because the situation is the same as with the case when a proper cartridge B1 is inserted into the apparatus main assembly A1. In the following description, the same reference numerals are assigned to the apparatus main assembly A1, the apparatus main assembly A2, the cartridge B1 and the cartridge B2, and the detailed description of the respective elements is omitted for simplicity.

(4-1) Case in which the Proper Cartridge B1 is Inserted into the Apparatus Main Assembly A1:

Referring to FIGS. 24, 26 and 29-35, this case will be described.

As shown in FIGS. 29 and 31, the non-driving side of the cleaning frame 71 of the cartridge B1, the outer surface of the left side plate 71L in this embodiment is provided with a first contact portion 73a and a second contact portion 73b (erroneous insertion prevention bosses) in the form of bosses.

The erroneous insertion prevention boss may be provided at each or one of the driving side (right side) and the non-driving side (left side) of the cartridge B1. In this embodiment, it is provided at the in non-driving side of the cartridge B1.

An erroneous insertion prevention structure of the apparatus main assembly A1 which will be described hereinafter is provided in the non-driving side in this embodiment.

Figure 32:
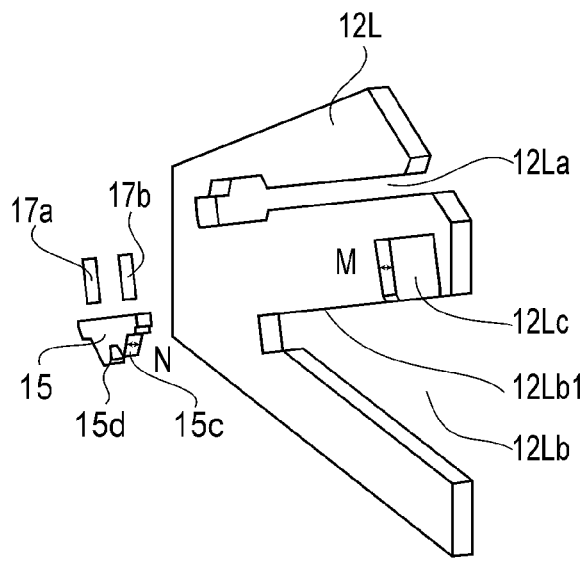
FIG. 32 is a perspective view illustrating a structure of an erroneous insertion preventing member.
Figure 33:
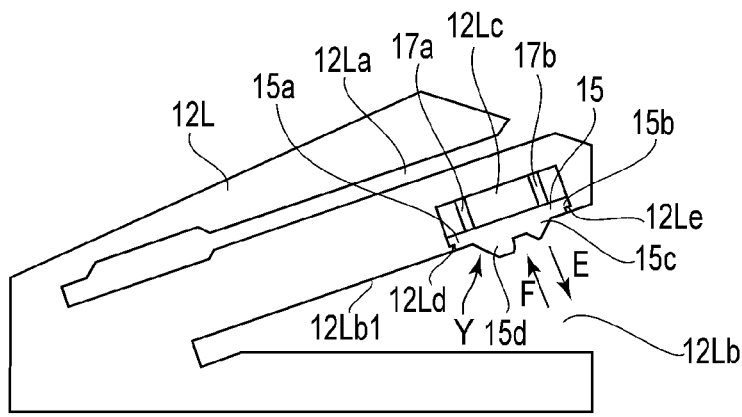
FIG. 33 is a sectional view illustrating a structure of an erroneous insertion preventing member.
Figure 34:
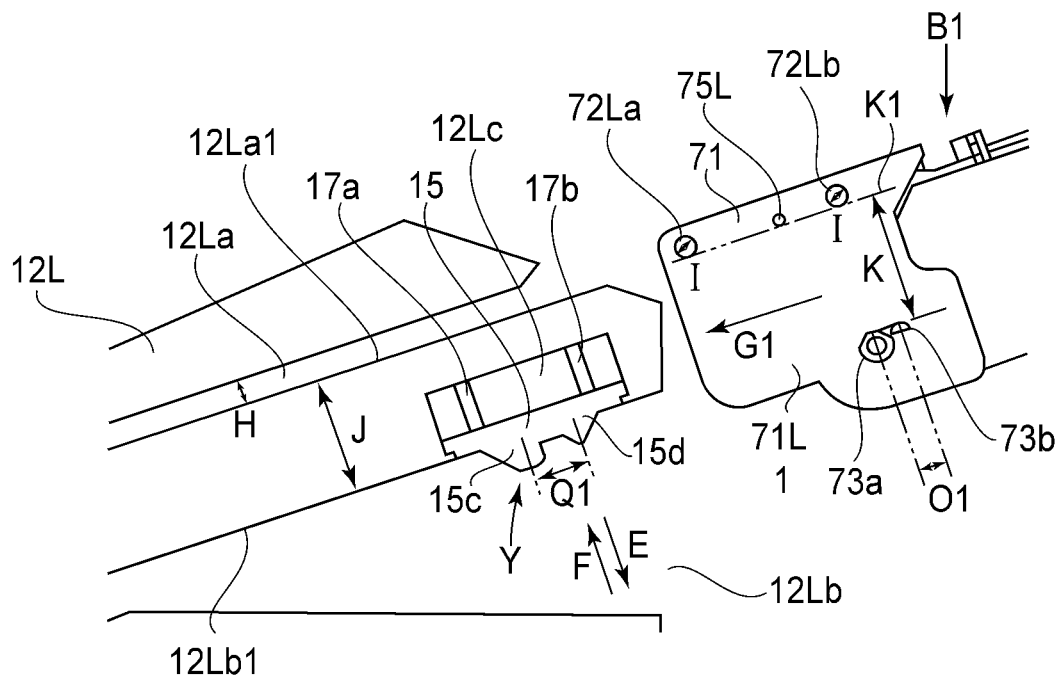
FIG. 34 is an illustration of an erroneous insertion prevention structure.

As shown in parts (a) of FIGS. 26 and 30 and in FIGS. 32-34, the left side guiding member 12L of apparatus main assembly A1 is provided with an erroneous insertion prevention groove 12Lb. Here, as shown in FIG. 34, a distance between an upper surface 12Lb1 of the erroneous insertion prevention groove 12Lb and a lower surface 12La1 of the guide groove 12La is J. A distance between the erroneous insertion prevention bosses 73a, 73b and a tangent line K1 of the erroneous insertion prevention boss (73a, 73b) sides of the mounting and demounting guide bosses 72La, 72Lb is K. The distance J is smaller than the distance K.

Therefore, when the cartridge B1 is inserted into the apparatus main assembly A1 while the mounting and demounting guide bosses 72La, 72Lb of the cartridge B moves along the guide groove 12La, the erroneous insertion prevention bosses 73a and 73b enter the erroneous insertion prevention groove 12Lb.

Here, the difference between the distance K between the tangent line K1 and the erroneous insertion prevention bosses 73a, 73b and the distance J between the upper surface 12Lb1 and the lower surface 12La1 is larger than the difference between the groove width H of the guide groove 12La and the diameter I of the mounting and demounting guide boss 72La, that is, K−J>H−I. Therefore, the erroneous insertion prevention bosses 73a, 73b do not contact the upper surface 12Lb1 of the erroneous insertion prevention groove 12Lb, and the cartridge B1 is inserted into the apparatus main assembly A1.

By this, as described hereinbefore, the insertion attitude of the cartridge B1 at the time when the cartridge B1 is inserted into the apparatus main assembly A1 is determined by the mounting and demounting guide bosses 72La, 72Lb of the cartridge B1 being limited by the guide groove 12La.

As shown in parts (a) of FIGS. 26 and 30, the erroneous insertion preventing member (movable member) 15 is provided so that a part thereof projects into the erroneous insertion prevention groove 12Lb of the left side guiding member 12L. As shown in the exploded perspective view of FIG. 32, the guiding member 12L is provided with a recess 12Lc in a surface contacting a side plate 16L of the apparatus main assembly A1.

A depth M of the recess 12Lc in the longitudinal direction (left-right direction of the apparatus) is larger than the width N of the erroneous insertion preventing member 15 in the longitudinal direction (in the left-right direction of the apparatus). As shown in FIG. 33, erroneous insertion preventing member 15 is accommodated in the recess 12Lc of the guiding member 12L and is urged in the direction of an arrow E by compression springs 17a, 17b and is retractable in the direction of an arrow F.

At this time, projection amount regulating projections 15a, 15b of the erroneous insertion preventing member 15 contact projection amount regulating projections 12Ld, 12Le of the guiding member 12L, respectively, by which the projection amount of the erroneous insertion preventing member 15 from the guiding member 12L is limited. In this manner, the erroneous insertion preventing member 15 is held at a position Y in which a part of the erroneous insertion preventing member 15 enters the erroneous insertion prevention groove 12Lb of the guiding member 12L.

As described hereinbefore, when the cartridge B1 is inserted into the apparatus main assembly A1, the mounting and demounting guide bosses 72La, 72Lb of the cartridge B1 pass through the guide groove 12La, and the erroneous insertion prevention bosses 73a, 73b pass the erroneous insertion prevention groove 12Lb. That is, as shown in FIG. 34, the cartridge B1 can be inserted into the apparatus main assembly A1 by moving the cartridge B1 in a direction of an arrow G1 which is an inserting direction to the guiding member 12L.

Figure 24:
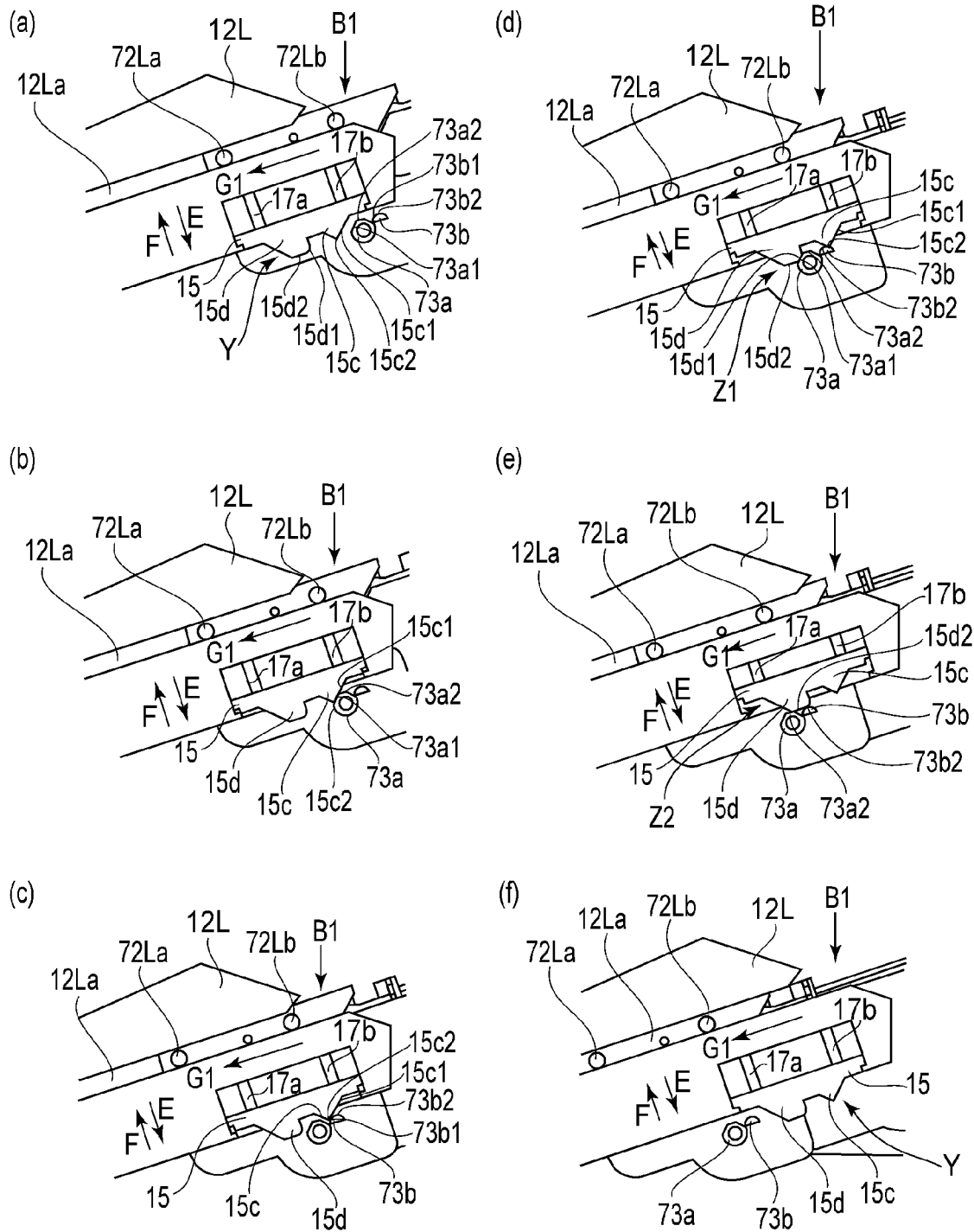
FIG. 24 is an illustration of an operation of an erroneous insertion prevention structure at the time when a cartridge is inserted into the main assembly of the image forming apparatus in the structure of Embodiment 4.
Figure 35:
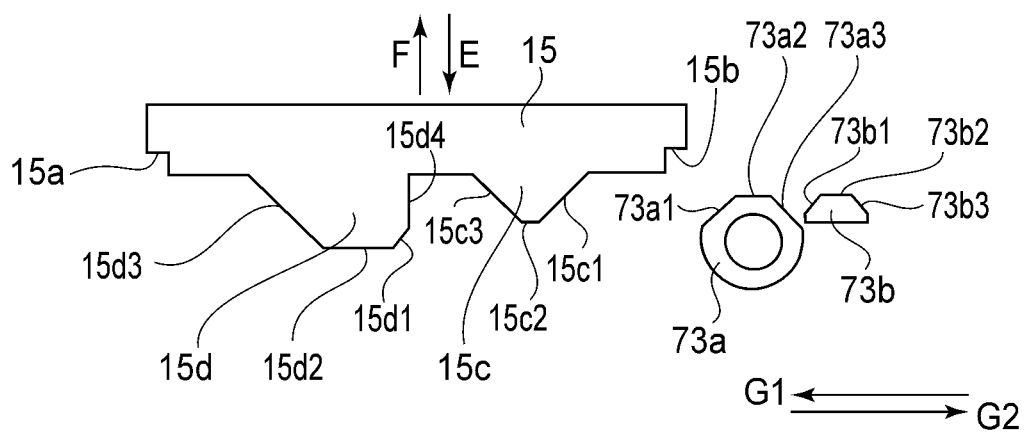
FIG. 35 is an enlarged view of an erroneous insertion prevention boss and an erroneous insertion preventing member.

Referring to parts (a)-(f) of FIG. 24, the operation of the erroneous insertion prevention structure at the time when the cartridge B1 is inserted into the apparatus main assembly A1 will be described. FIG. 35 is an enlarged view of a portion of the insertion prevention bosses 73a, 73b of the cartridge B1 and a portion of the erroneous insertion preventing member 15 of the apparatus main assembly A1. Referring to FIG. 24, the operation of the erroneous insertion prevention structure will be described.

(a) the cartridge B1 is moved in the inserting direction of the arrow G1 so that the mounting and demounting guide bosses 72La, 72Lb of the cartridge B1 move along the guide groove 12La of the guiding member 12L. At this time, the erroneous insertion preventing member 15 is in the free state, that is, it is in the projected position Y.

(b) so, the erroneous insertion prevention boss 73a contacts the first portion-to-be-contacted 15c (first projection) of the erroneous insertion preventing member 15 placed in the projected position Y. At this time, a raising surface 73a1 of the erroneous insertion prevention boss 73a contacts the surface 15c1 of the first projection 15c of the erroneous insertion preventing member 15 to retract the erroneous insertion preventing member 15 in the direction of the arrow F.

And, the erroneous insertion preventing member 15 is retracted to a first retracted position Z1 where a surface 15c2 of the first projection 15c contacts a surface 73a2 of the erroneous insertion prevention boss 73a. By this, the cartridge B1 can be moved further in the direction of the arrow G1.

(c) similarly, when the erroneous insertion prevention boss 73b contacts to the first projection 15c, the erroneous insertion preventing member 15 is retracted in the direction of the arrow F. That is, the erroneous insertion preventing member 15 is retracted to the first retracted position Z1 where the surface 15c2 of the first projection 15c contacts the surface 73a2 of the erroneous insertion prevention boss 73a.

In this manner, the first projection 15c of the erroneous insertion preventing member 15 retracts in the direction of an arrow F which is a retracting direction of the erroneous insertion preventing member 15, from the insertion path of the erroneous insertion prevention bosses 73a, 73b of the cartridge B1. By this, the erroneous insertion prevention bosses 73a, 73b passes the portion away from the first projection 15c in the direction of an arrow E.

(d) when the cartridge B1 is further moved, the erroneous insertion prevention boss 73a abuts to a second portion-to-be-contacted 15d (second projection) of the erroneous insertion preventing member 15 while the erroneous insertion prevention boss 73b keeps the erroneous insertion preventing member 15 retracted to the first retracted position Z1.

At this time, the raising surface 73a1 of the erroneous insertion prevention boss 73a abuts to a surface 15d1 of the second projection 15d of the erroneous insertion preventing member 15, so that the erroneous insertion preventing member 15 is retracted from the first retracted position Z1 further in the direction of the arrow F.

The erroneous insertion preventing member 15 moves to a second retracted position Z2 which is further retracted from the first retracted position Z1 in which the surface 15d2 of the second projection 15d contacts the surface 73a2 of the erroneous insertion prevention boss 73a. By this, the cartridge B1 can be moved further in the direction of the arrow G1.

(e) when the cartridge B1 is further moved, the surface 73b2 of the erroneous insertion prevention boss 73b abuts to the surface 15d2 of the second projection 15d of the erroneous insertion preventing member 15, while the erroneous insertion prevention boss 73a keeps the erroneous insertion preventing member 15 in the second retracted position. In this manner, the second projection 15d of the erroneous insertion preventing member 15 retracts from the inserting path of the erroneous insertion prevention bosses 73a, 73b of the cartridge B1 in the direction of the arrow F which is the retracting direction of the erroneous insertion preventing member 15. By this, the erroneous insertion prevention bosses 73a, 73b passes the portion away from the second projection 15c in the direction of the arrow E.

(f) by further moving the cartridge B1, the erroneous insertion prevention boss 73b of the cartridge B1 is spaced from the second projection 15d of the erroneous insertion preventing member 15 so that the erroneous insertion preventing member 15 returns to the projected position Y.

In this manner, the erroneous insertion preventing member 15 retracts from the inserting path of the erroneous insertion prevention bosses 73a, 73b of the cartridge B1 in the direction of the arrow F, so that the erroneous insertion prevention bosses 73a, 73b are permitted to pass the portion away from the erroneous insertion preventing member 15 in the direction of the arrow E. Therefore, the cartridge B1 can be inserted to the image forming position of the apparatus main assembly A1.

Figure 36A:
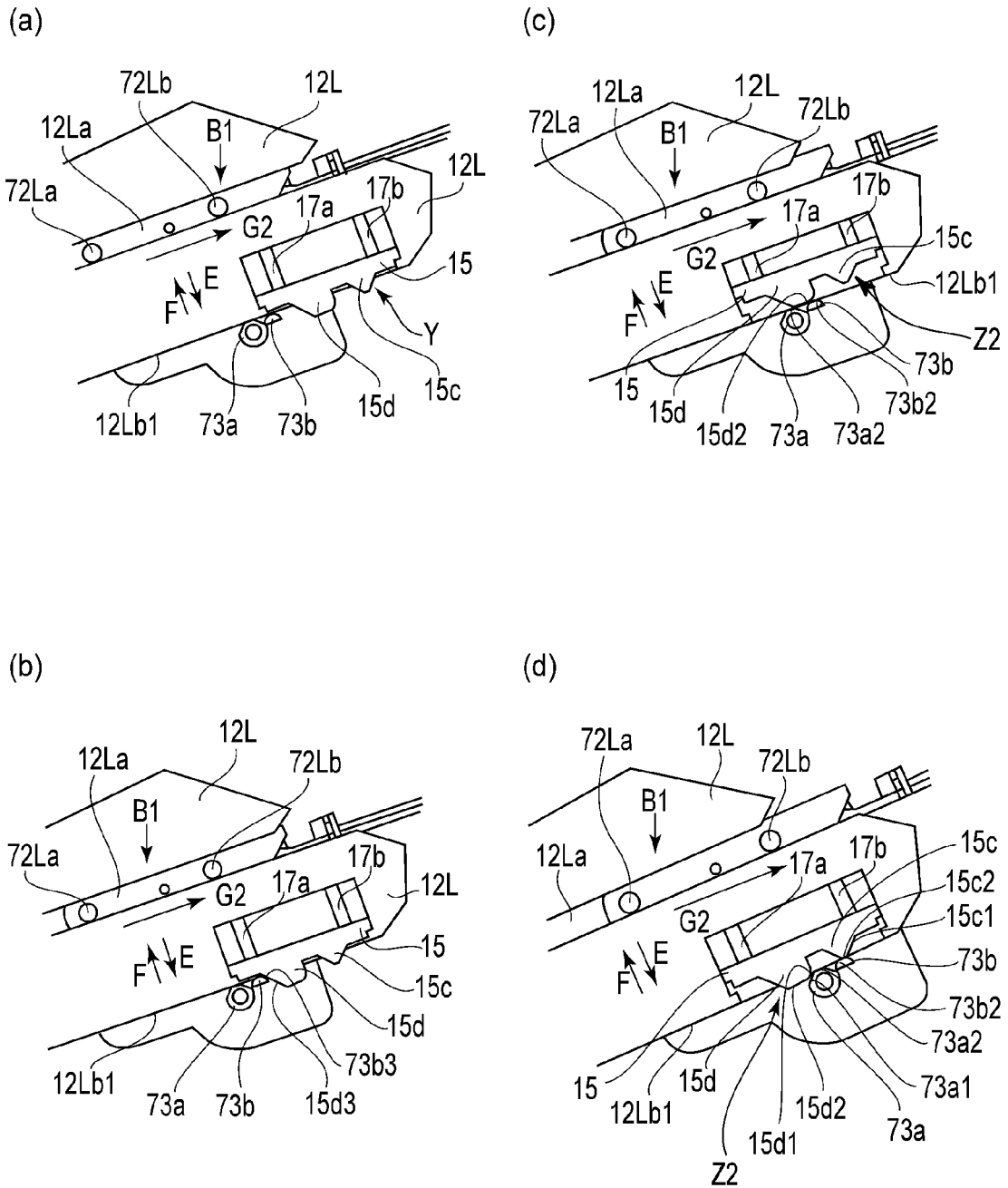
FIG. 36A is a first illustration of an operation of an erroneous insertion prevention structure at the time when the cartridge is taken out of the main assembly of the image forming apparatus.
Figure 36B:
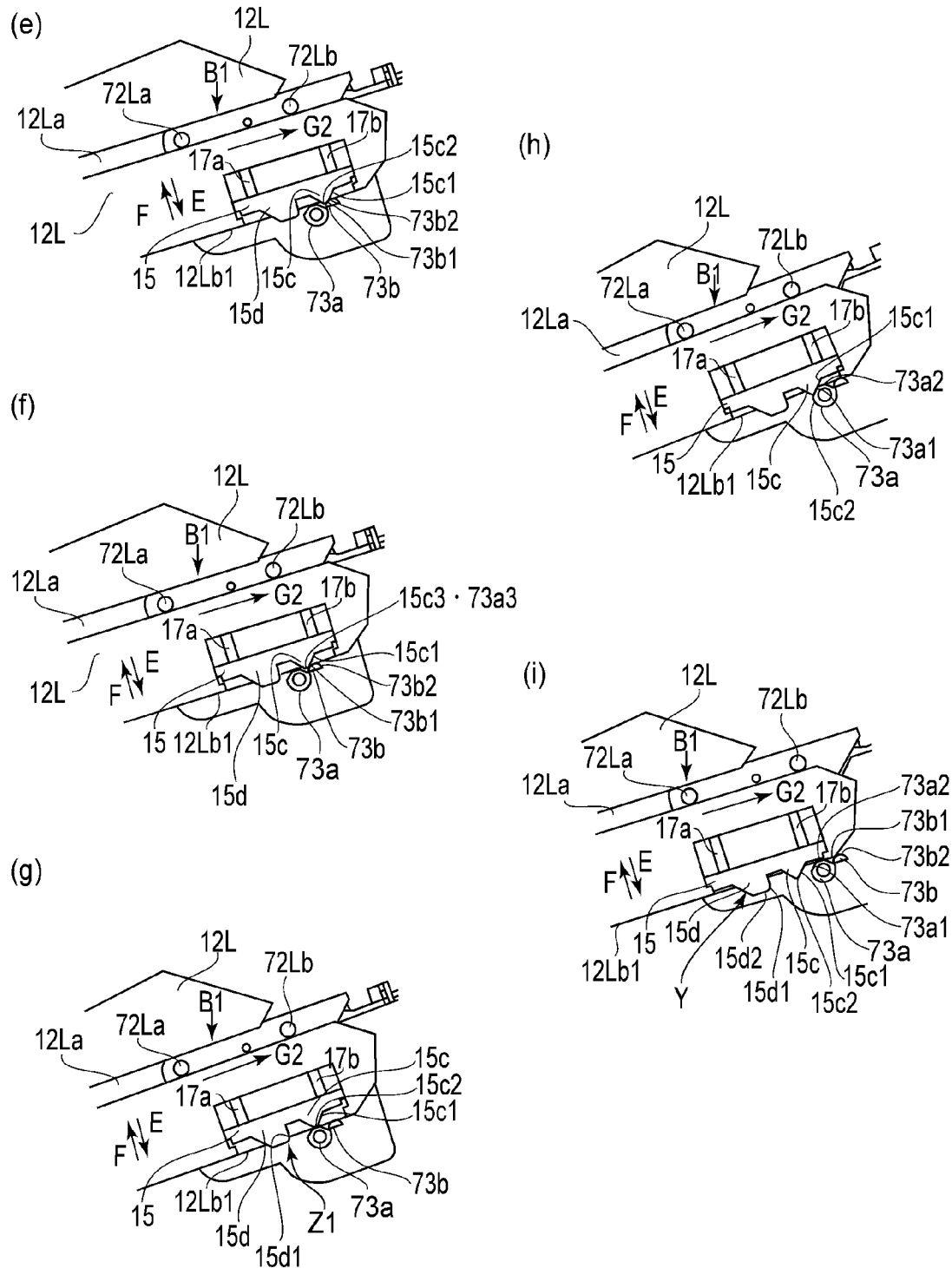
FIG. 36B is a second illustration of an operation of an erroneous insertion prevention structure at the time when the cartridge is taken out of the main assembly of the image forming apparatus.

Referring to parts (a)-(d) of FIG. 36A and parts (e)-(i) of FIG. 36B, the operation of the erroneous insertion prevention structure at the time when the cartridge B1 in the cartridge mounting portion 101 is taken out of the apparatus main assembly A1 will be described. The operation at the time of removal is a reciprocal of the operation at the time of insertion.

(a) the cartridge B1 is moved in the removing direction of the arrow G2 so that the mounting and demounting guide bosses 72La, 72Lb of the cartridge B1 move along the guide groove 12La of the guiding member 12L. At this time, the erroneous insertion preventing member 15 is in the free state, that is, it is in the projected position Y.

(b) so, a raising surface 73b3 of the erroneous insertion prevention boss 73b contacts to a surface 15d3 of the erroneous insertion preventing member 15.

(c) when the cartridge B1 is further moved, the erroneous insertion preventing member 15 retracts in the direction of the arrow F by the abutment of the raising surface 73b3 to the surface 15d3. The erroneous insertion preventing member 15 retracts until the surface 15d2 of the second projection 15d abuts to the surface 73b2 of the erroneous insertion prevention boss 73b (second retracted position Z2). By this, further movement of the cartridge B1 in the direction of the arrow G1 becomes possible so that the erroneous insertion prevention bosses 73b and 73a pass by moving in the projecting direction of the second projection 15d.

Even when the erroneous insertion prevention boss 73b passes by the surface 15d2 of the second projection 15d, the erroneous insertion preventing member 15 is kept in the second retracted position Z2 by the erroneous insertion prevention boss 73a moving at the surface 15d2 of the second projection 15d.

(d) when the cartridge B1 is moved further, the erroneous insertion prevention boss 73a passes by the surface 15d2 of the second projection 15d, and the surface 73a1 of the erroneous insertion prevention boss 73a abuts to the surface 15d1 of the second projection 15d, so that the erroneous insertion preventing member 15 projects in the direction of the arrow E. At this point, the erroneous insertion prevention boss 73b is at the position corresponding to the first projection 15c, and the surface 15c2 of the first projection 15c contacts the surface 15c2 of the erroneous insertion prevention boss 73b, so that the erroneous insertion preventing member 15 is held at the first retracted position.

(e) when the cartridge B1 is further moved, the erroneous insertion prevention boss 73b passes by the first projection 15c, and a surface 73b1 of the erroneous insertion prevention boss 73b contacts to the surface 15c1 of the first projection 15c.

(f) subsequently, a surface 73a3 of the erroneous insertion prevention boss 73a abuts to a surface 15c3 of the first projection 15c. In the process from (e) to (f), the erroneous insertion preventing member 15 projects slightly beyond the first retracted position in the direction of the arrow E.

When the cartridge B1 is further moved, the erroneous insertion preventing member 15 retracts in the direction of the arrow F by the abutment of the surface 73a3 to the surface 15c3. Erroneous insertion preventing member 15 retracts to the position in which the surface 15c2 of the first projection 15c contacts to the surface 73a2 of the erroneous insertion prevention boss 73a. The erroneous insertion preventing member 15 retracts to the first retracted position Z1. By this, the cartridge B1 can be moved further in the direction of the arrow G2.

(h) when the cartridge B1 is moved further, the surface 73a2 of the erroneous insertion prevention boss 73a passes by the surface 15c2 of the first projection 15c, and the surface 73a1 of the erroneous insertion prevention boss 73a contacts to the surface 15c1 of the first projection 15c.

(i) when the cartridge B1 is moved further, the erroneous insertion prevention boss 73a departs the first projection 15c, and the cartridge B1 is taken out of the main assembly An of the apparatus. The erroneous insertion preventing member 15 projects in the direction of the arrow E to the initial projected position Y.

In this manner, the erroneous insertion prevention bosses 73a, 73b of the cartridge B1 passes beyond the second projection 15d and the first projection 15c of the erroneous insertion preventing member 15, so that the cartridge B1 can be taken out of the apparatus main assembly A1.

Figure 37:
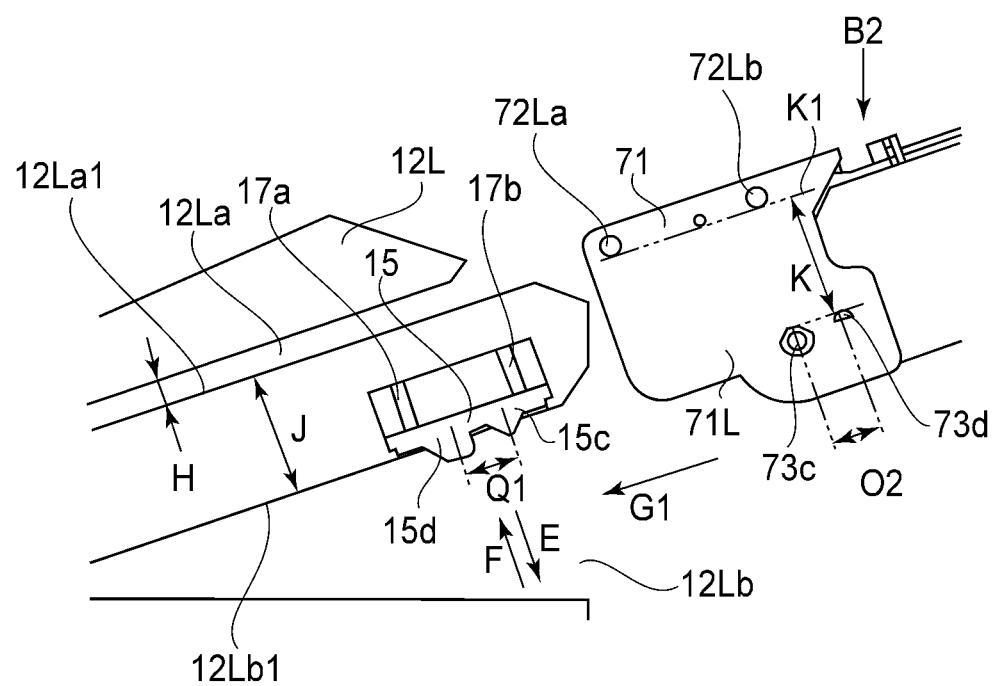
FIG. 37 is an illustration of an erroneous insertion prevention boss for an improper cartridge.
Figure 38:
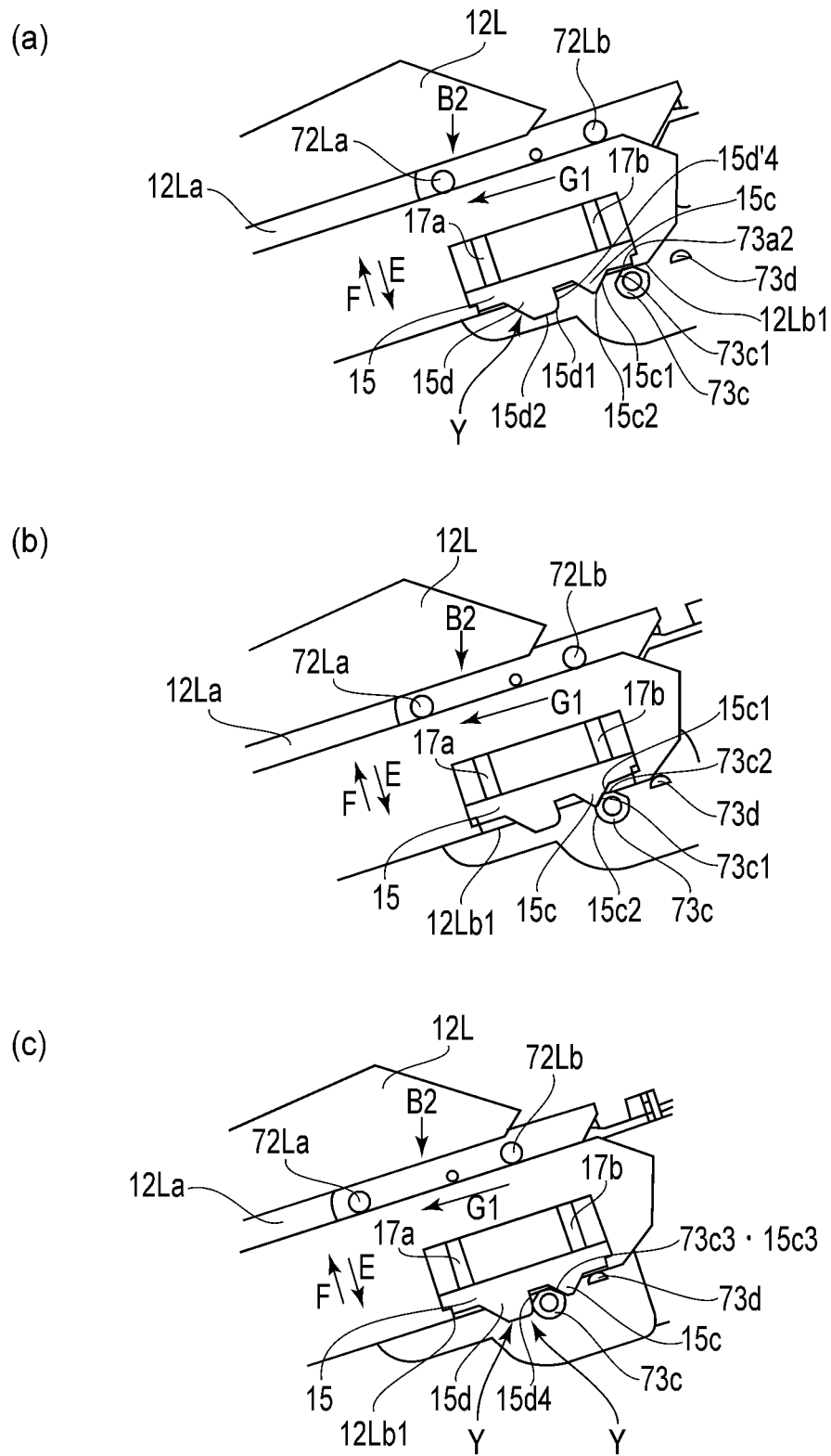
FIG. 38 is an illustration of an operation of the erroneous insertion prevention structure at the time when an improper cartridge is inserted.

(4-2) The Case when in which an Improper Cartridge B2 is Inserted into the Apparatus Main Assembly A1:

Referring to FIGS. 34, 37 and 38, the case when the improper cartridge B2 is inserted into the apparatus main assembly A1 will be described. FIG. 37 is an illustration of an erroneous insertion prevention boss for an improper cartridge. FIG. 38 illustrates an operation of the erroneous insertion preventing structure when the cartridge B2 is inserted into the apparatus main assembly A1.

As shown in FIG. 37, the non-driving side of the cleaning frame 71 (left side plate 71L) of the cartridge B2 is provided with an erroneous insertion prevention bosses 73c, 73d similarly to the case when of the cartridge B1 (FIG. 34). A distance O2 measured in the direction of arrow G1 (FIG. 37, inserting direction) between the erroneous insertion prevention boss 73c and the erroneous insertion prevention boss 73d is larger than a distance O1 the erroneous insertion prevention bosses 73a, 73b shown in FIG. 34.

Referring to parts (a)-(c) of FIG. 38, the operation when the cartridge B2 is inserted into the apparatus main assembly A1 will be described.

(a) the cartridge B2 is moved in the inserting direction of the arrow G1 so that the mounting and demounting guide bosses 72La, 72Lb of the cartridge B2 move along the guide groove 12La of the guiding member 12L. At this time, the erroneous insertion preventing member 15 is in the free state, that is, it is in the projected position Y.

(b) then, the erroneous insertion prevention boss 73c abuts to the first projection 15c of the erroneous insertion preventing member 15. At this time, a raising surface 73c1 of the erroneous insertion prevention boss 73c contacts the surface 15c1 of the first projection 15c of the erroneous insertion preventing member 15 to retract the erroneous insertion preventing member 15 in the direction of the arrow F. The erroneous insertion preventing member 15 moves to the first retracted position Z1 where the surface 15c2 of the first projection 15c abuts to a surface 73c2 of the erroneous insertion prevention boss 73c. By this, the cartridge B2 can be moved further in the direction of the arrow G1.

(c) when the cartridge B2 is moved further, the erroneous insertion prevention boss 73c abuts to a surface 15d4 of the second projection 15d of the erroneous insertion preventing member 15. This is because, as described hereinbefore, the erroneous insertion preventing member 15 is urged in the direction of the arrow E by the compression springs 17a, 17b, so that it is kept in the projected position Y.

By this, the cartridge B2 is prevented from further movement in the direction of the arrow G1. Therefore, the cartridge B2 cannot be inserted to the image forming position of the apparatus main assembly A1.

It is possible to move the cartridge B2 in the removal direction (G2) from this position because a surface 73c3 of the erroneous insertion prevention boss 73c abuts to the surface 15c3 of the first projection 15c to retract the erroneous insertion preventing member 15 to the first retracted position Z1. The erroneous insertion preventing member 15 resets to the projected position Y by restoring the free state.

Figure 39:
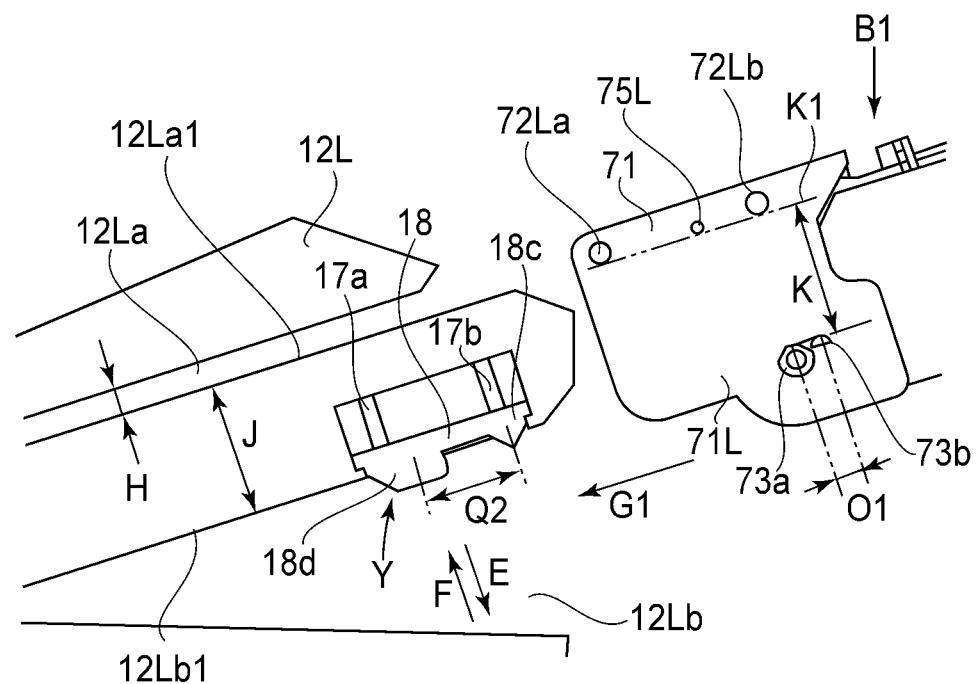
FIG. 39 is an illustration of an erroneous insertion prevention structure with respect to a different main assembly of the image forming apparatus.
Figure 40:
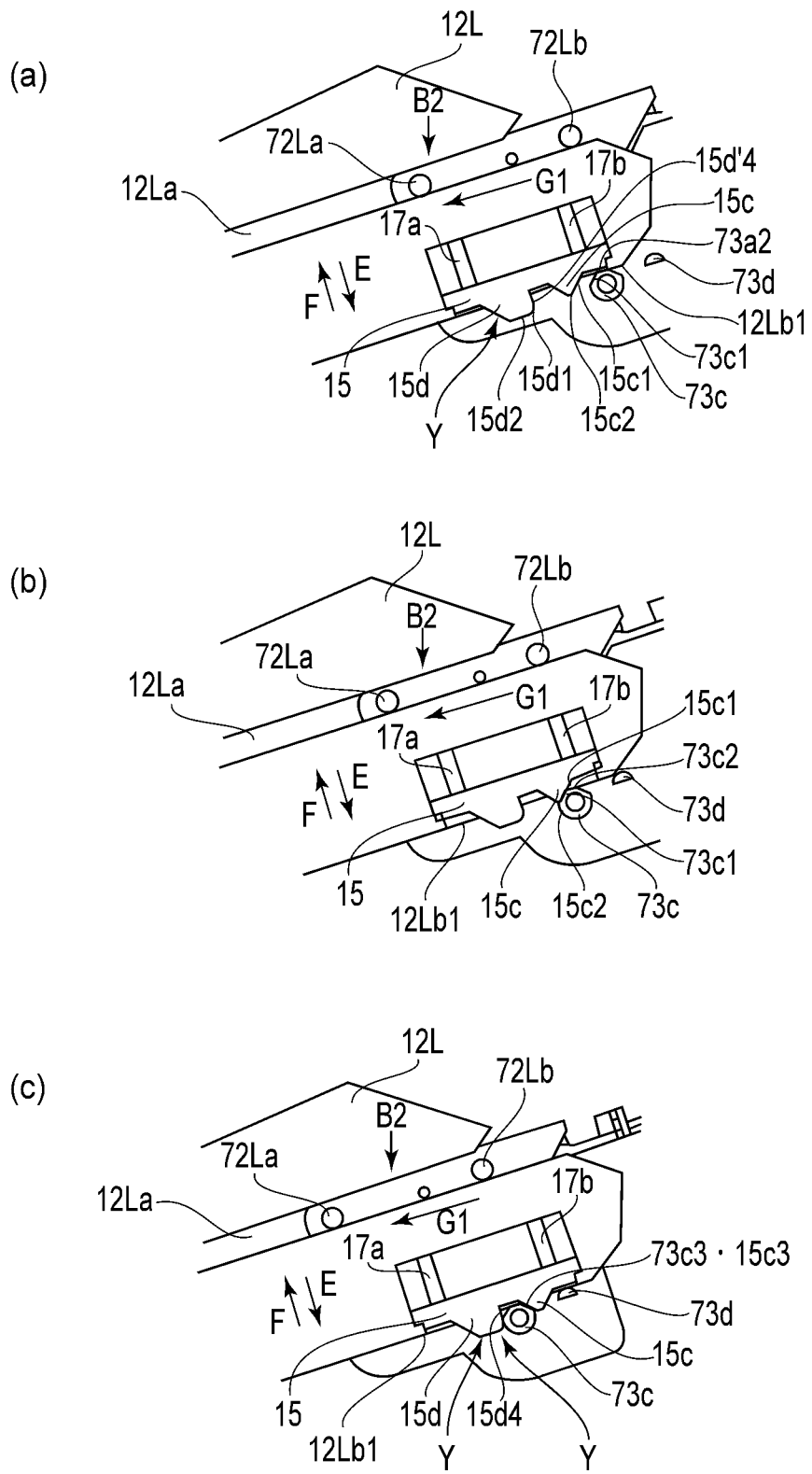
FIG. 40 is an illustration of an operation of an erroneous insertion prevention structure when an improper cartridge is inserted into a different main assembly of the image forming apparatus.

(4-3) Case in which the Proper Cartridge B1 is Inserted into the Apparatus Main Assembly A2:

Referring to FIGS. 34, 39 and 40, the description will be made as to the case in which the cartridge B1 is inserted into the apparatus main assembly A2 with which the cartridge B1 is improper. FIG. 39 is an illustration of the erroneous insertion prevention structure of the apparatus main assembly A2 which is different from the apparatus main assembly A1. FIG. 40 is an illustration of the operation of the erroneous insertion prevention structure at the time when the cartridge B1 is inserted into the apparatus main assembly A2.

As shown in FIG. 39, the non-driving side of the apparatus main assembly A2 an erroneous insertion preventing member 18 is provided, similarly to the apparatus main assembly A1 described above. However, the distance Q2 between a first projection 18c and a second projection 18d of the erroneous insertion preventing member 18 in the direction of an arrow G1 (cartridge inserting direction) is larger than the distance Q1 between the first projection 15c and the second projection 15d of the erroneous insertion preventing member 15 shown in FIG. 34.

This is because when the proper cartridge B2 relative to the apparatus main assembly A2 is inserted, the insertion of the cartridge B2 is permitted in the same manner as in the case when the proper cartridge B1 is inserted into the apparatus main assembly A1. The first projection 18c and the second projection 18d of the erroneous insertion preventing member 18 are disposed at such a position that the cartridge B2 can be inserted to the image forming position of the apparatus main assembly A2.

More particularly, in the state that the erroneous insertion prevention boss 73d causes the erroneous insertion preventing member 18 to retract to the first retracted position Z1, the erroneous insertion prevention boss 73c abuts to the second projection 18d of the erroneous insertion preventing member 18. And, in the state that the erroneous insertion prevention boss 73c causes the erroneous insertion preventing member 18 to retract to the second retracted position, the erroneous insertion prevention boss 73d abuts to the second projection of the erroneous insertion preventing member 18.

Referring to parts (a)-(c) of FIG. 40, the operation when the cartridge B1 is inserted into the apparatus main assembly A2 will be described.

(a) the cartridge B1 is moved in the inserting direction of the arrow G1 so that the mounting and demounting guide bosses 72La, 72Lb of the cartridge B1 move along the guide groove 12La of the guiding member 12L. At this time, the erroneous insertion preventing member 15 is in the free state, that is, it is in the projected position Y.

(b) then, the erroneous insertion prevention boss 73a abuts to the first projection 18c of the erroneous insertion preventing member 18. At this time, a raising surface 73a1 of the erroneous insertion prevention boss 73a contacts the surface 18c1 of the first projection 18c of the erroneous insertion preventing member 18 to retract the erroneous insertion preventing member 18 in the direction of the arrow F. The erroneous insertion preventing member 18 moves to the first retracted position Z1 where the surface 18c2 of the first projection 18c abuts to a surface 73a2 of the erroneous insertion prevention boss 73a. By this, the cartridge B1 can be moved further in the direction of the arrow G1.

Similarly, when the erroneous insertion prevention boss 73b abuts to the first projection 18c, the erroneous insertion preventing member 18 is retracted, so that the cartridge B1 can further move in the direction of the arrow G1.

In this manner, the erroneous insertion prevention boss 73a and the erroneous insertion prevention boss 73b of the cartridge B1 passes by the first projection 18c of the erroneous insertion preventing member 18.

(c) when the cartridge B1 is moved further, the erroneous insertion prevention boss 73a abuts to a surface 18d4 of the second projection 18d of the erroneous insertion preventing member 18. This is because the erroneous insertion preventing member 18 is urged in the direction of the arrow E by the compression springs 17a, 17b, so that it is kept in the projected position Y.

By this, the cartridge B1 is prevented from further movement in the direction of the arrow G1. Therefore, the cartridge B1 cannot be inserted to the image forming position of the apparatus main assembly A2.

It is possible to move the cartridge B1 in the removal direction (G2) from this position because a surface 73c3 of the erroneous insertion prevention boss 73c abuts to the surface 15c3 of the first projection 15c to retract the erroneous insertion preventing member 15 to the first retracted position Z1. The erroneous insertion preventing member 18 resets to the projected position Y by restoring the free state.

(5) Summary

Embodiment 4 is summarized as follows.

1) it is an image forming apparatus 100 for forming an image on the recording material S. It comprises a cartridge B including the first contact portion 73a and the second contact portion 73b, the cartridge B being detachably mountable to the main assembly An of the image forming apparatus. It comprises a movable member 15 provided with the first portion-to-be-contacted 15c and the second portion-to-be-contacted 15d, the movable member 15 being movable between the projected position Y and the retracted position Z.

When the cartridge B is inserted onto the main assembly An of the image forming apparatus, the first contact portion 73a is contactable to the second portion-to-be-contacted 15d in the following case. That is, by the second contact portion 73b abutting to the first portion-to-be-contacted 15c to move the movable member 15 from the projected position Y to the first retracted position Z1, by which the first contact portion 73a becomes contactable to the second portion-to-be-contacted 15d.

The first contact portion 73a can pass by the second portion-to-be-contacted 15d only when it can contact to the second portion-to-be-contacted 15d. The first contact portion 73a and the second contact portion 73b passes the first contact portion 73a side with respect to the movable directions E and F relative to the movable member 15.

2) when the cartridge B is inserted into the main assembly An of the image forming apparatus, the second contact portion 73b can contact to the second portion-to-be-contacted 15d in the following case. It is contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

4) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

5) the first portion-to-be-contacted 15c is disposed in an upstream side of the second portion-to-be-contacted 15d with respect to the inserting direction G1 (at the time when the cartridge B is inserted into the main assembly An of the image forming apparatus).

6) the movable member 15 is urged to the projected position Y by urging means 17a and 17b.

7) the movable member 15 is held by the guiding member 12L for guiding the cartridge when the cartridge is inserted into the main assembly An of the image forming apparatus. The cartridge is provided with the mounting and demounting bosses 72La and 72Lb which are guided by the guiding member 12L when the cartridge is inserted into the main assembly An of the image forming apparatus.

The structure of the cartridge B is summarized as follows.

1) it is the cartridge B detachably mountable to the main assembly An of the image forming apparatus 100, the cartridge B including the first portion-to-be-contacted 15c, the second portion-to-be-contacted 15d, and the movable member 15 movable between the projected position Y and the retracted position Z.

It further includes the first contact portion 73*a* and the second contact portion 73*b*. When it is inserted into the main assembly An of the image forming apparatus, the first contact portion 73*a* becomes contactable to the second portion-to-be-contacted 15*d* in the following manner. That is, by the second contact portion 73*b* abutting to the first portion-to-be-contacted 15*c* to move the movable member 15 from the projected position Y to the first retracted position Z1, by which the first contact portion 73*a* becomes contactable to the second portion-to-be-contacted 15*d*.

The first contact portion 73*a* can pass by the second portion-to-be-contacted 15*d* only when it can contact to the second portion-to-be-contacted 15*d*. The first contact portion 73*a* and the second contact portion 73*b* passes the first contact portion 73*a* side with respect to the movable directions E and F relative to the movable member 15.

2) when it is inserted into the main assembly An of the image forming apparatus, the second contact portion 73*b* is capable of contacting the second portion-to-be-contacted 15*d*. It is contactable to the second portion-to-be-contacted 15*d*, only when the first contact portion 73*a* abuts to the second portion-to-be-contacted 15*d* to retract the movable member 15 from the projected position Y to the second retracted position Z2 retracted from the first retracted position Z1. The second contact portion 73*b* is capable of passing by the second portion-to-be-contacted 15*d* only when it is contactable to the second portion-to-be-contacted 15*d*.

3) the first contact portion 73*a* and the second contact portion 73*b* are provided with respective flat surfaces 73*a*1 and 73*b*1 which are inclined toward the downstream with respect to the inserting direction G1 (at the time when the cartridge B is inserted into the main assembly An of the image forming apparatus) and toward the retracting direction F of the movable member 15.

The structure of the main assembly An of the image forming apparatus is as follows.

1) it is the main assembly (A) of the image forming apparatus 100 for forming an image on the recording material P, and the cartridge B provided with the first contact portion 73*a* and the second contact portion 73*b* is detachably mountable thereto. It comprises a movable member 15 provided with the first portion-to-be-contacted 15*c* and the second portion-to-be-contacted 15*d*, the movable member 15 being movable between the projected position Y and the retracted position Z.

When the cartridge B is inserted into the main assembly An of the image forming apparatus, the first contact portion 73*a* becomes contactable to the second portion-to-be-contacted 15*d* in the following manner. That is, by the second contact portion 73*b* abutting to the first portion-to-be-contacted 15*c* to move the movable member 15 from the projected position Y to the first retracted position Z1, by which the first contact portion 73*a* becomes contactable to the second portion-to-be-contacted 15*d*.

The first contact portion 73*a* can pass by the second portion-to-be-contacted 15*d* only when it can contact to the second portion-to-be-contacted 15*d*. The first contact portion 73*a* and the second contact portion 73*b* passes the first contact portion 73*a* side with respect to the movable directions E and F relative to the movable member 15.

2) when the cartridge B is inserted, the second contact portion 73*b* is contactable to the second portion-to-be-contacted 15*d* as follows. It is contactable to the second portion-to-be-contacted 15*d*, only when the first contact portion 73*a* abuts to the second portion-to-be-contacted 15*d* to retract the movable member 15 from the projected position Y to the second retracted position Z2 retracted from the first retracted position Z1. The second contact portion 73*b* is capable of passing by the second portion-to-be-contacted 15*d* only when it is contactable to the second portion-to-be-contacted 15*d*

3) the first portion-to-be-contacted 15*c* and the second portion-to-be-contacted 15*d* are provided with respective flat surfaces 15*c*1 and 15*d*1 which are inclined toward the upstream with respect to the inserting direction G1 (at the time when the cartridge B is inserted into the main assembly An of the image forming apparatus) and toward the projecting direction E of the movable member 15.

4) the first portion-to-be-contacted 15*c* is disposed in an upstream side of the second portion-to-be-contacted 15*d* with respect to the inserting direction G1 (at the time when the cartridge B is inserted into the main assembly An of the image forming apparatus).

5) the movable member 15 is urged to the projected position Y by urging means 17*a* and 17*b*.

6) when the cartridge is inserted, the movable member 15 is held by a guiding member 12L for guiding the cartridge. The cartridge is provided with mounting and demounting boss 72L and 72L*b* to be guided by the guiding member 12L when the cartridge is inserted.

The structure of the erroneous insertion preventing system is summarized as follows.

It is the erroneous insertion preventing system for the cartridge B detachably mountable to the main assembly An of the image forming apparatus 100 for forming the image on the recording material P. The main assembly An of the image forming apparatus includes the first portion-to-be-contacted 15*c* and the second portion-to-be-contacted 15*d* and includes the movable member 15 movable between the projected position Y and the retracted position Z. The cartridge B includes the first contact portion 73*a* and the second contact portion 73*b*.

When the cartridge B is inserted into the main assembly An of the image forming apparatus, the first contact portion 73*a* becomes contactable to the second portion-to-be-contacted 15*d* in the following manner. That is, by the second contact portion 73*b* abutting to the first portion-to-be-contacted 15*c* to move the movable member 15 from the projected position Y to the first retracted position Z1, by which the first contact portion 73*a* becomes contactable to the second portion-to-be-contacted 15*d*.

The first contact portion 73*a* can pass by the second portion-to-be-contacted 15*d* only when it can contact to the second portion-to-be-contacted 15*d*. The first contact portion 73*a* and the second contact portion 73*b* passes the first contact portion 73*a* side with respect to the movable directions E and F relative to the movable member 15.

Because of the above-described structures for the erroneous insertion prevention, the erroneous insertion preventing structure can be placed in the cartridge inserting opening of the main assembly An of the image forming apparatus. The erroneous insertion preventing member 15 is provided in the recess 12L*c* of the guiding member 12L, and the moving direction is arrows E and F, and in addition, the erroneous insertion prevention bosses 73*a* and 73*b* passes in the direction of arrow E of the erroneous insertion preventing member 15 in FIG. 24, by which no influence is imparted to the apparatus main assembly in the longitudinal direction. The erroneous insertion can be prevented assuredly among different apparatus structures or device with a simple structure.

Therefore, a main assembly An of the image forming apparatus and a cartridge B can be provided with which properness can be discriminated adjacent the cartridge inserting opening of the image forming apparatus A, and the main assembly of the image forming apparatus is not influenced in the longitudinal direction, so that erroneous insertion can be prevented with a simple structure.

Embodiment 5

In the structure of Embodiment 4, the insertion prevention structure may be changed so that the first contact portion 73a (73e) and the second contact member 73b (73f) may be provided in the main assembly An of the image forming apparatus, wherein the movable member 15 (18) is provided on the cartridge B.

Then, the structure of the image forming apparatus 100 is summarized as follows.

1) it is an image forming apparatus 100 for forming an image on the recording material P. It comprises a cartridge B which is provided with the first portion-to-be-contacted 15c and the second portion-to-be-contacted 15d and which is provided with a movable member 15 movable between the projected position Y and the retracted position Z, the cartridge B being detachably mountable to the main assembly An of the image forming apparatus. It further comprises the first contact portion 73a and the second contact portion 73b.

When the cartridge B is inserted into the main assembly An of the image forming apparatus, the first contact portion 73a becomes contactable to the second portion-to-be-contacted 15d in the following manner. That is, by the second contact portion 73b abutting to the first portion-to-be-contacted 15c to move the movable member 15 from the projected position Y to the first retracted position Z1, by which the first contact portion 73a becomes contactable to the second portion-to-be-contacted 15d.

The first contact portion 73a can pass by the second portion-to-be-contacted 15d only when it can contact to the second portion-to-be-contacted 15d. The first contact portion 73a and the second contact portion 73b passes the first contact portion 73a side with respect to the movable directions E and F relative to the movable member 15.

2) when the cartridge B is insertion into the main assembly An of the image forming apparatus, the second contact portion 73b is contactable to the second portion-to-be-contacted 15d in the following manner. It is contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

4) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

5) the first portion-to-be-contacted 15c is disposed in an upstream side of the second portion-to-be-contacted 15d with respect to the inserting direction G1 (at the time when the cartridge B is inserted into the main assembly An of the image forming apparatus).

6) the movable member 15 is urged to the projected position Y by urging means 17a and 17b.

The structure of the cartridge 70Ae is summarized as follows.

1) it is the cartridge B detachably mountable to the main assembly An of the image forming apparatus for forming is image on the recording material P, the cartridge B including the first contact portion 73a and the second contact portion 73b. It comprises the movable member 15 having the first portion-to-be-contacted 15c and the second portion-to-be-contacted 15d, the movable member 15 being movable between the projected position Y and the retracted position Z.

When it is inserted into the main assembly of the image forming apparatus (A), the first contact portion 73a becomes contactable to the second portion-to-be-contacted 15d in the following manner. That is, by the second contact portion 73b abutting to the first portion-to-be-contacted 15c to move the movable member 15 from the projected position Y to the first retracted position Z1, by which the first contact portion 73a becomes contactable to the second portion-to-be-contacted 15d.

The first contact portion 73a can pass by the second portion-to-be-contacted 15d only when it can contact to the second portion-to-be-contacted 15d. The first contact portion 73a and the second contact portion 73b passes the first contact portion 73a side with respect to the movable directions E and F relative to the movable member 15.

2) when the cartridge B is insertion into the main assembly An of the image forming apparatus, the second contact portion 73b is contactable to the second portion-to-be-contacted 15d in the following manner. It is contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

4) the first portion-to-be-contacted 15c is disposed in an upstream side of the second portion-to-be-contacted 15d with respect to the inserting direction G1 (at the time when the cartridge B is inserted into the main assembly An of the image forming apparatus).

5) the movable member 15 is urged to the projected position Y by urging means 17a and 17b.

The structure of the main assembly An of the image forming apparatus is as follows.

1) it is the main assembly of the image forming apparatus 100 for forming the image on the recording material P, including the first portion-to-be-contacted 15c and the second portion-to-be-contacted 15d, wherein the cartridge B including the movable member 15 movable between the projected position Y and the retracted position Z. It further comprises the first contact portion 73a and the second contact portion 73b.

When the cartridge B is inserted into the main assembly An of the image forming apparatus, the first contact portion 73a becomes contactable to the second portion-to-be-contacted 15d in the following manner. That is, by the second contact portion 73b abutting to the first portion-to-be-contacted 15c to move the movable member 15 from the projected position Y to the first retracted position Z1, by which the first contact portion 73a becomes contactable to the second portion-to-be-contacted 15d.

The first contact portion 73a can pass by the second portion-to-be-contacted 15d only when it can contact to the second portion-to-be-contacted 15d The first contact portion 73a and the second contact portion 73b passes the first contact portion 73a side with respect to the movable directions E and F relative to the movable member 15.

2) when the cartridge B is insertion into the main assembly An of the image forming apparatus, the second contact portion 73b is contactable to the second portion-to-be-contacted 15d in the following manner. It is contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1, 73b1 which are inclined toward the downstream side with respect to the cartridge B inserting direction G1 and toward the retracting direction F of the movable member 15.

The structure of the erroneous insertion preventing system is summarized as follows.

It is the erroneous insertion preventing system for the cartridge B detachably mountable to the main assembly An of the image forming apparatus 100 for forming the image on the recording material P. The main assembly An of the image forming apparatus comprises the first contact portion 73a and the second contact portion 73b. The cartridge B is provided with the first portion-to-be-contacted 15c and the second portion-to-be-contacted 15d and with the movable member 15 movable between the projected position Y and the retracted position Z.

When the cartridge B is inserted into the main assembly An of the image forming apparatus, the first contact portion 73a becomes contactable to the second portion-to-be-contacted 15d in the following manner. That is, by the second contact portion 73b abutting to the first portion-to-be-contacted 15c to move the movable member 15 from the projected position Y to the first retracted position Z1, by which the first contact portion 73a becomes contactable to the second portion-to-be-contacted 15d.

The first contact portion 73a can pass by the second portion-to-be-contacted 15d only when it can contact to the second portion-to-be-contacted 15d. The first contact portion 73a and the second contact portion 73b passes the first contact portion 73a side with respect to the movable directions E and F relative to the movable member 15.

The similar effects to that of the Embodiment 4 are provided according to this Embodiment 5.

<Others>

1) the function, the material, the configuration, the relative position of the constituent elements of the foregoing embodiments are not limited to those described above, unless otherwise stated specifically.

2) the image forming apparatus is not limited to the above-described electrophotographic image forming apparatus. It may be any other image forming apparatus using an electrostatic recording process, a magnetic recording process or another known process.

3) the image forming apparatus is not limited to the one to which only one cartridge is detachably mountable. The image forming apparatus may be a color image forming apparatus in which a plurality of cartridges for different colors are detachably mountable to mounting portions of the apparatus.

4) the cartridge is not limited to an integral type process cartridge described above. It may be a separable type process cartridge including image forming process means actable on an image bearing member for carrying an image, or a developing cartridge including developing means for developing a latent image formed on the image bearing member with a developer. It may be a unit contributable to the image forming process formed an image on recording material and detachably mountable to the main assembly of the image forming apparatus.

According to Embodiments 4 and 5, the erroneous insertion preventing structure can be placed in the cartridge inserting opening of the main assembly An of the image forming apparatus. The erroneous insertion can be prevented assuredly among different apparatus structures properness can be discriminated adjacent the cartridge inserting opening of the image forming apparatus A, and the main assembly of the image forming apparatus is not influenced in the longitudinal direction, so that erroneous insertion can be prevented with a simple structure. Therefore, the properness can be discriminated adjacent the cartridge inserting opening of the image forming apparatus A, and the main assembly of the image forming apparatus is not influenced in the longitudinal direction, so that erroneous insertion can be prevented with a simple structure.

Embodiment 6

(1) General Arrangement of a Example of Image Forming Apparatus

Figure 43:
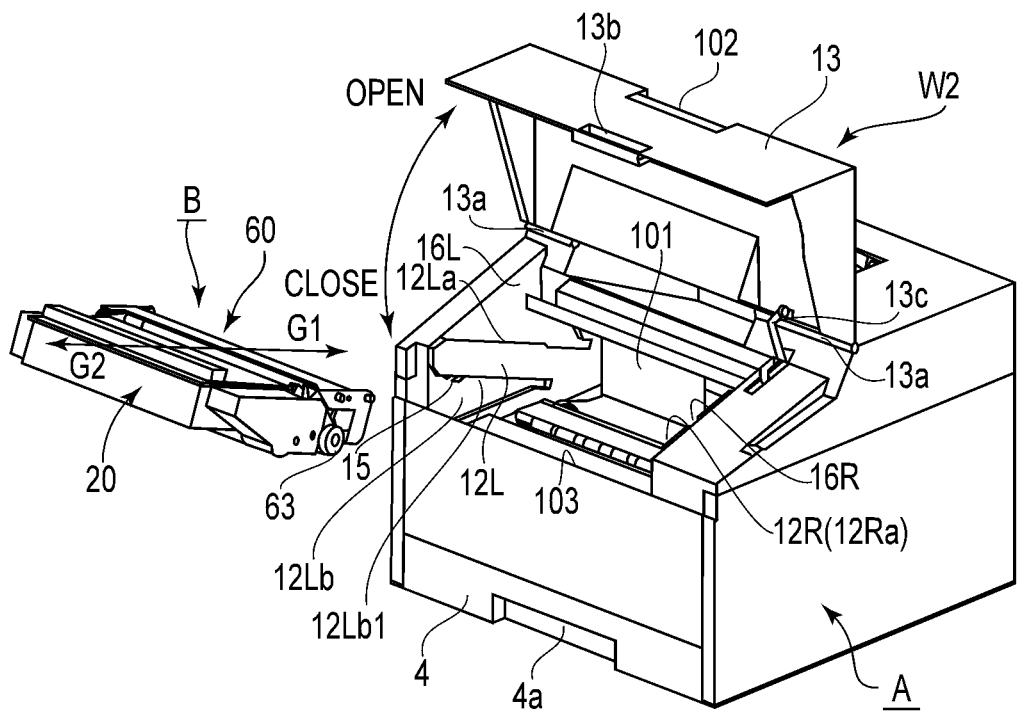
FIG. 43 is a perspective view of a cartridge mounted and dismounted relative to the main assembly of the image forming apparatus in which a door is opened.
Figure 44:
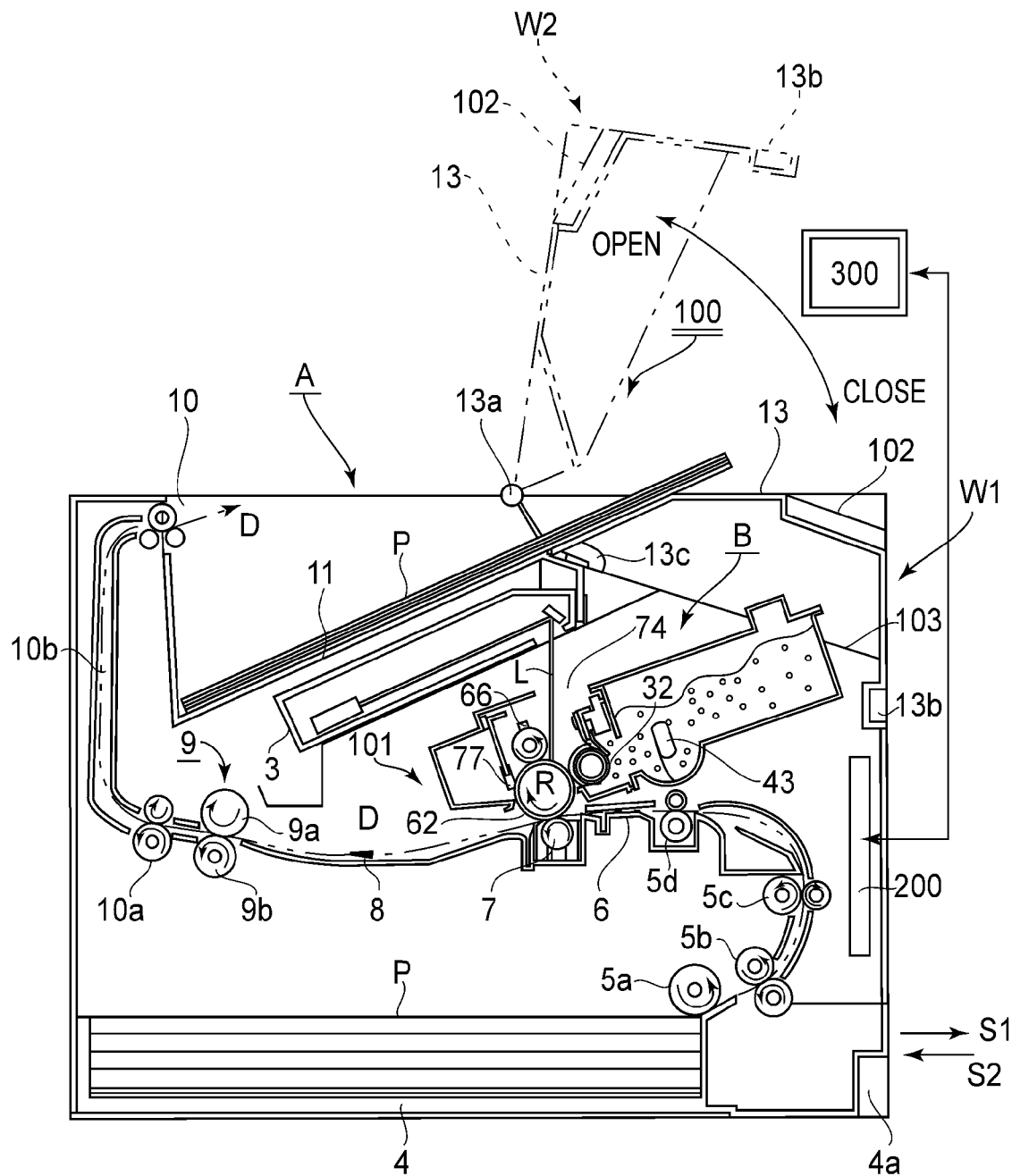
FIG. 44 is a right-hand sectional side view of the image forming apparatus.

FIG. 43 is a perspective view of an image forming apparatus 100 according to this embodiment; FIG. 43 is a perspective view of the main assembly An of the image forming apparatus in which a door 13 is opened, and a cartridge B detachably mountable to the main assembly An of the apparatus; and FIG. 44 is a longitudinal section of the image forming apparatus 100.

The image forming apparatus 100 of this embodiment is a cartridge type electrophotographic laser beam printer (electrophotographic image forming apparatus) for forming an image on a recording material (sheet material) P using an electrophotographic process. An image can be formed on a sheet material P and can be outputted as a print (hard copy) in accordance with electrical image information inputted to a control circuit portion (controlling means) 200 from an external host apparatus 300 (FIG. 44) such as a personal computer.

Designated by reference numeral 102 is an operating portion in which various information such as image forming conditions can be inputted to the control circuit portion 200. The operating portion 102 includes a display portion for displaying various information. In this embodiment, the operating portion 102 is provided on the door 13 of the main assembly An of the image forming apparatus.

Here, a front side of the image forming apparatus 100 of this embodiment is a side where a sheet tray 4 accommodating the sheet material P is moved in and out in a substantially horizontal direction. A rear side is an opposite side. Left and right is as seen from the front side. Up and down are based on the direction of gravity. The main assembly An of the image forming apparatus (apparatus main assembly) is the structural portions of the image forming apparatus except for the cartridge B.

With respect to the cartridge B and the members constituting the cartridge B, a longitudinal direction is parallel with a rotational axis direction of an electrophotographic photosensitive drum 62 as an image bearing member, and is a direction perpendicular to directions G1, G2 (FIG. 43) in which the cartridge B is mounted and demounted relative to the main assembly A. A widthwise direction is the directions G1, G2 in which the cartridge B is mounted and demounted relative to the main assembly A. The front side is the side seen from an upstream side with respect to the direction G1, and the rear side is the downstream side with respect to the inserting direction G1. Left and right of the cartridge B are left and right as seen from the front side.

In FIG. 44, a cartridge mounting portion 101 is substantially in the central portion of the main assembly A. The cartridge B is dismountably mounted to the mounting portion 101. In this embodiment, the cartridge B is an integral type process cartridge as will be described hereinafter. It comprises an electrophotographic photosensitive drum (drum) 62 as an image bearing member for bearing an image, and image forming process means including a charging means 66, a developing means 32 and a cleaning means 77.

In this embodiment, the charging means 66 includes a charging roller (elastic electroconductive roller), the developing means 32 includes a developing roller of a non-contact type developing system using magnetic one component toner as a developer, and the cleaning means 77 includes a cleaning blade.

The image forming apparatus 100 can form an image in the state that the cartridge B is mounted in place at the mounting portion 101 of the main assembly A. In such a state, a driving force receiving portion 63 the FIG. 26) of the cartridge B is coupled with an drive outputting portion (unshown) provided in the main assembly A side. By this, the driving force is transmitted from a driving mechanism portion (unshown) of the main assembly to the cartridge B, a rotatable members such as the drum 62, a developing roller 32, a developer feeding member 43 can be driven. In the image forming apparatus 100 of this embodiment, the right side of the main assembly An of the apparatus and the right side of the cartridge B are the driving side, and the left side is the non-driving side.

The electrical contact portion (unshown) of the cartridge B is electrically conducted with the electrical contact portion (unshown) of the main assembly An of the apparatus. By this, a bias voltage application from an electric energy supplying portion (unshown) in the main assembly A to the electric energy receiving member such as the charging roller 66, the developing roller 32 in the cartridge B.

Above the cartridge B, a laser scanner unit 3 as the exposure device (exposure means) is provided. The unit 3 outputs a laser beam modulated in accordance with an electrical image information inputted to the control circuit portion 200 from the host apparatus 300. The laser beam enters into the cartridge B through an exposure window 74 provided in the upper surface of the cartridge to the surface of the drum 62. To the lower surface of the drum 62 of the cartridge B, the transfer roller (transferring means) 7 is contacted to form a transfer nip with the drum 62. The transfer roller 7 is an elastic electroconductive roller and is supplied with a predetermined transfer bias.

Figure 42:
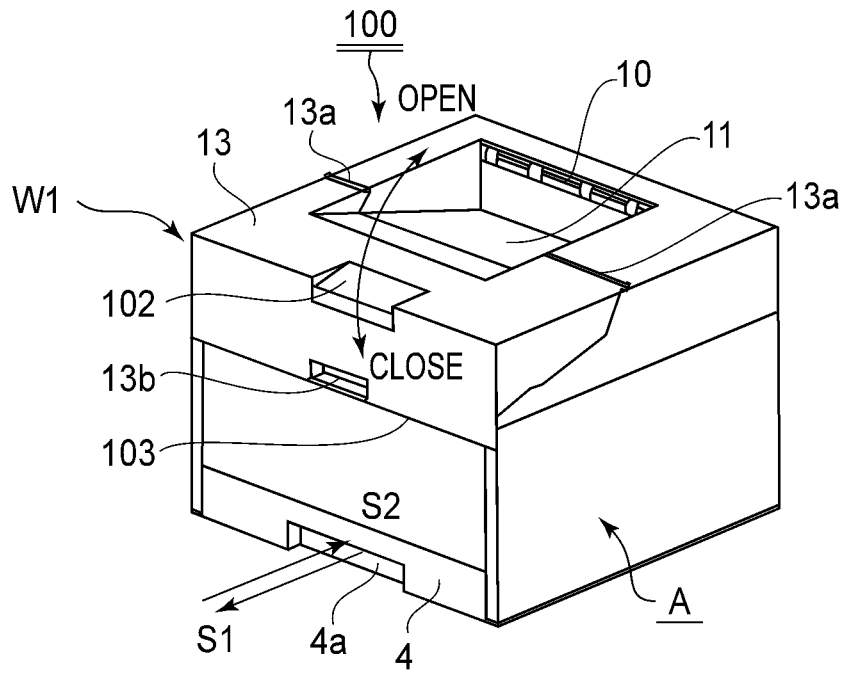
FIG. 42 is a perspective view of an image forming apparatus according to Embodiment 6.

Below the transfer roller 7 a sheet tray 4 accommodating sheet materials P is provided. The tray 4 is capable of being drawn out substantially in a horizontal direction at the front side of image forming apparatus 100. In the replenishment of the sheet material P, the tray 4 is drawn out. The drawn out tray 4 is pushed into the image forming apparatus. In FIGS. 42 and 44, designated by S1 is a direction of drawing tray 4 our, and S2 is a direction of pushing it in. Designated by 4a is a grip portion provided at the front side of the tray 4.

Above the tray 4 in the front side in the main assembly An of the apparatus, there are provided a pick-up roller 5a, a pair of retarding rollers 5b, a pair of feeding rollers 5c, a pair of registration rollers 5d, and a pre-transfer guide 6 are provided in the order named. By doing so, a sheet material feeding path is constituted from the tray 4 to the transfer roller 7.

In the rear side in the main assembly An of the apparatus, there is provided an fixing device (fixing means) 9 comprising a heating roller 9a and a pressing roller 9b. Between the transfer roller 7 and the fixing device 9, a sheet material feeding guide 8 is provided. At the rear side of the fixing device 9 in the main assembly An of the apparatus, there are provided a pair of feeding rollers 10a, a sheet material feeding path 10b for feeding upward from a pair 10a of feeding rollers, and a pair 10 of discharging rollers for further feeding. The upper surface of the main assembly An of the apparatus constitutes a discharging tray 11.

The image forming operations are as follows. The control circuit portion 200 actuates a driving mechanism portion in response to a print starting signal. By this, the drum 62 is rotated in the clockwise direction (arrow R) in FIG. 27 at a predetermined peripheral speed (process speed). The laser scanner unit 3, the developing roller 32, the developer feeding member 43, the transfer roller 7, the fixing device 9 and so on are driven in the predetermined direction at the predetermined speed. The charging roller 66 is rotated by the rotation of the drum 62. The charging roller 66 is supplied with a predetermined charging bias voltage from the electric energy supplying portion. By this, the surface of the drum 62 is uniformly charged to the predetermined polarity and potential.

The charged surface of the drum 62 is exposed to the scanning laser beam modulated in accordance with an image signal outputted from the laser scanner unit 3. By this, an electrostatic image corresponding to an exposure pattern is formed on the surface of the drum 62. The electrostatic image is developed by the developing roller 32 into a toner image (developer image) and is carried into the transfer nip between the drum 62 and the transfer roller 7.

On the other hand, the pick-up roller 5a is driven in a predetermined control timing timed with the output timing of the laser beam. By this, one sheet material P is picked out of the sheet tray 4 and is fed by the retarding roller pair 5b. The sheet material P is introduced into the transfer nip at the predetermined control timing by way of the feeding rollers 5c, registration rollers 5d, the pretransfer guide 6 and is fed by the transfer nip. During passage of the sheet material P through the transfer nip, the transfer roller 7 is supplied with a predetermined transfer bias from the electric energy supplying portion. By this, the toner image is sequentially transferred from the drum 62 onto the surface of the sheet material P.

The sheet material P passing through the transfer nip is separated from the surface of the drum 62 and is introduced to the fixing device 9 through the feeding guide 8. The surface of the drum 62 after the separation of the sheet material is cleaned by a cleaning blade 77 so that untransferred toner is removed to be prepared for the next image formation.

Is sheet material P introduced to the fixing device 9 is nipped and fed by the fixing nip and is heated and pressed. By this, the unfixed toner image is fixed into a fixed image on the surface of the sheet material. The sheet material P leaving the fixing device 9 is discharged to the discharging tray 11 as a print by way of the feeding roller pair 10a, the sheet material feeding path 10b and the discharging roller pair 10. The feeding direction of the sheet material (recording material feeding direction) is depicted by an arrow D.

(Cartridge)

Figure 45:
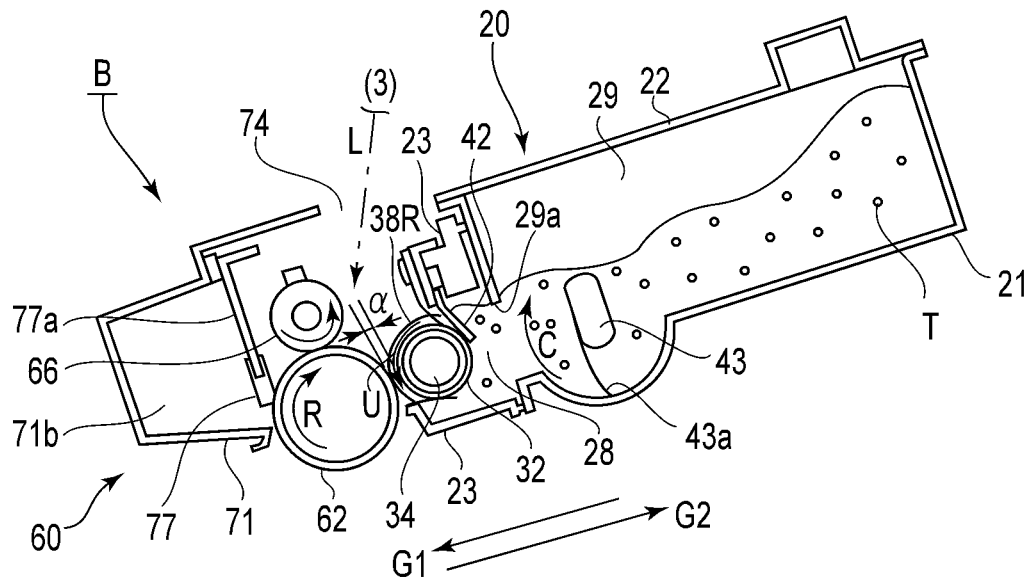
FIG. 45 is an enlarged view of a cartridge portion of the structure shown in FIG. 44.
Figure 46:
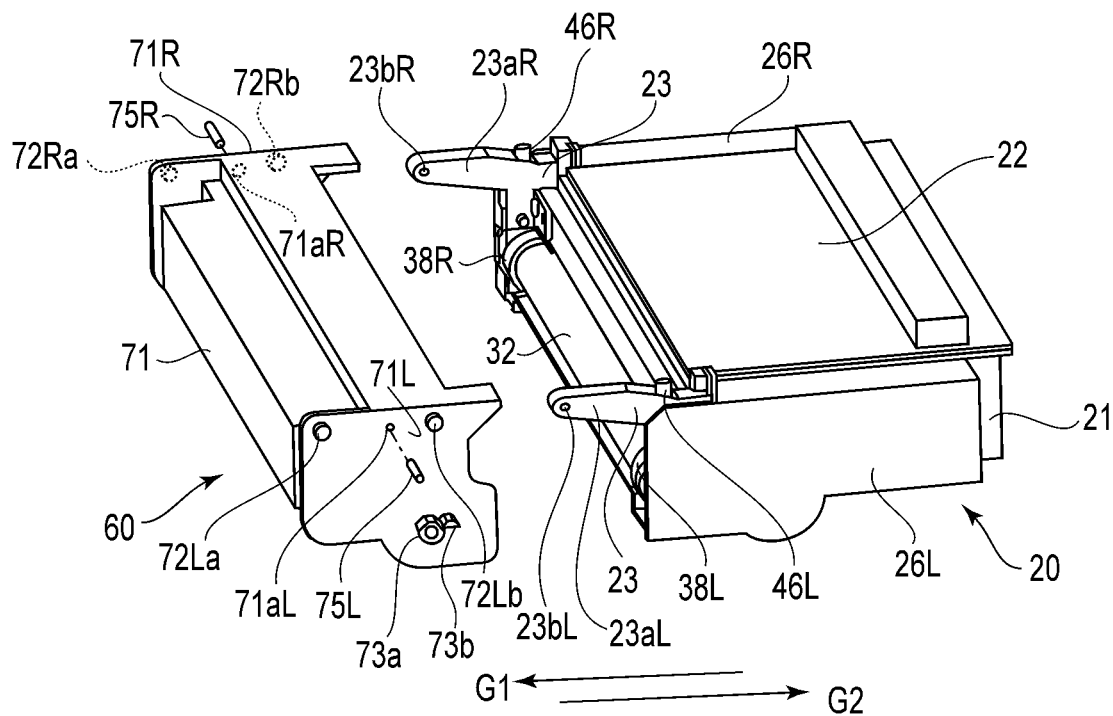
FIG. 46 is an exploded perspective view of a cleaning unit and a developing unit of the cartridge.

Referring to FIGS. 45 and 46, the structure of cartridge B will be described. FIG. 45 is an enlarged view of a cartridge portion of the structure shown in FIG. 44. The cartridge B of this embodiment is an integral type process cartridge which is a combination of a cleaning unit 60 and a developing unit 20. FIG. 46 is an exploded perspective view of the cleaning unit 60 and the developing unit 20.

The cleaning unit 60 includes a cleaning frame 71 elongated in the left-right direction. In the frame 71, there are provided a drum 62 as an image bearing member for carrying an image, a charging roller 66 as an image forming process means actable on the drum 62, and a cleaning blade 77.

The drum 62 is rotatably held at the left-hand shaft portion and the right-hand shaft portion between left and right side plates 71L and 71R of the frame 71 by bearing members.

The charging roller 66 extends above the drum 62 in parallel with the drum 62 and is rotatably held between the left and right side plate 71L and 71R of the frame 71 by the bearing members, and is pressed against the drum 62 by an urging member (unshown) with a predetermined urging force.

The cleaning blade 77 is an elastic blade and is fixed to a predetermined station of a residual toner chamber 71b in the frame 71 by a rigid supporting member 77a of metal or the like. The blade 77 is contacted at a predetermined urging force to the drum 62 counterdirectionally with respect to the rotational moving direction R of the drum 62.

The developing unit 20 includes a non-contact-type developing device using magnetic one component toner as a developer T in this embodiment. The unit 20 is an assembly including a toner accommodating container 21, an upper cap 22, a developing container 23, a developing blade 42, the developing roller 32, a magnet roller 34, the developer feeding member 43, a first side member 26L (left side), a second side member 26R (right side), an urging members 46L and 46R.

A toner chamber 29 is constituted by the toner accommodating container 21, the upper cap 22, the first side member 26L, and the second side member 26R and accommodates magnetic one component toner T as the developer. The developing container 23 is in fluid communication with the toner chamber 29 through an opening 29a. The developer feeding member 43 is provided in the toner chamber 29 and is rotatable in the clockwise direction (arrow C) in FIG. 45.

The developing roller 32 is disposed in the developing container 23. The developing roller 32 is in the form of a hollow roller (sleeve), and is rotatably held by bearing members between first second side members 26L, 26R (left and right). The left and right end portions of the developing roller 32 are provided with respective spacer rollers 38L, 38R as spacing members, concentrically with the developing roller 32. The spacer rollers 38L, 38R have the same outer diameter which is larger than an outer diameter of the developing roller 32 by a predetermined degree.

Inside the developing roller 32, a non-rotatable magnet roller (fixed magnet) 34 is provided. The developing blade 42 is an elastic member which has a base portion fixed to the developing container 23, and which has a free end contacted to the developing roller 32 to regulate a layer thickness of the toner carried on the surface of the developing roller 32. A surface of the developing roller 32 is exposed outwardly in a side opposite the opening 29a.

The cleaning unit 60 and the developing unit 20 are connected by left and right coupling members 75L, 75R so as to be rotatable relative to each other about the coupling members 75L, 75R. The connecting method will be described. As shown in FIG. 46, free end portions of left and right arm portions 23aL, 23aR formed at the left and right end portions of developing container 23 are provided with respective rotation holes 23bL, 23bR in parallel with the rotational axis of the developing roller 32. On the other hand, the left and right side plates 71L, 71 of the cleaning frame 71 are provided with holes 71aL, 71aR for receiving the left and right coupling members 75L, 75R.

The left and right coupling members 75L, 75R are inserted into the rotation holes 23bL, 23bR, respectively while the left and right arm portions 23aL, 23aR are aligned with predetermined positions of the cleaning frame 71. The left and right coupling members 75L, 75R are coaxial with each other.

By the connection between the cleaning unit 60 and the developing unit 20 in this manner, the cleaning unit 60 and the developing unit 20 are connected with each other so as to be rotatable relative to each other.

Left and right urging members (coil springs) 46L and 46R mounted to base portions of the arm portion 23aL, 23aR are contacted to the left and right cleaning frame 71, respectively. By the urging members 46L, 46R, the developing unit 20 is urged to the cleaning unit 60 about the left and right coupling members 75L, 75R.

By this, the left and right spacer rollers 38L, 38R of the developing roller 32 are assuredly press-contacted to outer peripheral portions at the left and right and portions of the drum 62, and therefore, the developing roller 32 is spaced from the drum 62 by a predetermined gap α as shown in FIG. 28. The exposure window 74 is formed between the cleaning unit 60 and the developing unit 20.

In the state that the cartridge B is mounted in place in the cartridge mounting portion 101, the cleaning unit 60 of the cartridge B is urged to the positioning portion of the main assembly An of the apparatus by a fixing mechanism (unshown) in the main assembly An of the apparatus. In such a state, a driving force receiving portion 63 the FIG. 26) of the cartridge B is coupled with an drive outputting portion (unshown) provided in the main assembly A side. The electrical contact portion (unshown) of the cartridge B is electrically conducted with the electrical contact portion (unshown) of the main assembly An of the apparatus. In this state, the image forming apparatus 100 is capable of carrying out the image forming operation.

That is, the drum 62 can be driven at a predetermined speed in the clockwise direction indicated by an arrow R in FIG. 45. The charging roller 66 is rotated by the rotation of the drum 62. The developing roller 32 is rotated at a predetermined speed in the counterclockwise direction indicated by an arrow U around the magnet roller 34. The charging roller 66 and the developing roller 32 are supplied with a predetermined charging bias voltage and a developing bias voltage at the predetermined control timing, respectively.

The feeding member 43 is rotated at a predetermined speed in the clockwise direction indicated by the arrow C. By the rotation of the feeding member 43, a sheet (paddle) 43a of the feeding member 43 feeds the toner T from the toner chamber 29 into the toner supply chamber 28 of the developing container 23 through the opening 29a. The sheet 43a is made of a flexible sheet of PPS, PC, PET, for example and stirs and feeds the toner T.

A part of the toner T fed into the toner supply chamber 28 is attracted by the magnetic force of the magnet roller 34 on the surface of the developing roller 32 and is carried by the rotation of the developing roller 32 while being regulated in the layer thickness by the developing blade 42. The toner layer is carried by further rotation of the developing roller 32 to the developing zone where the developing roller 32 is opposed to the drum 62 to develop the electrostatic image on the drum 62. Remaining toner layer not consumed by the development returns into the toner supply chamber 28 by the further rotation of the developing roller 32, and the developing roller 32 is supplied with the toner in the toner supply chamber 28.

The drum 62 after the toner image transfer onto the sheet material P it cleaned by the cleaning blade 77 so that the residual toner on the outer peripheral surface is removed, by which the drum 62 becomes usable for the next image forming process operation. The toner removed from the drum 62 is stored in the residual toner chamber 71b of the cleaning unit 60.

(3) Cartridge Exchanging Type

The developer (toner) T accommodated in the developing unit of the cartridge B is consumed with the image formation.

Therefore, a means (unshown) for detecting a developer remainder of the cartridge B is provided, and value detected remaining amount is compared with a threshold for pre-set cartridge lifetime forenotice or lifetime warning by the control circuit portion 200. As for the cartridge B with which the detected remaining amount is smaller than the threshold, the lifetime forenotice or the lifetime warning are displayed on the display portion of the operating portion 102. By this, the user is prompted to prepare for the new cartridge B or to exchange the cartridge B to maintain the quality of the output image.

The image forming apparatus 100 of this embodiment is provided with the door 13 to open substantially an upper half-portion of the front side and substantially a front half-portion of the top side. The door 13 can be opened and closed about the hinge portion (rotational center) 13a relative to the main assembly An of the apparatus. The door 13 is rotatable about the hinge portion 13a between a close position W1 shown in FIGS. 25 and 27 and an open position W2 where it is raised at the rear side as shown in FIG. 26.

In the close position W1, the door 13 is held by locking means (unshown). A grip portion 13b of the door 13 is provided with a releasing member operable by fingers to release the locking of the door 13 so that the door 13 can be moved from the close position W1 to the open position W2. In this embodiment, the exchange of the cartridge B relative to the main assembly An of the apparatus is carried out through the door 13 opened as shown in FIG. 43.

When the door 13 is moved from the close position W1 to the open position W2, the door 13 is held at the open position W2 by a stand member 13c. By opening the door 13, substantially the upper half-portion of the front side and front half-portion of the upper side of main assembly An of the apparatus are opened (opening 103) as shown in FIG. 43. Through the opening 103, the cartridge B is inserted to the cartridge mounting portion 101 and is taken out of the main assembly An of the apparatus.

In the state that the cartridge B is mounted to the cartridge mounting portion 101 of the main assembly An of the apparatus, the front side of mounted cartridge B (developing unit 20 side) is exposed through the opening 103. In the state that the cartridge B is not mounted, the cartridge mounting portion 101 is seen (FIG. 43).

When the cartridge B is mounted at the mounting portion 101, an interrelating mechanism (unshown) is provided to release the locking mechanism in interrelation with the movement of the door 13 from the close position W1 to the open position W2 so as to release the cartridge B from the positioned and fixed state. In addition, the drive outputting portion of the main assembly An of the apparatus is disengaged from the driving force receiving portion 63 of the cartridge B. By this, the cartridge B becomes capable of being taken out of the mounting portion 101.

Figure 48:
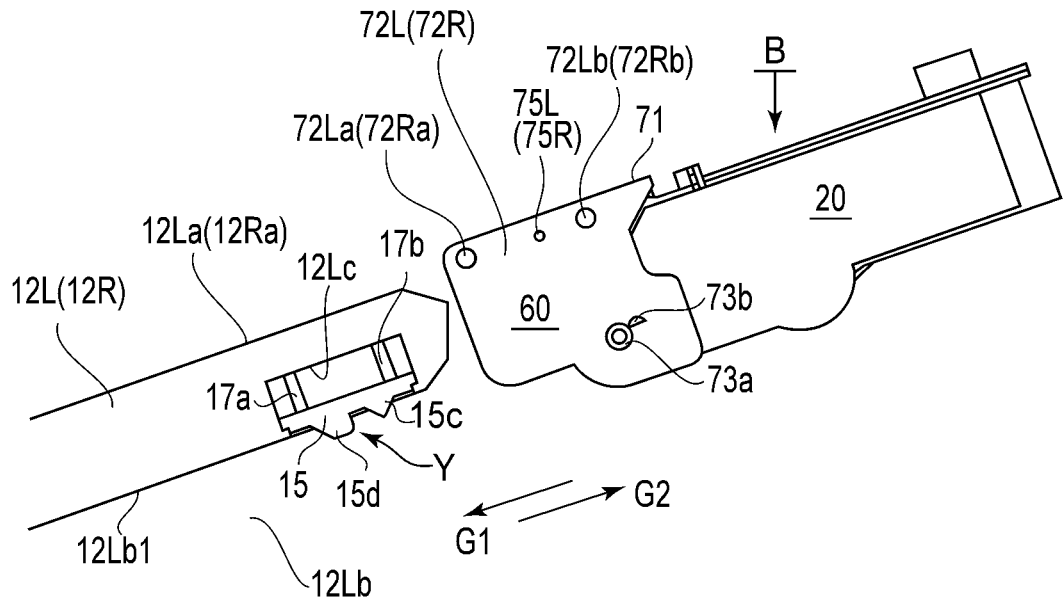
FIG. 48 is an illustration when the cartridge is inserted into the main assembly of the image forming apparatus.

As shown in FIGS. 46 and 48, on the outer surfaces of the left and right side plates 71L, 71R of the cleaning frame 71 of the cleaning unit 60, mounting and demounting guide bosses (mounting and demounting regulating portions) 72La, 72Lb, 72Ra and 72Rb are provided symmetrically.

In this embodiment, two of the mounting and demounting guide bosses (72La and 72Lb) are provided at a downstream position and an upstream position with respect to the inserting direction G1 of the cartridge B with a predetermined gap on one side, and two of the mounting and demounting guide boss (72Ra and 72Rb) are provided similarly on the other side. The mounting and demounting guide bosses 72La and 72La are in the downstream side, and the mounting and demounting guide bosses 72Lb and 72Lb are in the upstream side.

Figure 47:
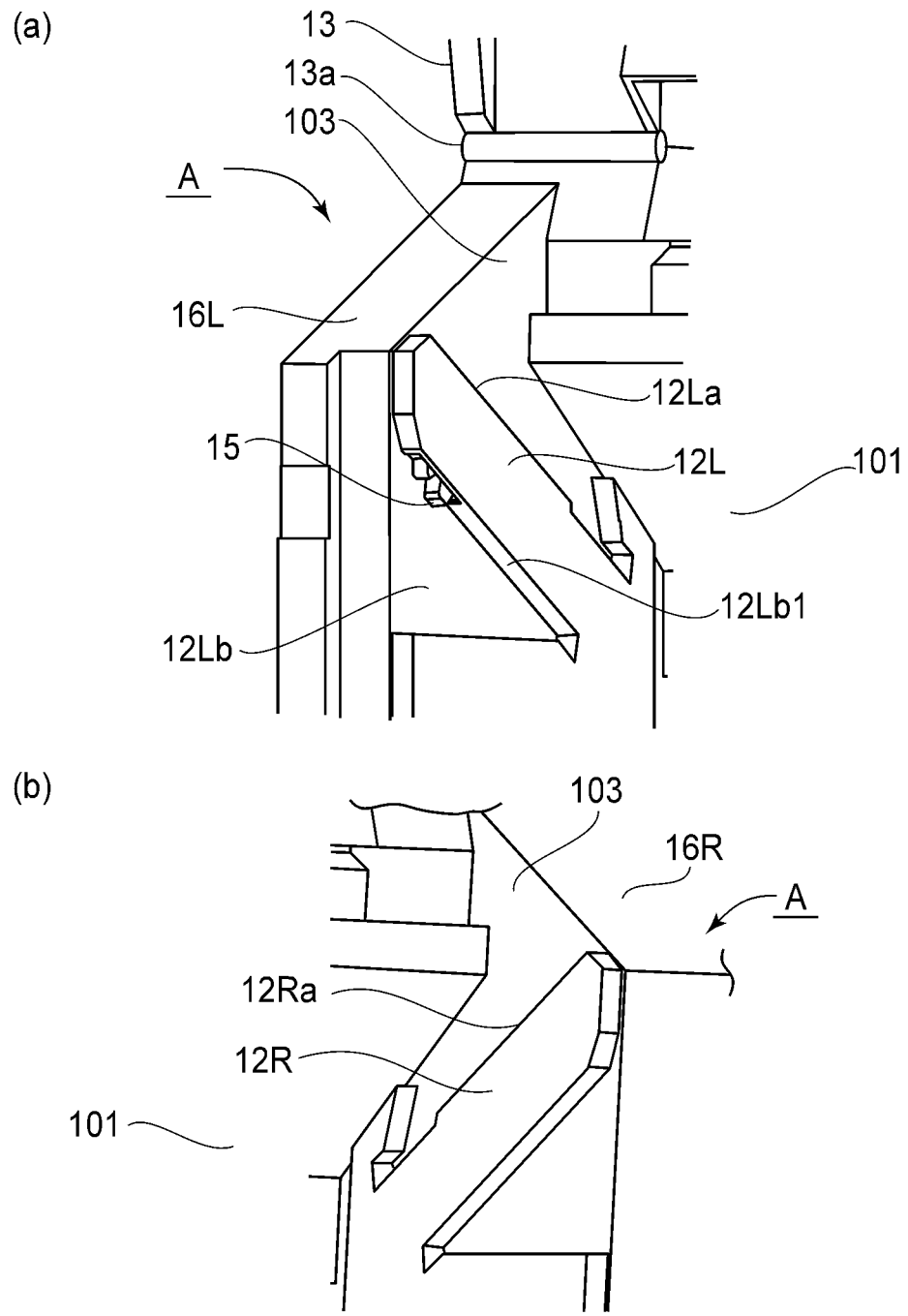
FIG. 47 is a partial perspective view (a) of a left-hand guiding member portion of a cartridge mounting portion, and a partial perspective view (b) of a right-hand guiding member portion.

On the other hand, as shown in parts (a) and (b) of FIG. 47, on an inner sides of left and right side plates 16L, 16R of the cartridge mounting portion 101 of the main assembly An of the apparatus, left and right guiding members 12L, 12R are provided symmetrically. The guiding members 12L, 12R are inclined members which descend obliquely from the front side toward the rear side as seen from the apparatus front side. The guiding members 12L and 12R are provided with respective guide surfaces 12La and 12Ra.

Left and right side mounting and demounting guide bosses 72La, 72Lb and 72Ra, 72Rb of the cartridge B mounted to the cartridge mounting portion 101 are engaged with the left and right side guiding members 12L, 12R and guide surfaces 12La, respectively. The mounting and demounting guide bosses 72La, 72Lb, 72Ra and 72Rb are guided along the guide surfaces 12La, 12Ra.

When the cartridge B is taken out of the mounting portion 101 of the main assembly An of the apparatus, the user grips the front side of mounted cartridge B, that is, the developing unit 20 side exposed through the opening 103. The cartridge B is moved in the dismounting direction of an arrow G2 in the FIGS. 43, 48 so that the left and right mounting and demounting guide bosses 72La, 72Lb, 72Ra, 72Rb are along the guide surfaces 12La, 12Ra of the left and right guiding members 12L, 12R, respectively. By this, the cartridge B is taken out of the main assembly An of the apparatus.

When the cartridge B is inserted to the mounting portion 101 of main assembly An of the apparatus, the user grips the developing unit side and insert the cartridge B toward the mounting portion 101 through the opening 103 with the cleaning unit 60 side at the leading side. And, the left and right mounting and demounting guide bosses 72La, 72Lb, 72Ra, 72Rb of the cartridge B are engaged with the guide surfaces 12La, 12Ra of the left and right guiding members 12L, 12R, respectively.

The cartridge B is further moved in the inserting direction of an arrow G1 in the FIGS. 43 and 48, while the left and right mounting and demounting guide bosses 72La, 72Lb, 72Ra, 72Rb are along the guide surfaces 12La, 12Ra of the left and right guiding members 12L, 12R, respectively. The cartridge B is inserted sufficiently until the insertion is stopped by a stopper (unshown).

Then, the door 13 is moved from the open position W2 to the close position W1 against the stand member 13c, and is locked by the locking means. By the interrelating mechanism, the fixing mechanism is locked in interrelation with the movement of the door 13 from the open position W2 to the close position W1. By this, the cartridge B is positioned and fixed to the positioning portion of the main assembly An of the apparatus. In addition, the drive outputting portion of the main assembly An of the apparatus is coupled with the driving force receiving portion 63 of the cartridge B.

(4) Erroneous Insertion Prevention Structure

A structure for preventing insertion of a wrong cartridge will be described. The case when a proper cartridge B1 is inserted into the apparatus main assembly A1 will be described first in the following (4-1). Then, the case when an improper cartridge B2 is inserted into the apparatus main assembly A1, and the case when an improper cartridge B1 is inserted into an apparatus main assembly A2 not into the apparatus main assembly A1 will be described in (4-2) and (4-3), respectively.

As to the case when the proper cartridge B2 is inserted into the apparatus main assembly A2, the description is omitted because the situation is the same as with the case when a proper cartridge B1 is inserted into the apparatus main assembly A1. In the following description, the same reference numerals are assigned to the apparatus main assembly A1, the apparatus main assembly A2, the cartridge B1 and the cartridge B2, and the detailed description of the respective elements is omitted for simplicity.

(4-1) Case in which the Proper Cartridge B1 is Inserted into the Apparatus Main Assembly A1:

Referring to FIGS. 24, 26 and 29-35, this case will be described

As shown in FIGS. 46 and 48, the non-driving side of the cleaning frame 71 of the cartridge B1, the outer surface of the left side plate 71L in this embodiment is provided with a first contact portion 73a and a second contact portion 73b (erroneous insertion prevention bosses) in the form of bosses.

The erroneous insertion prevention boss may be provided at each or one of the driving side (right side) and the non-driving side (left side) of the cartridge B1. In this embodiment, it is provided at the in non-driving side of the cartridge B1.

An erroneous insertion prevention structure of the apparatus main assembly A1 which will be described hereinafter is provided in the non-driving side in this embodiment.

Figure 49:
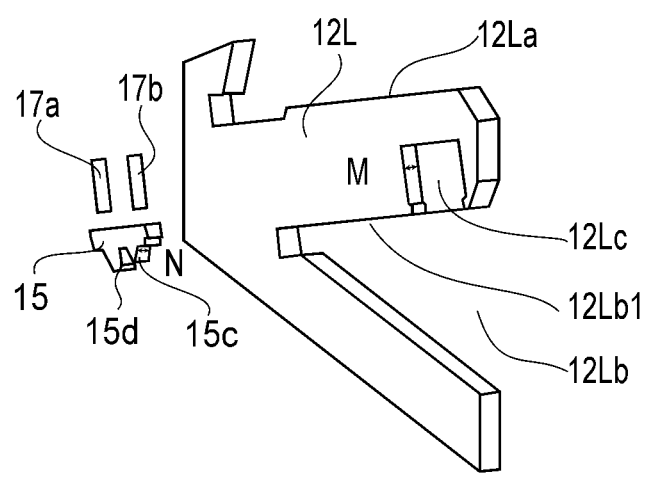
FIG. 49 is a perspective view illustrating a structure of an erroneous insertion preventing member.
Figure 50:
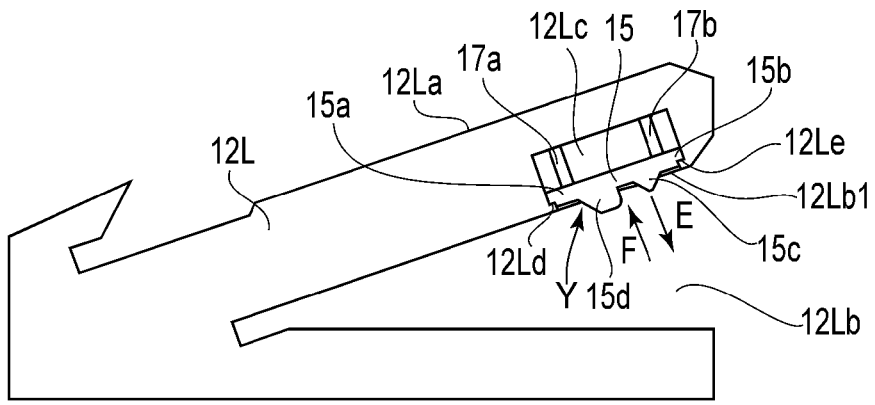
FIG. 50 is a sectional view illustrating a structure of an erroneous insertion preventing member.
Figure 51:
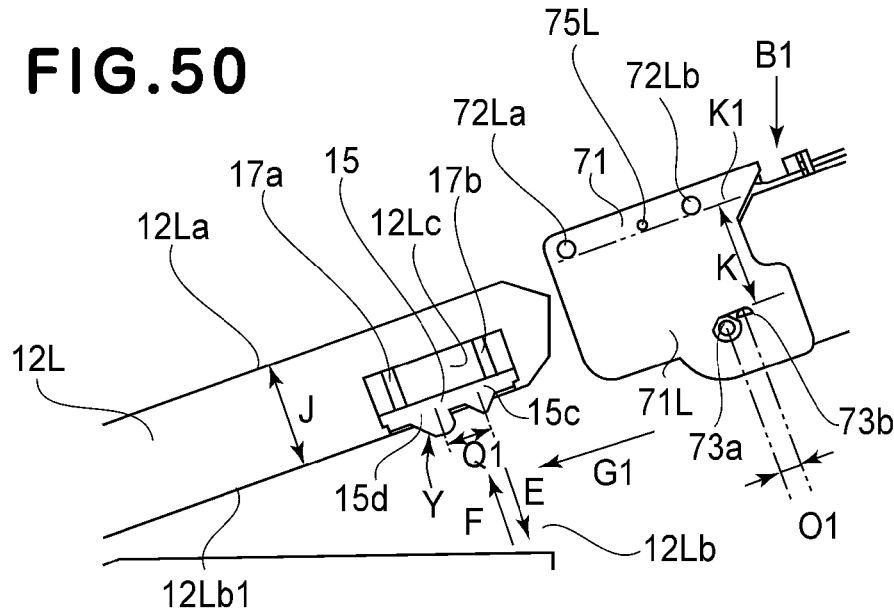
FIG. 51 is an illustration of an erroneous insertion prevention structure.

As shown in parts (a) of FIGS. 43 and 47 and in FIGS. 49-51, the left side guiding member 12L of apparatus main assembly A1 is provided with an erroneous insertion prevention groove 12Lb. As shown in FIG. 51, a distance between a regulating surface 12Lb1 of the erroneous insertion preventing groove 12Lb and the guide surface 12La is J, here. A distance between the erroneous insertion prevention bosses 73a, 73b and a tangent line K1 of the erroneous insertion prevention boss (73a, 73b) sides of the mounting and demounting guide bosses 72La, 72Lb is K. The distance J is slightly smaller than the distance K.

Therefore, when the cartridge B1 is inserted into the apparatus main assembly A1 while the mounting and demounting guide bosses 72La, 72Lb of the cartridge B moves along the guide groove 12La, the erroneous insertion prevention bosses 73a and 73b enter the erroneous insertion prevention groove 12Lb.

Furthermore, by the erroneous insertion prevention bosses 73a, 73b passing the erroneous insertion preventing groove 12Lb, the insertion attitude of the cartridge B1 is regulated at the time when the cartridge B1 is inserted into the apparatus main assembly A1. By this, the insertion attitude of the cartridge B1 when it is inserted into the apparatus main assembly A1 is stabilized as follows. The positions of the mounting and demounting guide bosses 72La and 72Lb are regulated by the guide surface 12La, and positions of the erroneous insertion prevention bosses 73a and 73b are regulated by the surface 12Lb1 of the erroneous insertion prevention groove 12Lb.

In this manner, a variation of the insertion tracks of the erroneous insertion prevention bosses 73a, 73b of the cartridge B1 relative to the guiding member 12L of the apparatus main assembly A1 at the time when the cartridge B1 is inserted into the apparatus main assembly A1 is suppressed.

As shown in parts (a) of FIGS. 43 and 47, the erroneous insertion preventing member (movable member) 15 is provided so that a part thereof projects into the erroneous insertion prevention groove 12Lb of the left side guiding member 12L. As shown in the exploded perspective view of FIG. 49, the guiding member 12L is provided with a recess 12Lc in a surface contacting a side plate 16L of the apparatus main assembly A1.

A depth M of the recess 12Lc in the longitudinal direction (left-right direction of the apparatus) is larger than the width N of the erroneous insertion preventing member 15 in the longitudinal direction (in the left-right direction of the apparatus). As shown in FIG. 50, erroneous insertion preventing member 15 is accommodated in the recess 12Lc of the guiding member 12L and is urged in the direction of an arrow E by compression springs 17a, 17b and is retractable in the direction of an arrow F.

At this time, projection amount regulating projections 15a, 15b of the erroneous insertion preventing member 15 contact projection amount regulating projections 12Ld, 12Le of the guiding member 12L, respectively, by which the projection amount of the erroneous insertion preventing member 15 from the guiding member 12L is limited.

In this manner, the erroneous insertion preventing member 15 is held in the projected position Y projecting into the erroneous inserting preventing groove 12Lb relative to the regulating surface 12Lb1 of the guiding member 12L by the guiding member 12L.

As described hereinbefore, when the cartridge B1 is inserted into the apparatus main assembly A1, the erroneous insertion prevention bosses 73a and 73b pass in the erroneous insertion preventing groove 12Lb of guiding member 12L. That is, as shown in FIG. 51, the cartridge B1 can be inserted into the apparatus main assembly A1 by moving the cartridge B1 in a direction of an arrow G1 which is an inserting direction to the guiding member 12L.

Figure 41:
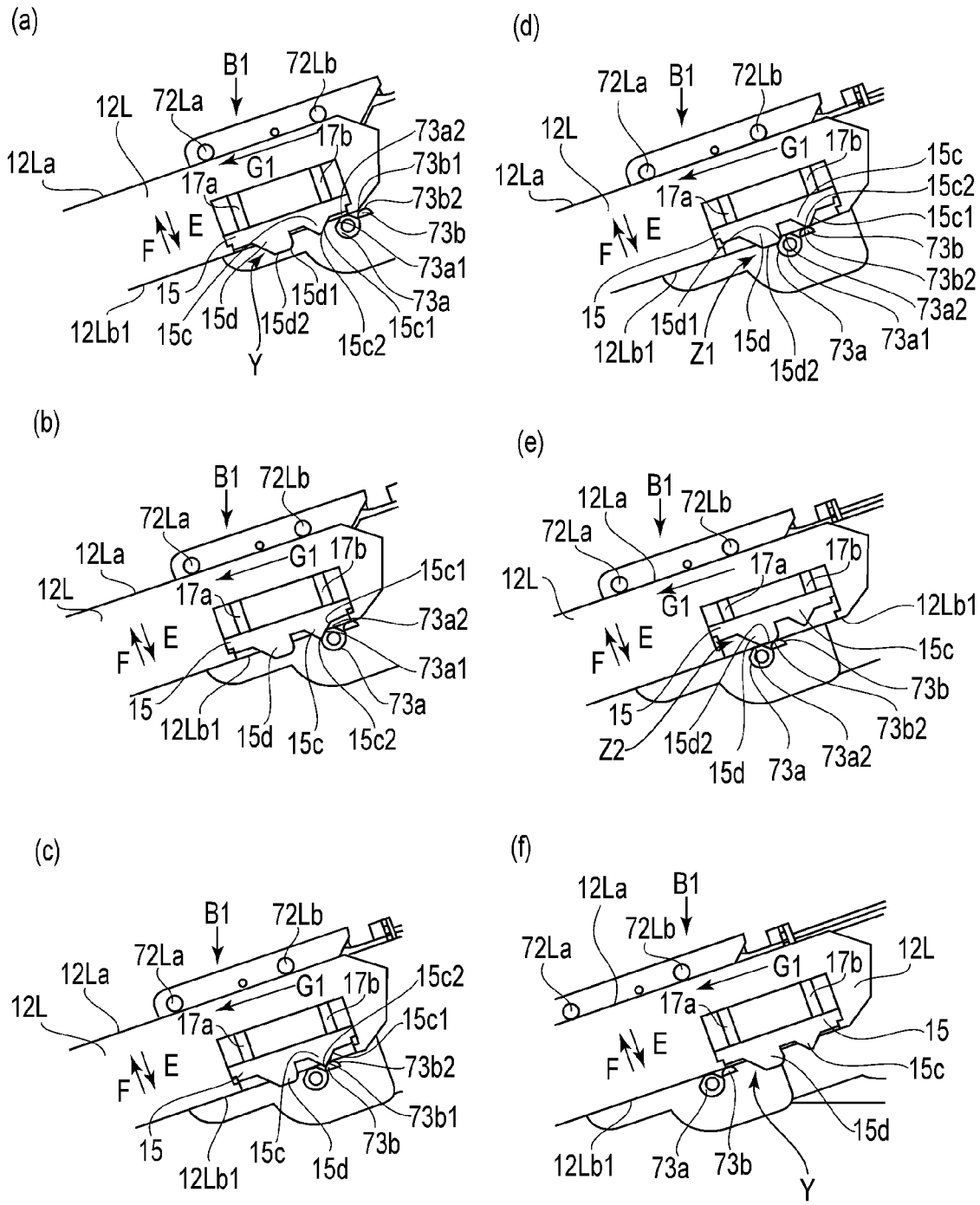
FIG. 41 is an illustration of an operation of an erroneous insertion prevention structure at the time when a cartridge is inserted into the main assembly of the image forming apparatus, in the structure of Embodiment 6.
Figure 52:
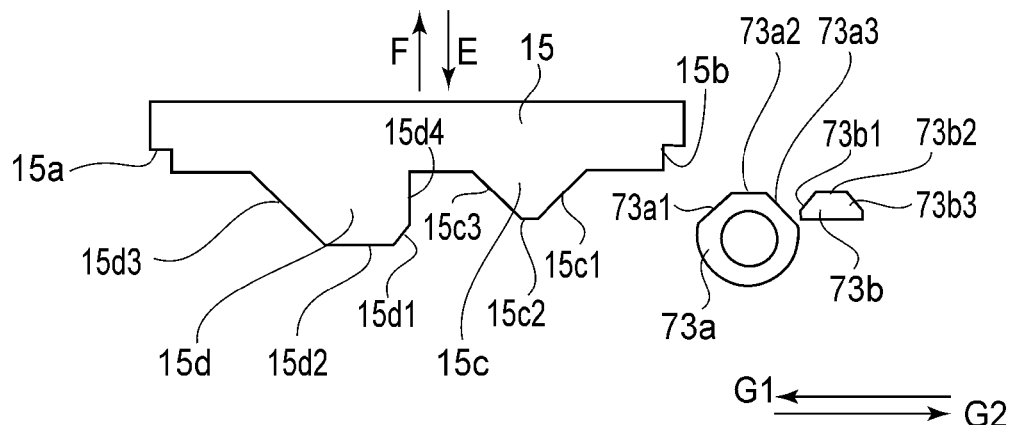
FIG. 52 is an enlarged view of an erroneous insertion prevention boss and an erroneous insertion preventing member.

Referring to parts (a)-(f) of FIG. 41, the operation of the erroneous insertion prevention structure at the time when the cartridge B1 is inserted into the apparatus main assembly A1 will be described. FIG. 52 is an enlarged view of a portion of the insertion prevention bosses 73a, 73b of the cartridge B1 and a portion of the erroneous insertion preventing member 15 of the apparatus main assembly A1. Referring to FIG. 41, the operation of the erroneous insertion prevention structure will be described.

(a) the cartridge B1 is moved in the inserting direction of the arrow G1 so that the mounting and demounting guide bosses 72La, 72Lb of the cartridge B1 move along the guide groove 12La of the guiding member 12L. At this time, the erroneous insertion preventing member 15 is in the free state, that is, it is in the projected position Y.

(b) so, the erroneous insertion prevention boss 73a contacts the first portion-to-be-contacted 15c (first projection) of the erroneous insertion preventing member 15 placed in the projected position Y. At this time, a raising surface 73a1 of the erroneous insertion prevention boss 73a contacts the surface 15c1 of the first projection 15c of the erroneous insertion preventing member 15 to retract the erroneous insertion preventing member 15 in the direction of the arrow F.

And, the erroneous insertion preventing member 15 is retracted to a first retracted position Z1 where a surface 15c2 of the first projection 15c contacts a surface 73a2 of the erroneous insertion prevention boss 73a. By this, the cartridge B1 can be moved further in the direction of the arrow G1.

(c) similarly, when the erroneous insertion prevention boss 73b contacts to the first projection 15c, the erroneous insertion preventing member 15 is retracted in the direction of the arrow F. And, the erroneous insertion preventing member 15 is retracted to a first retracted position Z1 where a surface 15c2 of the first projection 15c contacts a surface 73a2 of the erroneous insertion prevention boss 73a.

In this manner, the first projection 15c of the erroneous insertion preventing member 15 retracts in the direction of an arrow F which is a retracting direction of the erroneous insertion preventing member 15, from the insertion path of the erroneous insertion prevention bosses 73a, 73b of the cartridge B1. By this, the erroneous insertion prevention bosses 73a, 73b passes the portion away from the first projection 15c in the direction of an arrow E.

(d) when the cartridge B1 is further moved, the erroneous insertion prevention boss 73a abuts to a second portion-to-be-contacted 15d (second projection) of the erroneous insertion preventing member 15 while the erroneous insertion prevention boss 73b keeps the erroneous insertion preventing member 15 retracted to the first retracted position Z1.

At this time, the raising surface 73a1 of the erroneous insertion prevention boss 73a abuts to a surface 15d1 of the second projection 15d of the erroneous insertion preventing member 15, so that the erroneous insertion preventing member 15 is retracted from the first retracted position Z1 further in the direction of the arrow F.

The erroneous insertion preventing member 15 moves to a second retracted position Z2 which is further retracted from the first retracted position Z1 in which the surface 15d2 of the second projection 15d contacts the surface 73a2 of the erroneous insertion prevention boss 73a. By this, the cartridge B1 can be moved further in the direction of the arrow G1.

(e) when the cartridge B1 is further moved, the surface 73b2 of the erroneous insertion prevention boss 73b abuts to the surface 15d2 of the second projection 15d of the erroneous insertion preventing member 15, while the erroneous insertion prevention boss 73a keeps the erroneous insertion preventing member 15 in the second retracted position. In this manner, the erroneous insertion prevention bosses 73a, 73b of the cartridge B1 pass the second projection 15d of the erroneous insertion preventing member 15 in the arrow E direction.

(f) by further moving the cartridge B1, the erroneous insertion prevention boss 73b of the cartridge B1 is spaced from the second projection 15d of the erroneous insertion preventing member 15 so that the erroneous insertion preventing member 15 returns to the projected position Y.

In this manner, the erroneous insertion prevention bosses 73a, 73b of the cartridge B1 pass in the direction of the arrow E in which the first projection 15c and the second projection 15d of the erroneous insertion preventing member 15 project, so that the cartridge B1 becomes capable of being inserted to the image forming position of the apparatus main assembly A1.

As described above, during the series of the above-described operations, the positions of the erroneous insertion prevention bosses 73a, 73b of the cartridge B1 are regulated by the regulating surface 12Lb1 of the erroneous insertion prevention groove 12Lb. Therefore, the variation of the positions of the erroneous insertion prevention bosses 73a, 73b of the cartridge B1 relative to the erroneous insertion preventing member 15 held by guiding member 12L can be suppressed.

By this, it is not necessary to make the contact surface so wide as to ensure the contact between the erroneous insertion prevention bosses 73a, 73b and the erroneous insertion preventing member 15 in consideration of the case in which the positions of the erroneous insertion prevention bosses 73a, 73b relative to the erroneous insertion preventing member 15 vary significantly.

Therefore, the erroneous insertion prevention bosses 73a, 73b and the erroneous insertion preventing member 15 can be downsized, and require small spaces.

Figure 53A:
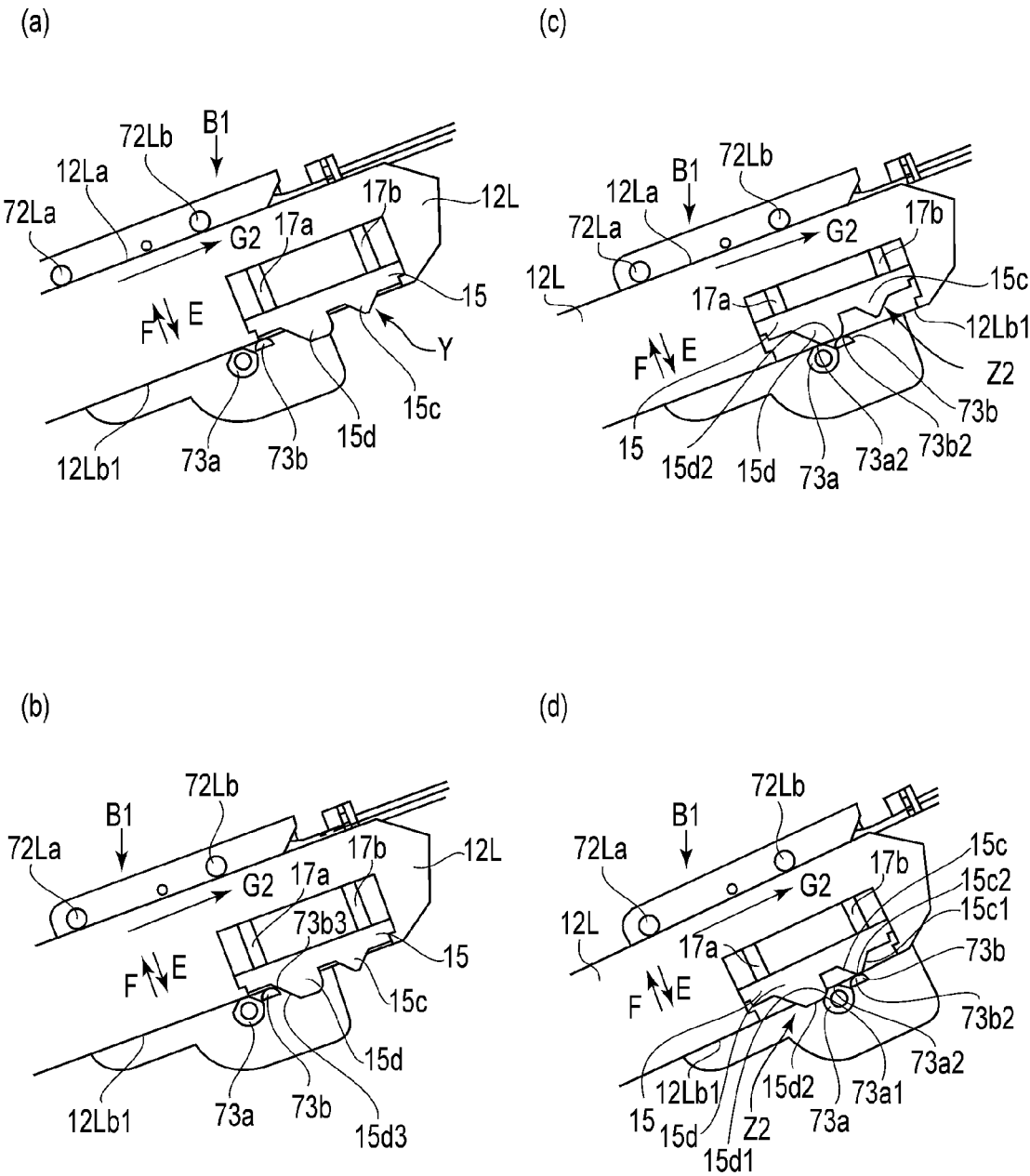
FIG. 53A is a first illustration of an operation of an erroneous insertion prevention structure at the time when the cartridge is taken out of the main assembly of the image forming apparatus.
Figure 53B:
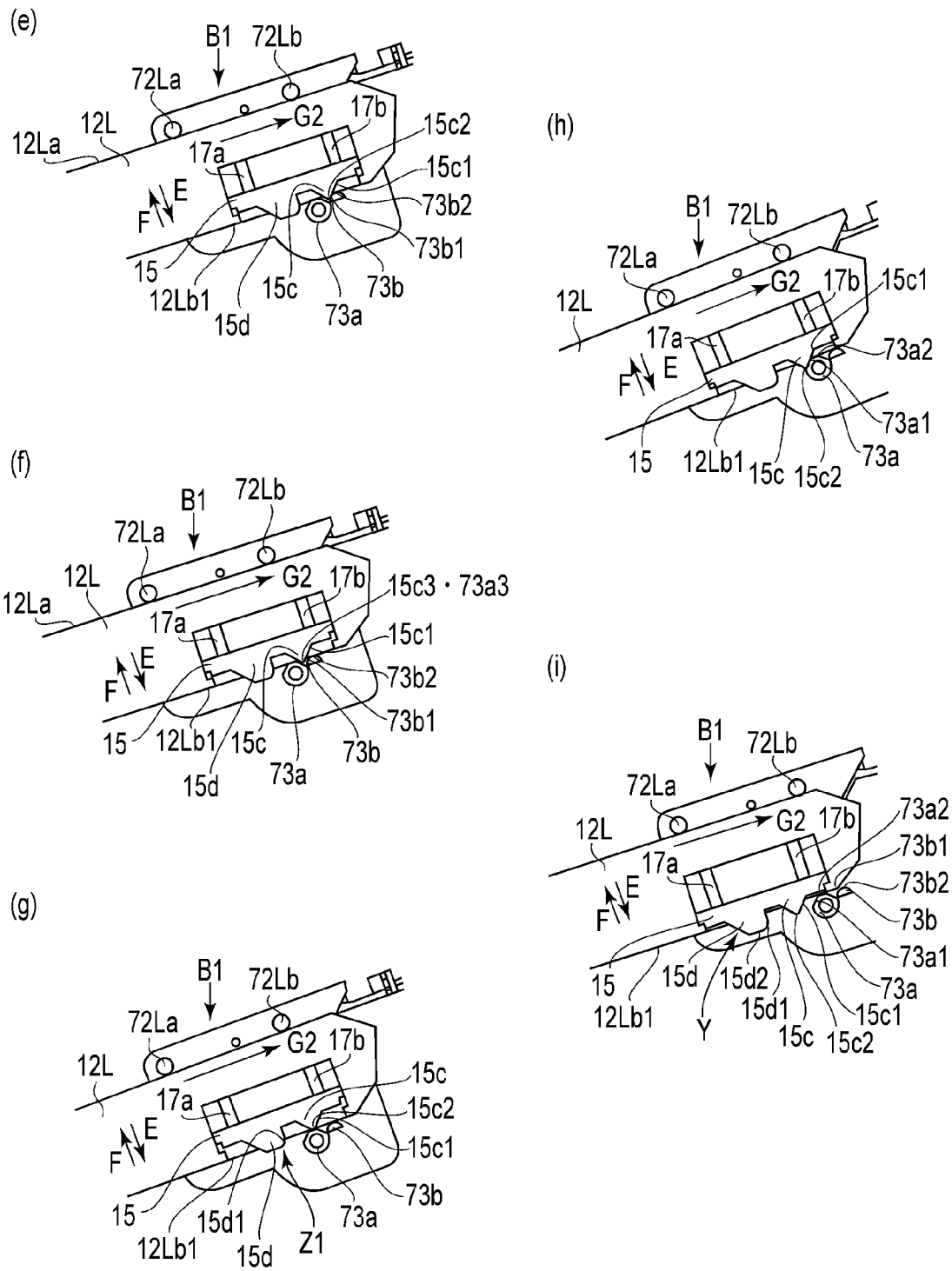
FIG. 53B is a first illustration of an operation of an erroneous insertion prevention structure at the time when the cartridge is taken out of the main assembly of the image forming apparatus.

Referring to parts (a)-(d) of FIG. 53A and parts (e)-(i) of FIG. 53B, the operation of the erroneous insertion prevention structure at the time when the cartridge B1 in the cartridge mounting portion 101 is taken out of the apparatus main assembly A1 will be described. The operation at the time of removal is a reciprocal of the operation at the time of insertion.

(a) the cartridge B1 is moved in the inserting direction of the arrow G2 so that the mounting and demounting guide bosses 72La, 72Lb of the cartridge B1 move along the guide groove 12La of the guiding member 12L. At this time, the erroneous insertion preventing member 15 is in the free state, that is, it is in the projected position Y.

(b) so, a raising surface 73b3 of the erroneous insertion prevention boss 73b contacts to a surface 15d3 of the erroneous insertion preventing member 15.

(c) when the cartridge B1 is further moved, the erroneous insertion preventing member 15 retracts in the direction of the arrow F by the abutment of the raising surface 73b3 to the surface 15d3. The erroneous insertion preventing member 15 retracts until the surface 15d2 of the second projection 15d abuts to the surface 73b2 of the erroneous insertion prevention boss 73b (second retracted position Z2). By this, further movement of the cartridge B1 in the direction of the arrow G1 becomes possible so that the erroneous insertion prevention bosses 73b and 73a pass by moving in the projecting direction of the second projection 15d.

Even when the erroneous insertion prevention boss 73b passes by the surface 15d2 of the second projection 15d, the erroneous insertion preventing member 15 is kept in the second retracted position Z2 by the erroneous insertion prevention boss 73a moving at the surface 15d2 of the second projection 15d.

(d) when the cartridge B1 is moved further, the erroneous insertion prevention boss 73a passes by the surface 15d2 of the second projection 15d, and the surface 73a1 of the erroneous insertion prevention boss 73a abuts to the surface 15d1 of the second projection 15d, so that the erroneous insertion preventing member 15 projects in the direction of the arrow E. At this point, the erroneous insertion prevention boss 73b is at the position corresponding to the first projection 15c, and the surface 15c2 of the first projection 15c contacts the surface 15c2 of the erroneous insertion prevention boss 73b, so that the erroneous insertion preventing member 15 is held at the first retracted position.

(e) when the cartridge B1 is further moved, the erroneous insertion prevention boss 73b passes by the first projection 15c, and a surface 73b1 of the erroneous insertion prevention boss 73b contacts to the surface 15c1 of the first projection 15c.

(f) subsequently, a surface 73a3 of the erroneous insertion prevention boss 73a abuts to a surface 15c3 of the first projection 15c. In the process from (e) to (f), the erroneous insertion preventing member 15 projects slightly beyond the first retracted position in the direction of the arrow E.

(g) when the cartridge B1 is further moved, the erroneous insertion preventing member 15 retracts in the direction of the arrow F by the abutment of the surface 73a3 to the surface 15c3. Erroneous insertion preventing member 15 retracts to the position in which the surface 15c2 of the first projection 15c contacts to the surface 73a2 of the erroneous insertion prevention boss 73a. The erroneous insertion preventing member 15 retracts to the first retracted position Z1. By this, the cartridge B1 can be moved further in the direction of the arrow G2.

(h) when the cartridge B1 is moved further, the surface 73a2 of the erroneous insertion prevention boss 73a passes by the surface 15c2 of the first projection 15c, and the surface 73a1 of the erroneous insertion prevention boss 73a contacts to the surface 15c1 of the first projection 15c.

(i) when the cartridge B1 is moved further, the erroneous insertion prevention boss 73a departs the first projection 15c, and the cartridge B1 is taken out of the main assembly An of the apparatus. The erroneous insertion preventing member 15 projects in the direction of the arrow E to the initial projected position Y.

In this manner, the erroneous insertion prevention bosses 73a, 73b of the cartridge B1 passes beyond the second projection 15d and the first projection 15c of the erroneous insertion preventing member 15, so that the cartridge B1 can be taken out of the apparatus main assembly A1.

Figure 54:
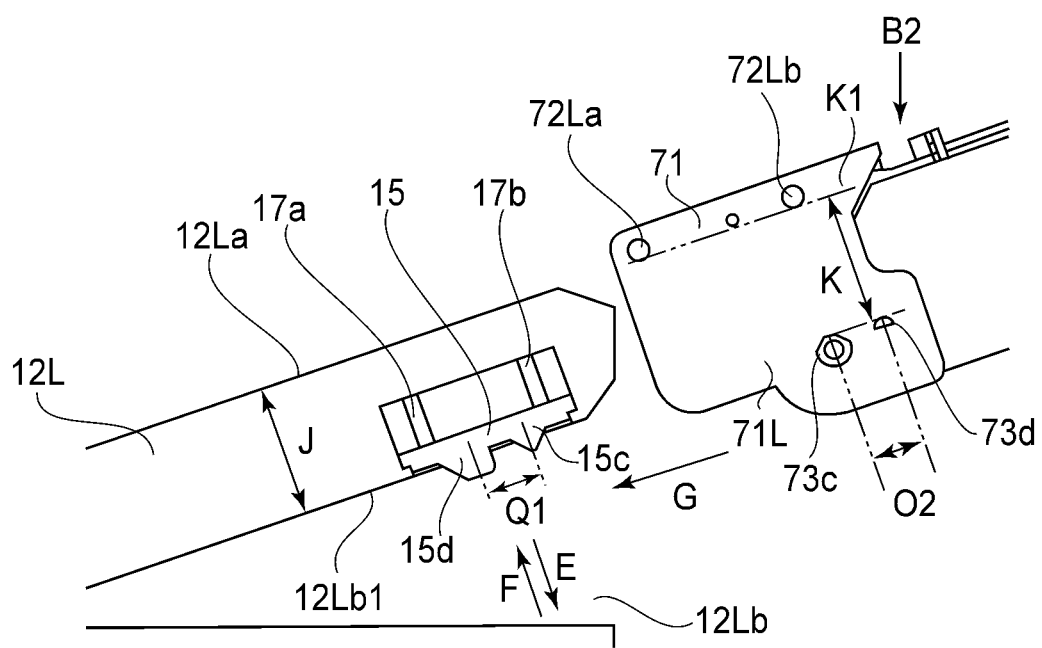
FIG. 54 is an illustration of an erroneous insertion prevention boss for an improper cartridge.
Figure 55:
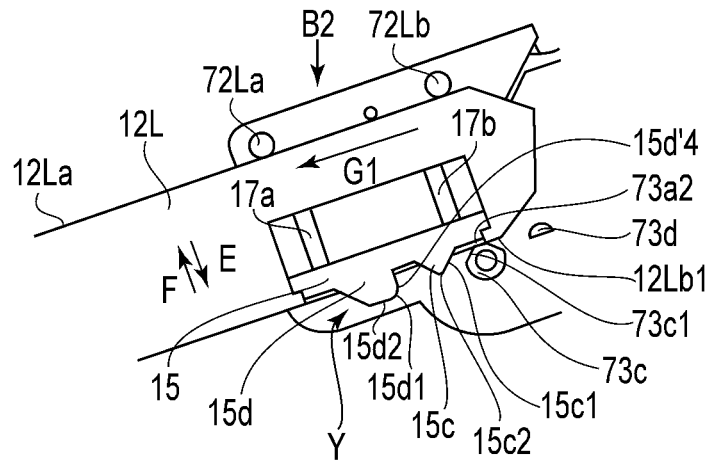
FIG. 55 is an illustration of an operation of the erroneous insertion prevention structure at the time when an improper cartridge is inserted.
Figure 55:
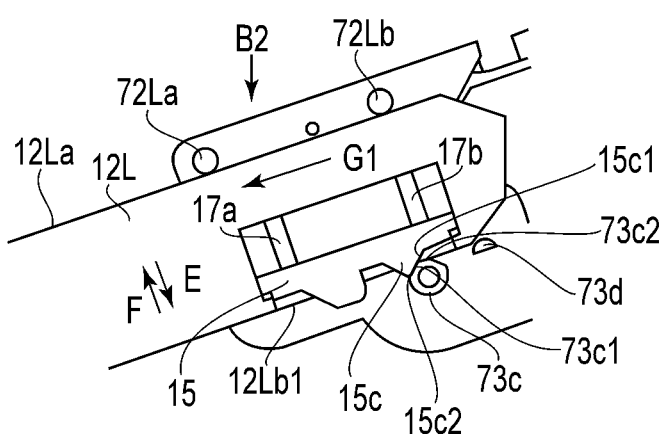
Figure 55:
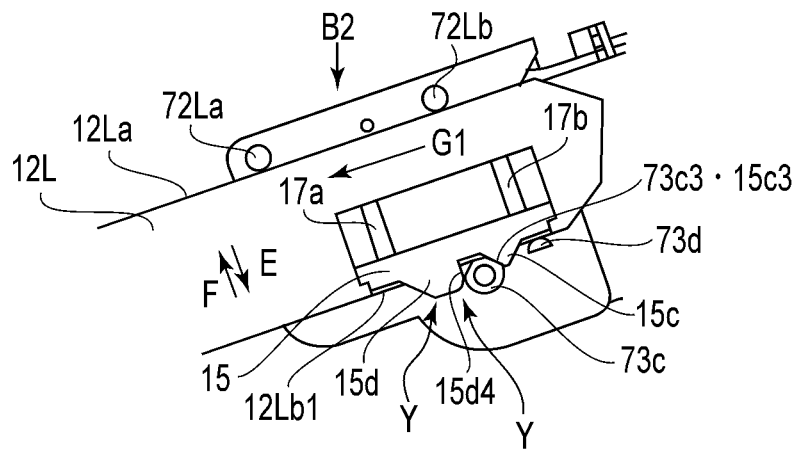

(4-2) the Case when in which an Improper Cartridge B2 is Inserted into the Apparatus Main assembly A1:

Referring to FIGS. 51, 54 and 55, the case when the improper cartridge B2 is inserted into the apparatus main assembly A1 will be described. FIG. 54 is an illustration of an erroneous insertion prevention boss for an improper cartridge. FIG. 55 illustrates an operation of the erroneous insertion preventing structure when the cartridge B2 is inserted into the apparatus main assembly A1.

As shown in FIG. 54, the non-driving side of the cleaning frame 71 (left side plate 71L) of the cartridge B2 is provided with an erroneous insertion prevention boss 73c, 73d similarly to the case when of the cartridge B1 (FIG. 51). A distance O2 measured in the direction of arrow G1 (FIG. 54, inserting direction) between the erroneous insertion prevention boss 73c and the erroneous insertion prevention boss 73d is larger than a distance O1 the erroneous insertion prevention bosses 73a and 73b shown in FIG. 51.

Referring to parts (a)-(c) of FIG. 55, the operation when the cartridge B2 is inserted into the apparatus main assembly A1 will be described.

(a) the cartridge B2 is moved in the inserting direction of the arrow G1 so that the mounting and demounting guide bosses 72La, 72Lb of the cartridge B2 move along the guide groove 12La of the guiding member 12L. At this time, the erroneous insertion preventing member 15 is in the free state, that is, it is in the projected position Y.

(b) then, the erroneous insertion prevention boss 73c abuts to the first projection 15c of the erroneous insertion preventing member 15. At this time, a raising surface 73c1 of the erroneous insertion prevention boss 73c contacts the surface 15c1 of the first projection 15c of the erroneous insertion preventing member 15 to retract the erroneous insertion preventing member 15 in the direction of the arrow F. The erroneous insertion preventing member 15 moves to the first retracted position Z1 where the surface 15c2 of the first projection 15c abuts to a surface 73c2 of the erroneous insertion prevention boss 73c. By this, the cartridge B1 can be moved further in the direction of the arrow G1.

(c) when the cartridge B2 is moved further, the erroneous insertion prevention boss 73c abuts to a surface 15d4 of the second projection 15d of the erroneous insertion preventing member 15. This is because, as described hereinbefore, the erroneous insertion preventing member 15 is urged in the direction of the arrow E by the compression springs 17a, 17b, so that it is kept in the projected position Y.

By this, the cartridge B2 is prevented from further movement in the direction of the arrow G1. Therefore, the cartridge B2 cannot be inserted to the image forming position of the apparatus main assembly A1.

It is possible to move the cartridge B2 in the removal direction (G2) from this position because a surface 73c3 of the erroneous insertion prevention boss 73c abuts to the surface 15c3 of the first projection 15c to retract the erroneous insertion preventing member 15 to the first retracted position Z1. The erroneous insertion preventing member 15 resets to the projected position Y by restoring the free state.

Figure 56:
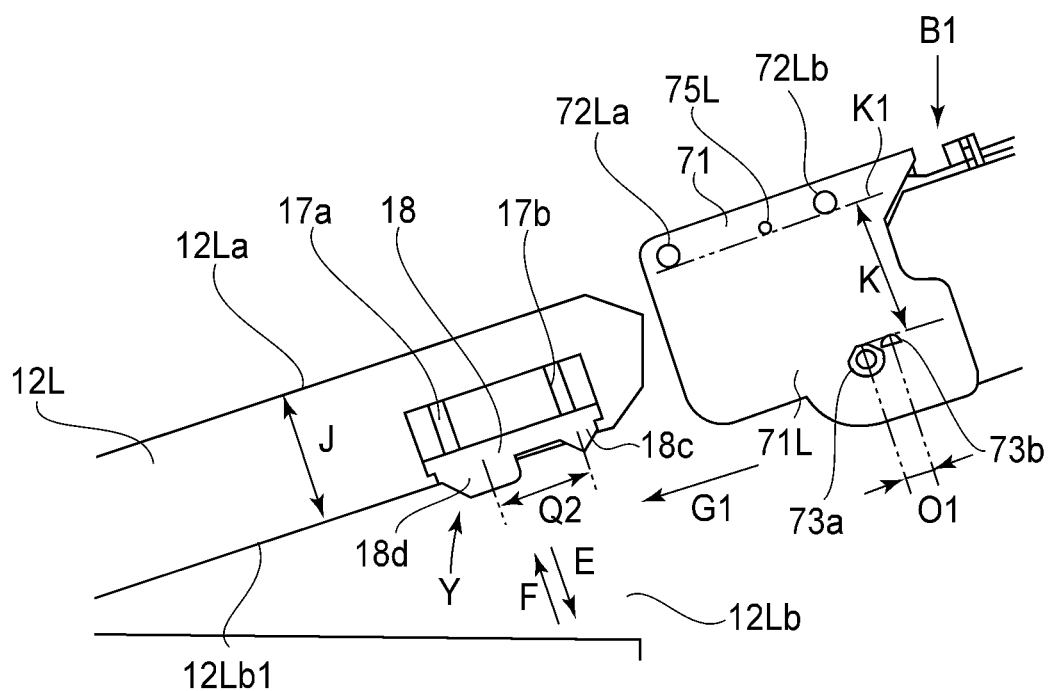
FIG. 56 is an illustration of an erroneous insertion prevention structure with respect to a different main assembly of the image forming apparatus.
Figure 57:
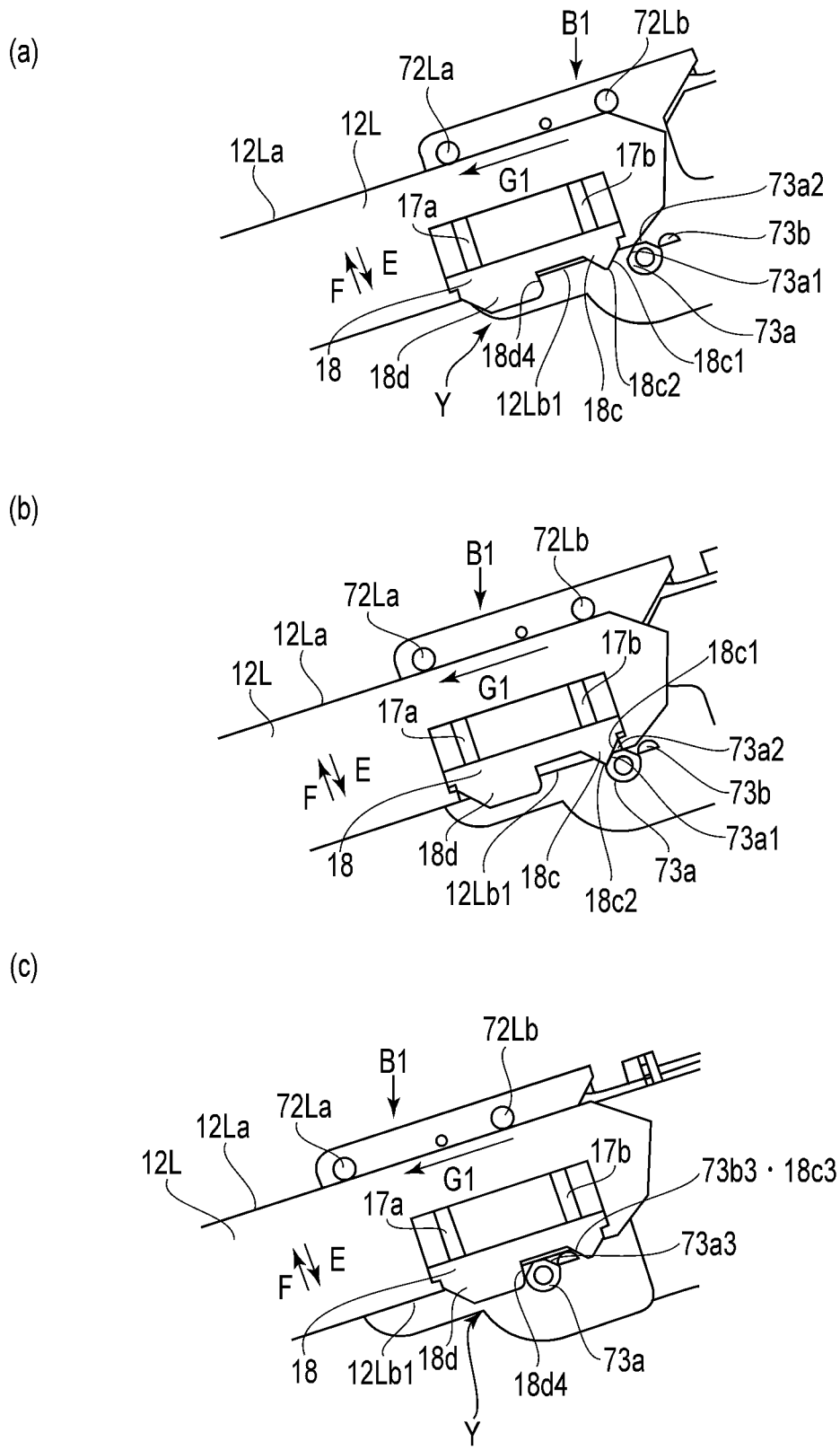
FIG. 57 is an illustration of an erroneous insertion prevention structure when an improper cartridge is inserted into a different main assembly of the image forming apparatus.

(4-3) Case in which the Proper Cartridge B1 is Inserted into the Apparatus Main Assembly A1:

Referring to FIGS. 51, 56 and 57, the description will be made as to the case in which the cartridge B1 is inserted into the apparatus main assembly A2 with which the cartridge B1 is improper.

FIG. 56 is an illustration of the erroneous insertion prevention structure of the apparatus main assembly A2 which is different from the apparatus main assembly A1. FIG. 57 is an illustration of the operation of the erroneous insertion prevention structure at the time when the cartridge B1 is inserted into the apparatus main assembly A2. As shown in FIG. 56, the non-driving side of the apparatus main assembly A2 an erroneous insertion preventing member 18 is provided, similarly to the apparatus main assembly A1 described above. However, the distance Q2 between a first projection 18c and a second projection 18d of the erroneous insertion preventing member 18 in the direction of an arrow G1 (cartridge inserting direction) is larger than the distance Q1 between the first projection 15c and the second projection 15d of the erroneous insertion preventing member 15 shown in FIG. 51.

This is because when the proper cartridge B2 relative to the apparatus main assembly A2 is inserted, the insertion of the cartridge B2 is permitted in the same manner as in the case when the proper cartridge B1 is inserted into the apparatus main assembly A1. The first projection 18c and the second projection 18d of the erroneous insertion preventing member 18 are disposed at such a position that the cartridge B2 can be inserted to the image forming position of the apparatus main assembly A2.

More particularly, in the state that the erroneous insertion prevention boss 73d causes the erroneous insertion preventing member 18 to retract to the first retracted position Z1, the erroneous insertion prevention boss 73c abuts to the second projection 18d of the erroneous insertion preventing member 18. And, in the state that the erroneous insertion prevention boss 73c has retracted to the erroneous insertion preventing member 18 to the second retracted position, the erroneous insertion prevention boss 73d contacts to the second projection of the erroneous insertion preventing member 18. The positions and dimensions are so set.

Referring to parts (a)-(c) of FIG. 57, the operation when the cartridge B2 is inserted into the apparatus main assembly A1 will be described.

(a) the cartridge B1 is moved in the inserting direction of the arrow G1 so that the mounting and demounting guide bosses 72La, 72Lb of the cartridge B1 move along the guide groove 12La of the guiding member 12L. At this time, the erroneous insertion preventing member 18 is in the free state, that is, it is in the projected position Y.

(b) then, the erroneous insertion prevention boss 73a abuts to the first projection 18c of the erroneous insertion preventing member 18. At this time, a raising surface 73a1 of the erroneous insertion prevention boss 73a contacts the surface 18c1 of the first projection 18c of the erroneous insertion preventing member 18 to retract the erroneous insertion preventing member 18 in the direction of the arrow F. The erroneous insertion preventing member 18 moves to the first retracted position Z1 where the surface 18c2 of the first projection 18c abuts to a surface 73a2 of the erroneous insertion prevention boss 73a. Thus, the cartridge B1 can move further in the direction of arrow G1.

Similarly, when the erroneous insertion prevention boss 73b contacts to the first projection 18c, the cartridge B1 becomes movable further, by retracting the erroneous insertion preventing member 18.

In this manner, the erroneous insertion prevention boss 73a and the erroneous insertion prevention boss 73b of the cartridge B1 passes by the first projection 18c of the erroneous insertion preventing member 18.

(c) when the cartridge B2 is moved further, the erroneous insertion prevention boss 73a abuts to a surface 18d4 of the second projection 18d of the erroneous insertion preventing member 18. This is because, as described hereinbefore, the erroneous insertion preventing member 18 is urged in the direction of the arrow E by the compression springs 17a, 17b, so that it is kept in the projected position Y.

By this, the cartridge B2 is prevented from further movement in the direction of the arrow G1. Therefore, the cartridge B1 cannot be inserted to the image forming position of the apparatus main assembly A2.

It is possible to move the cartridge B2 in the removal direction (G2) from this position because a surface 73c3 of the erroneous insertion prevention boss 73c abuts to the surface 15c3 of the first projection 15c to retract the erroneous insertion preventing member 15 to the first retracted position Z1. The erroneous insertion preventing member 15 resets to the projected position Y by restoring the free state.

(5) Summary

The structure of image forming apparatus 100 of the Embodiment 6 is summarized as follows.

1) it is an image forming apparatus 100 for forming an image on the recording material P. It comprises a cartridge B including the first contact portion 73a and the second contact portion 73b, the cartridge B being detachably mountable to the main assembly An of the image forming apparatus. It further comprises the guiding member 12L, provided is provided with the regulating surface 12Lb1, for guiding mounting and demounting of the cartridge B. It further comprises the movable member 15 provided with the first portion-to-be-contacted 15c and the second portion-to-be-contacted 15d, the movable member 15 being movable relative to the guiding member 12L between the projected position Y and the retracted position Z.

When the cartridge B is inserted into the main assembly An of the image forming apparatus, the regulating surface 12La regulates the positions of the first contact portion 73a and the second contact portion 73b of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

4) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

5) the first portion-to-be-contacted 15c is disposed in an upstream side of the second portion-to-be-contacted 15d with respect to the inserting direction G1 (at the time when the cartridge B is inserted into the main assembly An of the image forming apparatus).

6) the movable member 15 is urged to the projected position Y by urging means 17a and 17b.

7) a part of the movable member 15 projects beyond the regulating surface 12Lb1 in the projected position Y.

8) the movable member 15 is held by the guiding member 12L. The cartridge B is provided with the mounting and demounting bosses 72La, 72Lb, 72Ra and 72Rb which are guided by the guiding members 12L and 12R when the cartridge B is inserted into the main assembly An of the image forming apparatus.

The structure of the cartridge 70Ae is summarized as follows 1) it is the cartridge detachably mountable to the main assembly An of the image forming apparatus 100 for forming the image on the recording material P. The main assembly An of the image forming apparatus comprises a guiding member 12L for guiding mounting and demounting of the cartridge B provided with the regulating surface 12Lb1. It further comprises the movable member 15 provided with the first portion-to-be-contacted 15c and the second portion-to-be-contacted 15d and movable between the projected position Y and the retracted position Z relative to said guiding member 12L.

The cartridge B includes the first contact portion 73a and the second contact portion 73b. When the cartridge B is inserted into the main assembly An of the image forming apparatus, the regulating surface 12La regulates the positions of the first contact portion 73a and the second contact portion 73b of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

The structure of the main assembly An of the image forming apparatus is as follows.

1) it is the main assembly An of the image forming apparatus 100 for forming the image on the recording material P, wherein the cartridge B provided with the first contact portion 73a and the second contact portion 73b being detachably mountable the main assembly An of the image forming apparatus. It further comprises the guiding member 12L, provided is provided with the regulating surface 12Lb1, for guiding mounting and demounting of the cartridge B. It further comprises the movable member 15 provided with the first portion-to-be-contacted 15c and the second portion-to-be-contacted 15d, the movable member 15 being movable relative to the guiding member 12L between the projected position Y and the retracted position Z.

When the cartridge B is inserted into the main assembly An of the image forming apparatus, the regulating surface 12La regulates the positions of the first contact portion 73a and the second contact portion 73b of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

4) the first portion-to-be-contacted 15c is disposed in an upstream side of the second portion-to-be-contacted 15d with respect to the inserting direction G1 (at the time when the cartridge B is inserted into the main assembly An of the image forming apparatus).

5) the movable member 15 is urged to the projected position Y by urging means 17a and 17b.

6) a part of the movable member 15 projects beyond the regulating surface 12Lb1 in the projected position Y.

7) the movable member 15 is held by the guiding member 12L.

The structure of the erroneous insertion preventing system is summarized as follows.

It is the erroneous insertion preventing system for the cartridge B detachably mountable to the main assembly An of the image forming apparatus 100 for forming the image on the recording material P. The main assembly An of the image forming apparatus comprises the guiding member 12L, provided is provided with the regulating surface 12Lb1, for guiding mounting and demounting of the cartridge B. It further comprises the movable member 15 provided with the first portion-to-be-contacted 15c and the second portion-to-be-contacted 15d, the movable member 15 being movable relative to the guiding member 12L between the projected position Y and the retracted position Z. The cartridge B is provided with the first contact portion 73a and the second contact portion 73b.

When the cartridge B is inserted into the main assembly An of the image forming apparatus, the regulating surface 12La regulates the positions of the first contact portion 73a and the second contact portion 73b of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

With the erroneous insertion prevention structure as described in the foregoing, the erroneous insertion prevention structure can be disposed neighborhood of the cartridge inserting opening of the image forming apparatus A. Therefore, the erroneous insertion prevention bosses 73a, 73b and the erroneous insertion preventing member 15 can be downsized, and require small spaces. The erroneous insertion can be prevented assuredly among different apparatus structures or device with a simple structure.

Therefore, an image forming apparatus An and a cartridge B can be provided with which properness can be discriminated adjacent the cartridge inserting opening of the image forming apparatus A, and erroneous insertion can be prevented with a simple and downsized structure which can be placed in a narrow space.

Embodiment 7

Embodiment 7 of the present invention will be described. In the description of this embodiment, only the portions different from Embodiment 6 will be described. The materials, the configurations and so on are the same as with Embodiment 6 unless described specifically. In the description of this embodiment, the same reference numerals as in the foregoing embodiments are assigned to the elements having the corresponding functions in this embodiment, and the detailed description thereof is omitted for simplicity.

(1) Mounting and Demounting of Cartridge

Figure 58:
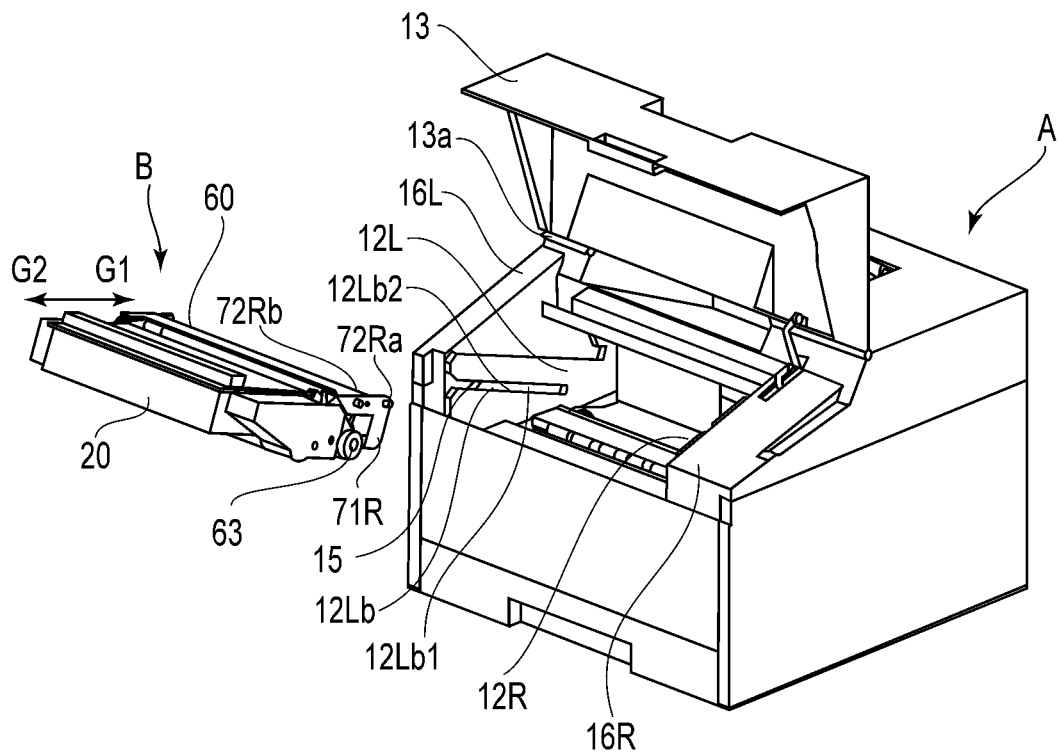
FIG. 58 is an illustration of an image forming apparatus according to Embodiment 7.
Figure 59:
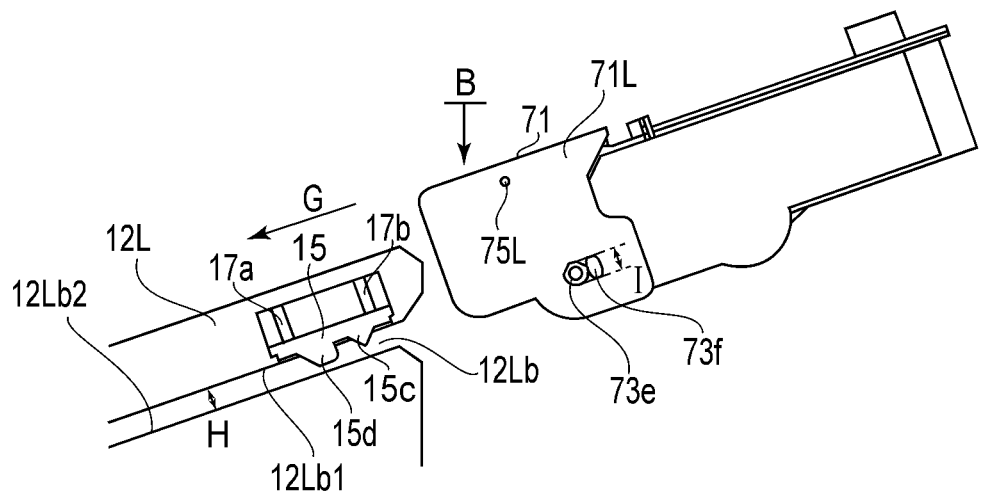
FIG. 59 is an illustration when the cartridge is inserted into the main assembly of the image forming apparatus.

Referring to FIGS. 58, 59, the mounting and demounting of the cartridge B relative to the main assembly An of the apparatus will be described. FIG. 58 is a main assembly An of the apparatus and a perspective view of the cartridge B, in which a door 13 is opened to mount and demount the cartridge B. FIG. 59 is a schematic sectional view at the time when the cartridge B is inserted into the main assembly An of the apparatus.

Of driving side surface (outer surface of a right side plate 71R) of a cleaning frame 71 of the cartridge B is provided with mounting and demounting guide bosses 72Ra and 72Rb similarly to Embodiment 6. The cartridge is inserted into the main assembly An of the apparatus while the mounting and demounting guide bosses 72Ra and 72Rb are moved along the guide surface 12Ra of the guiding member 12R provided inside of the right side plate 16R of the main assembly An of the apparatus.

On the other hand, a non-driving side surface (outer surface of a left side plate 71L) of the cleaning frame 71 is provided with erroneous insertion prevention bosses 73e and 73f as shown in FIG. 59.

The non-driving side guiding member 12L of the main assembly An of the apparatus is provided with an erroneous insertion prevention groove 12Lb as shown in FIG. 58. As shown in FIG. 59, a groove width H of the erroneous insertion prevention groove 12Lb is larger than a width I of the boss of the erroneous insertion prevention bosses 73e and 73f of the cartridge B.

When the cartridge B is inserted into the main assembly An of the apparatus, the cartridge B is moved to the inserting direction indicated by an arrow G1 in FIG. 59, while the erroneous insertion prevention bosses 73e and 73f of the cartridge B are along the erroneous insertion prevention groove 12Lb. At this time, the erroneous insertion prevention bosses 73e and 73f of the cartridge B are regulated by the erroneous insertion prevention groove 12Lb, by which the insertion attitude of the cartridge B is held.

(2) Erroneous Insertion Prevention Structure

As described hereinbefore, when the cartridge B is inserted into the main assembly An of the apparatus, the erroneous insertion prevention bosses 73e and 73f are regulated by the erroneous insertion prevention groove 12Lb. Thus, the variation of the insertion track of the erroneous insertion prevention bosses 73e, 73f relative to the guiding member 12L is suppressed when the cartridge B is inserted into the main assembly An of the apparatus.

By this, it is not necessary to make the contact surface so wide as to ensure the contact between the erroneous insertion prevention bosses 73e, 73f and the erroneous insertion preventing member 15 in consideration of the case in which the positions of the erroneous insertion prevention bosses 73e, 73f relative to the erroneous insertion preventing member 15 vary significantly. Therefore, the erroneous insertion prevention bosses 73e, 73f and the erroneous insertion preventing member 15 can be downsized, and require small spaces.

Embodiment 8

In the structure of Embodiment 4, the insertion prevention structure may be changed so that the first contact portion 73a (73e) and the second contact member 73b (73f) may be provided in the main assembly An of the image forming apparatus, wherein the movable member 15 (18) is provided on the cartridge B.

Then, the structure of the image forming apparatus 100 is summarized as follows.

1) it is an image forming apparatus 100 for forming an image on the recording material S. It comprises a cartridge B which is provided with the first portion-to-be-contacted 15c and the second portion-to-be-contacted 15d and which is provided with a movable member 15 movable between the projected position Y and the retracted position Z, the cartridge B being detachably mountable to the main assembly An of the image forming apparatus. It further comprises the first contact portion 73a and the second contact portion 73b. It further comprises the guiding member 12L, provided is provided with the regulating surface 12Lb1, for guiding mounting and demounting of the cartridge B.

When the cartridge B is inserted into the main assembly An of the image forming apparatus, the regulation surface 12La regulates the position of the movable member 15 of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

4) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

5) the first portion-to-be-contacted 15c is disposed in an upstream side of the second portion-to-be-contacted 15d with respect to the inserting direction G1 (at the time when the cartridge B is inserted into the main assembly An of the image forming apparatus).

6) the movable member 15 is urged to the projected position Y by urging means 17a and 17b.

7) the cartridge B is provided with the mounting and demounting regulating portions 72La, 72Lb which are guided by the guiding member 12L when the cartridge B is inserted into the main assembly An of the image forming apparatus.

The structure of the cartridge 70Ae is summarized as follows.

1) it is the cartridge detachably mountable to the main assembly An of the image forming apparatus 100 for forming the image on the recording material P. The main assembly An of the image forming apparatus comprises a guiding member (12L) for guiding mounting and demounting of the cartridge B, the guiding member including the first contact portion 73a the second contact portion 73b and the regulation surface 12Lb1.

The cartridge B comprises the movable member 15 is provided with the first portion-to-be-contacted 15c and the second portion-to-be-contacted 15d and movable between the projected position Y and the retracted position Z. When the cartridge B is inserted into the main assembly An of the image forming apparatus, the first contact portion 73a becomes contactable to the second portion-to-be-contacted 15d by said second contact portion 73bed contacts to the first portion-to-be-contacted 15c to move the movable member 15 from the projected position Y to the first retracted position Z1. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first portion-to-be-contacted 15c and the second portion-to-be-contacted 15d are provided with respective flat surfaces 15c1 and 15d1 which are inclined toward the upstream with respect to the inserting direction G1 (at the time when the cartridge B is inserted into the main assembly An of the image forming apparatus) and toward the projecting direction E of the movable member 15.

4) the first portion-to-be-contacted 15c is disposed in an upstream side of the second portion-to-be-contacted 15d with respect to the inserting direction G1 (at the time when the cartridge B is inserted into the main assembly An of the image forming apparatus).

5) the movable member 15 is urged to the projected position Y by urging means 17a and 17b.

6) the cartridge B is provided with the mounting and demounting regulating portions 72La, 72Lb to be guided by the guiding member 12L when the cartridge B is inserted into the main assembly An of the image forming apparatus.

The structure of the main assembly An of the image forming apparatus is as follows.

1) it is the main assembly of the image forming apparatus 100 for forming the image on the recording material P, including the first portion-to-be-contacted 15c and the second portion-to-be-contacted 15d, wherein the cartridge B including the movable member 15 movable between the projected position Y and the retracted position Z. It further comprises the first contact portion 73a and the second contact portion 73b. It further comprises the guiding member 12L, provided is provided with the regulating surface 12Lb1, for guiding mounting and demounting of the cartridge B.

When the cartridge B is inserted into the main assembly An of the image forming apparatus, the second contact portion 73b contacts to the first portion-to-be-contacted 15c, and the first contact portion 73a moves the movable member 15 from the projected position Y to the first retracted position Z1. By this, it becomes contactable to the second portion-to-be-contacted 15d. The first contact portion 73a can pass by the second portion-to-be-contacted 15d only when it can contact to the second portion-to-be-contacted 15d.

2) when the cartridge B is inserted into the main assembly An of the image forming apparatus, the second contact portion 73b can contact to the second portion-to-be-contacted 15d in the following case. Second contact portion 73b is the contactable to the second portion-to-be-contacted 15d, only when the first contact portion 73a abuts to the second portion-to-be-contacted 15d to retract the movable member 15 from the projected position Y to the second retracted position Z2 retracted from the first retracted position Z1. The second contact portion 73b is capable of passing by the second portion-to-be-contacted 15d only when it is contactable to the second portion-to-be-contacted 15d.

3) the first contact portion 73a and the second contact portion 73b are provided with respective flat surfaces 73a1 and 73b1 which are inclined toward the downstream with respect to the inserting direction G1 (at the time when the cartridge B is inserted into the main assembly An of the image forming apparatus) and toward the retracting direction F of the movable member 15.

The structure of the erroneous insertion preventing system is summarized as follows.

It is the erroneous insertion preventing system for the cartridge B detachably mountable to the main assembly An of the image forming apparatus 100 for forming the image on the recording material P. The main assembly An of the image forming apparatus comprises a guiding member (12L)

for guiding mounting and demounting of the cartridge B, the guiding member including the first contact portion 73a the second contact portion 73b and the regulation surface 12Lb1. The cartridge B is provided with the movable member 15 is provided with the first portion-to-be-contacted 15c and the second portion-to-be-contacted 15d and movable between the projected position Y and the retracted position Z.

When the cartridge B is inserted into the main assembly An of the image forming apparatus, the regulation surface 12La regulates the position of the movable member 15 of the cartridge B. The first contact portion 73a becomes contactable to the second portion-to-be-contacted 15d by the second contact portion 73b contacting to the first portion-to-be-contacted 15c thus moving the movable member 15 to the first retracted position 1 from the projected position Y. The first contact portion 73a can pass by the second portion-to-be-contacted 15d only when it can contact to the second portion-to-be-contacted 15d.

The similar effects to that of the Embodiments 6 and 7 are provided according to this embodiment 8.

<Others>

1) the function, the material, the configuration, the relative position of the constituent elements of the foregoing embodiments are not limited to those described above, unless otherwise stated specifically.

2) the image forming apparatus is not limited to the above-described electrophotographic image forming apparatus. It may be any other image forming apparatus using an electrostatic recording process, a magnetic recording process or another known process.

3) the image forming apparatus is not limited to the one to which only one cartridge is detachably mountable. The image forming apparatus may be a color image forming apparatus in which a plurality of cartridges for different colors are detachably mountable to mounting portions of the apparatus.

4) the cartridge is not limited to an integral type process cartridge described above. It may be a separable type process cartridge including image forming process means actable on an image bearing member for carrying an image, or a developing cartridge including developing means for developing a latent image formed on the image bearing member with a developer. It may be a unit contributable to the image forming process formed an image on recording material and detachably mountable to the main assembly of the image forming apparatus.

According to Embodiments 6-8, the erroneous insertion prevention structure can be disposed adjacent to the cartridge inserting opening of the image forming apparatus. In addition, the erroneous insertion can be prevented among different main assembly structures of the image forming apparatus with a simple and small structure. Therefore, the erroneous insertion can be prevented assuredly with a simple structure requiring a small space, and can be placed adjacent to the cartridge inserting opening of the image forming apparatus.

While the invention has been described with reference to the structures disclosed herein, it is not confined to the details set forth and this application is intended to cover such modifications or changes as may come within the purpose of the improvements or the scope of the following claims.

This application claims priority from Japanese Patent Applications Nos. 210762/2012, 210763/2012 and 210764/2012 which were filed Sep. 25, 2012 which are hereby incorporated by reference.

What is claimed is:

1. An image forming apparatus for forming an image on a recording material, wherein a cartridge, having a first contact portion and a second contact portion, is detachably mountable to said image forming apparatus in a mounting direction, said image forming apparatus comprising:
   a main assembly, wherein the second contact portion is located at a position downstream of the first contact portion with respect to the mounting direction;
   a movable member movable between a projected position in which said movable member is in an insertion path of the second contact portion when the cartridge is mounted to said main assembly, and a retracted position in which said movable member is retracted from the insertion path;
   a first portion-to-be-contacted, provided on said movable member, for placing said movable member in the retracted position by being contacted by the second contact portion;
   a second portion-to-be-contacted, provided on said movable member at a position downstream of said first portion-to-be-contacted with respect to the mounting direction, for placing said movable member in the retracted position by being contacted by the second contact portion; and
   a recess provided in said movable member between said first portion-to-be-contacted and said second portion-to-be-contacted with respect to the mounting direction, said recess being recessed beyond said first portion-to-be-contacted and said second portion-to-be-contacted in a moving direction of said movable member, and said recess crossing the insertion path when said movable member is in the projected position,
   wherein the first contact portion and the second contact portion are capable of passing said movable member in the mounting direction without the second contact portion entering said recess in the process of mounting said cartridge to said main assembly.

2. An apparatus according to claim 1, wherein when an attempt is made to mount an improper cartridge to said main assembly, a wall of said recess is abutted by a contact portion of the improper cartridge in the mounting direction to prevent movement of the improper cartridge toward a downstream direction with respect to the mounting direction.

3. An apparatus according to claim 1, further comprising an inclined surface, provided at a position upstream of said first portion-to-be-contacted with respect to the mounting direction and inclined relative to the mounting direction, for guiding the second contact portion to said first portion-to-be-contacted.

4. An apparatus according to claim 1, further comprising an inclined surface, provided at a position downstream of said second portion-to-be-contacted with respect to the mounting direction and inclined relative to the mounting direction, for guiding the second contact portion to said second portion-to-be-contacted when the cartridge is dismounted from said main assembly.

5. An apparatus according to claim 1, wherein said movable member is urged to the projected position by urging means.

6. An apparatus according to claim 1, wherein said movable member includes a first guiding portion and a second guiding portion which is provided with said first portion-to-be-contacted, said second portion-to-be-contacted, and said recess, and wherein the insertion path is formed by said first guiding portion and said second guiding portion.

7. A cartridge detachably mountable to an image forming apparatus for forming an image on a recording material, said cartridge having a first contact portion and a second contact portion located at a position downstream of said first contact portion with respect to a mounting direction of mounting said cartridge, the image forming apparatus including a movable member movable between a projected position in which the movable member is in an insertion path of said second contact portion when said cartridge is mounted to a main assembly of the image forming apparatus and a retracted position retracted from the insertion path, a first portion-to-be-contacted provided on the movable member, a second portion-to-be-contacted provided on the movable member at a position downstream of the first portion-to-be-contacted with respect to the mounting direction, a recess provided in the movable member between the first portion-to-be-contacted and the second portion-to-be-contacted with respect to the mounting direction, the recess being recessed beyond the first portion-to-be-contacted and the second portion-to-be-contacted in a moving direction of the movable member, and the recess crossing the insertion path when the movable member is in the projected position, said cartridge comprising:

said first contact portion for placing the movable member in the retracted position in the process of mounting said cartridge to the main assembly; and said second contact portion, provided at a position downstream of said first contact portion with respect to the mounting direction, for placing the movable member in the retracted position by contacting the first portion-to-be-contacted and the second portion-to-be-contacted in the process of mounting said cartridge to the main assembly, wherein said first contact portion and said second contact portion are capable of passing the movable member in the mounting direction without said second contact portion entering the recess in the process of mounting said cartridge to the main assembly.

8. A cartridge according to claim 7, wherein said first contact portion moves the movable member from the projected position to the retracted position by contacting an inclined surface which is provided upstream of the first portion-to-be-contacted with respect to the mounting direction and which is inclined relative to the mounting direction.

9. A cartridge according to claim 7, wherein said second contact portion moves the movable member from the projected position to the retracted position by contacting an inclined surface which is provided upstream of the first portion-to-be-contacted with respect to the mounting direction and which is inclined relative to the mounting direction.

10. A cartridge according to claim 7, wherein said first contact portion moves the movable member from the projected position to the retracted position by contacting an inclined surface which is provided downstream of the second portion-to-be-contacted with respect to the mounting direction and which is inclined relative to the mounting direction, when said cartridge is dismounted from the main assembly.

11. A cartridge according to claim 7, wherein said second contact portion moves the movable member from the projected position to the retracted position by contacting an inclined surface which is provided downstream of the second portion-to-be-contacted with respect to the mounting direction and which is inclined relative to the mounting direction, when said cartridge is dismounted from the main assembly.

12. A cartridge according to claim 7, wherein said first contact portion and said second contact portion are guided by a first guiding portion and a second guiding portion when said cartridge is mounted and demounted relative to the apparatus main assembly, wherein the first guiding portion and the second guiding portion are provided on the movable member, and the second guiding portion is provided with the first portion-to-be-contacted, the second portion-to-be-contacted and the recess provided in the movable member.

13. An image forming apparatus system for forming an image on a recording material, said image forming apparatus system comprising:

(i) a first cartridge having a first contact portion and a second contact portion located at a position downstream of said first contact portion with respect to a first mounting direction of mounting said first cartridge to a first main assembly of a first image forming apparatus;

(ii) said first image forming apparatus for forming an image on the recording material, wherein said first cartridge is detachably mountable to said first image forming apparatus, said first image forming apparatus including:

a first movable member movable between a first projected position in which said first movable member is in a first insertion path of said second contact portion when said first cartridge is mounted to said first main assembly, and a first retracted position in which said first movable member is retracted from the first insertion path, a first portion-to-be-contacted, provided on said first movable member, for placing said first movable member in the first retracted position by being contacted by said second contact portion, a second portion-to-be-contacted, provided on said first movable member at a position downstream of said first portion-to-be-contacted with respect to the first mounting direction, for placing said first movable member in the first retracted position by being contacted by said second contact portion, and a first recess provided in said first movable member between said first portion-to-be-contacted and said second portion-to-be-contacted with respect to the first mounting direction, said first recess being recessed beyond said first portion-to-be-contacted and said second portion-to-be-contacted in a moving direction of said first movable member, and said first recess crossing the first insertion path when said first movable member is in the first projected position, wherein said first contact portion and said second contact portion are capable of passing said first movable member in the first mounting direction without said second contact portion entering said first recess in the process of mounting said first cartridge to said first main assembly;

(iii) a second cartridge having a third contact portion and a fourth contact portion located at a position downstream of said third contact portion with respect to a second mounting direction of mounting said second cartridge to a second main assembly of a second image forming apparatus; and (iv) said second image forming apparatus for forming an image on the recording material, wherein said second cartridge is detachably mountable to said second image forming apparatus, said second image forming apparatus including:

a second movable member movable between a second projected position in which said second movable member is in a second insertion path of said fourth contact portion when said second cartridge is mounted to said second main assembly, and a second retracted position in which said second movable member is retracted from the second insertion path, a third portion-to-be-contacted, provided on said second movable member, for placing said second movable member in the second retracted position by being contacted by said fourth contact portion, a fourth portion-to-be-contacted, provided on said second movable member at a position downstream of said third portion-to-be-contacted with respect to the second mounting direction of mounting said second cartridge to said second main assembly, for placing said second movable member in the second retracted position by being contacted by said fourth contact portion, and a second recess provided in said second movable member between said third portion-to-be-contacted and said fourth portion-to-be-contacted with respect to the second mounting direction, and said second recess being recessed beyond said third portion-to-be-contacted and said fourth portion-to-be-contacted in the second moving direction of said second movable member, and said second recess crossing the second insertion path when said second movable member is in the second projected position, wherein said third contact portion and said fourth contact portion are capable of passing said second movable member in the second mounting direction without said fourth contact portion entering said second recess in the process of mounting said second cartridge to said second apparatus main assembly, wherein when an attempt is made to mount said second cartridge to said first main assembly, said first recess receives said fourth contact portion to prevent movement of said second cartridge toward a downstream direction with respect to the first mounting direction, and wherein when an attempt is made to mount said first cartridge to said second main assembly, said second recess receives said second contact portion to prevent movement of said first cartridge toward the downstream direction with respect to the second mounting direction.

14. An image forming apparatus system for forming an image on a recording material, said image forming apparatus system comprising:
(i) a first cartridge including a first groove extending in a first inserting direction of said first cartridge, and a first portion-to-be-engaged;
(ii) a first image forming apparatus for forming an image on the recording material, wherein said first cartridge is detachably mountable to said first image forming apparatus, said first image forming apparatus including:
a first movable member provided in a first main assembly of said first image forming apparatus and movable between a first position and a second position,
a first projection provided on said first movable member and engageable with said first groove, and
a first engaging portion provided on said first movable member and engageable with said first portion-to-be-engaged,
wherein by said first projection being inserted into said first groove in the process of mounting said first cartridge to said first main assembly, said first movable member is moved from the first position to the second position to permit said first engaging portion to pass said first portion-to-be-engaged in the first direction;
(iii) a second cartridge including a second groove extending in a second inserting direction of said second cartridge, and a second portion-to-be-engaged; and
(iv) a second image forming apparatus for forming an image on the recording material, wherein said second cartridge is detachably mountable to said second image forming apparatus, said second image forming apparatus including:
a second movable member provided in a second main assembly of said second image forming apparatus and movable between a third position and a fourth position,
a second projection provided on said second movable member and engageable with said second groove, and
a second engaging portion provided on said second movable member and engageable with said second portion-to-be-engaged,
wherein by said second projection being inserted into said second groove in the process of mounting said second cartridge to said second main assembly, said second movable member is moved from the third position to the fourth position to permit said second engaging portion to pass said second portion-to-be-engaged in the second direction,
wherein when an attempt is made to insert said first cartridge into said second main assembly in the second inserting direction, said first portion-to-be-engaged contacts said second movable member so that said first cartridge is prevented from being mounted to said second main assembly, and
wherein when an attempt is made to insert said second cartridge into said first main assembly in the first inserting direction, said second portion-to-be-engaged contacts said first movable member so that said second cartridge is prevented from being mounted to said first main assembly.

15. An image forming apparatus system for forming an image on a recording material, said image forming apparatus system comprising:
(i) a first cartridge including a first movable member movable between a first position and a second position;
(ii) a first image forming apparatus for forming an image on the recording material, wherein said first cartridge is detachably mountable to said first image forming apparatus, said first image forming apparatus including:
a first groove extending in a first inserting direction of said first cartridge, engageable with a first projection provided on said first movable member, and
a first portion-to-be-engaged engageable with a first engaging portion provided on said first movable member,
wherein by inserting said first projection into said first groove in the process of mounting said first cartridge to a first main assembly of said first image forming apparatus, said first movable member is moved from the first position to the second position to permit said first engaging portion to pass said first portion-to-be-engaged in the first inserting direction;
(iii) a second cartridge including a second movable member movable between a third position and a fourth position; and
(iv) a second image forming apparatus for forming an image on the recording material, wherein said second cartridge is detachably mountable to said second image forming apparatus, said second image forming apparatus including:

a second groove extending in a second inserting direction of said second cartridge, engageable with a second projection provided on said second movable member, and a second portion-to-be-engaged engageable with a second engaging portion provided on said second movable member, wherein by inserting said second projection into said second groove in the process of mounting said second cartridge to a second main assembly of said second image forming apparatus, said second movable member is moved from the third position to the fourth position to permit said second portion-to-be-engaged to pass said second engaging portion in the second inserting direction, wherein when an attempt is made to insert said first cartridge into said second main assembly in the first inserting direction, said first portion-to-be-engaged contacts said second movable member so that said first cartridge is prevented from being mounted to said second main assembly, and wherein when an attempt is made to mount said second cartridge to said first main assembly, said second portion-to-be-engaged contacts said first movable member so that said second cartridge is prevented from being mounted to said first main assembly.

16. An apparatus according to claim 6, wherein said first guiding portion is capable of guiding the first contact portion when the cartridge is mounted and demounted relative to said main assembly.

17. An apparatus according to claim 16, further comprising an inclined surface provided at a downstream part of said first guiding portion with respect to the mounting direction and inclined relative to the mounting direction and configured to place said movable member in the retracted position by being contacted by the first contact portion when said cartridge is dismounted from said main assembly.

18. A cartridge according to claim 12, wherein said first contact portion is guided by the first guiding portion when said cartridge is mounted and demounted relative to the main assembly.

19. A cartridge according to claim 18, wherein said cartridge is capable of being dismounted from the main assembly by contacting said first contact portion and an inclined surface which is provided at a downstream part of the first guiding portion with respect to the mounting direction and which is inclined relative to the mounting direction.

* * * * *